(12) United States Patent
Ito et al.

(10) Patent No.: US 7,136,231 B2
(45) Date of Patent: Nov. 14, 2006

(54) ZOOM LENS SYSTEM

(75) Inventors: Tomoki Ito, Kawasaki (JP); Motoyuki Ohtake, Saitama-ken (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/785,096

(22) Filed: Feb. 25, 2004

(65) Prior Publication Data
US 2005/0083584 A1    Apr. 21, 2005

(30) Foreign Application Priority Data
Feb. 27, 2003  (JP) .............................. 2003-051386
Sep. 30, 2003  (JP) .............................. 2003-341903

(51) Int. Cl.
*G02B 15/14*    (2006.01)
*G02B 27/64*    (2006.01)

(52) U.S. Cl. ........................ 359/687; 359/554; 359/557

(58) Field of Classification Search ................ 359/686, 359/687, 554, 557, 432, 676–685; 396/52–55; 348/208
See application file for complete search history.

(56) References Cited

U.S. PATENT DOCUMENTS 5,182,671 A    1/1993    Kitagishi et al. ........... 359/557
6,061,180 A    5/2000    Hayakawa ................... 359/557
2002/0063961 A1*    5/2002    Hamano et al. ............. 359/557

FOREIGN PATENT DOCUMENTS

| JP | 2-81020 | 3/1990 |
| JP | 10-282413 | 10/1998 |
| JP | 11-142739 | 5/1999 |
| JP | 2001-117005 | 4/2001 |
| JP | 2003-140048 | 5/2003 |

* cited by examiner

*Primary Examiner*—Ricky Mack
*Assistant Examiner*—Jack Dinh
(74) *Attorney, Agent, or Firm*—Miles & Stockbridge P.C.

(57) ABSTRACT

A zoom lens system having high zoom ratio capable of shifting an image for vibration reduction correction. The system includes, in order from an object, a first lens group having positive power, a second lens group having negative power, a third lens group having positive power, and a fourth lens group having positive power. Each of the first lens group through the fourth lens group moves such that when zooming from a wide-angle end state to a telephoto end state, a distance between the first and the second lens groups increases, a distance between the second and the third lens groups decreases, and a distance between the third and the fourth lens group decreases. The third lens group includes at least two sub-lens groups having positive refractive power. Image shifting carried out by moving either of the two sub-lens groups perpendicularly to the optical axis. Given conditions are satisfied.

34 Claims, 34 Drawing Sheets

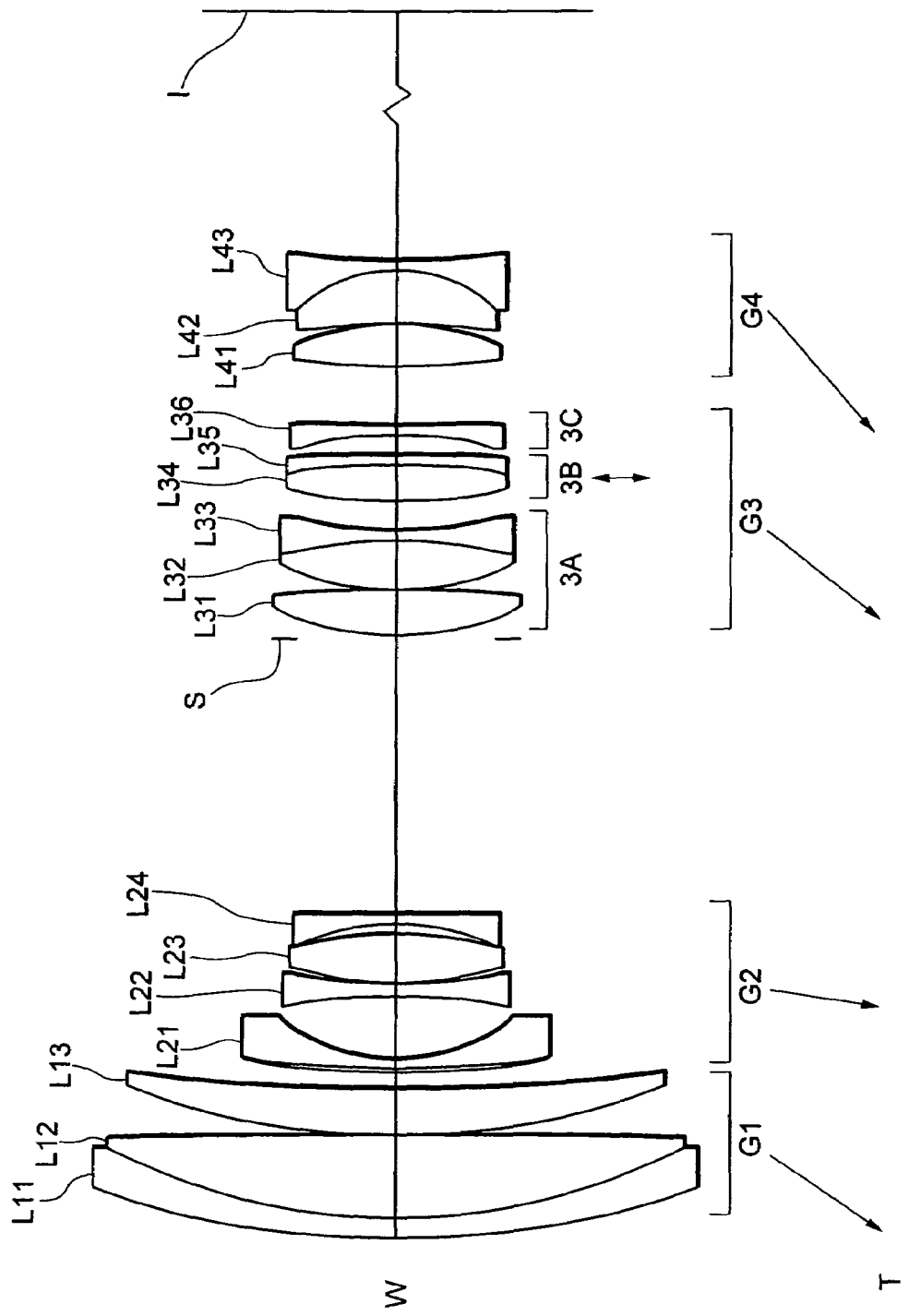

FIG. 6A
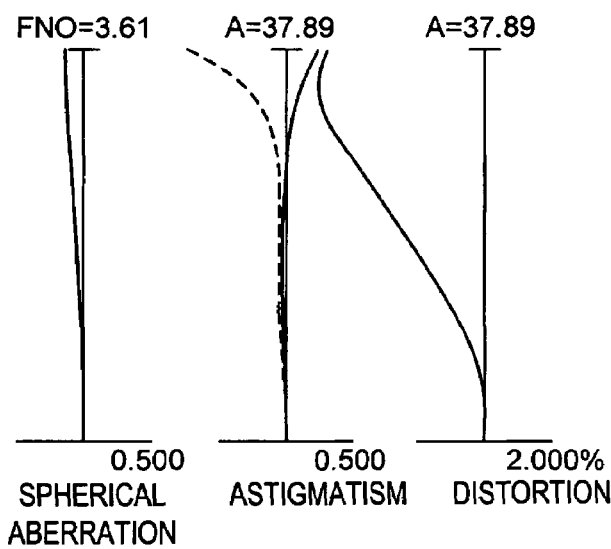
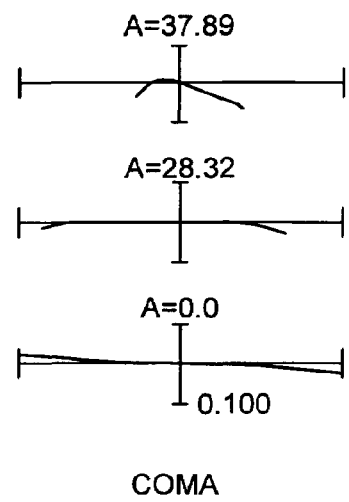
FIG. 6B
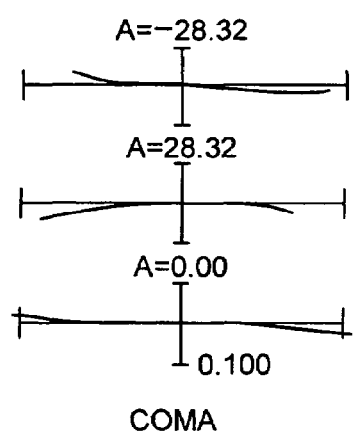

FIG. 12A
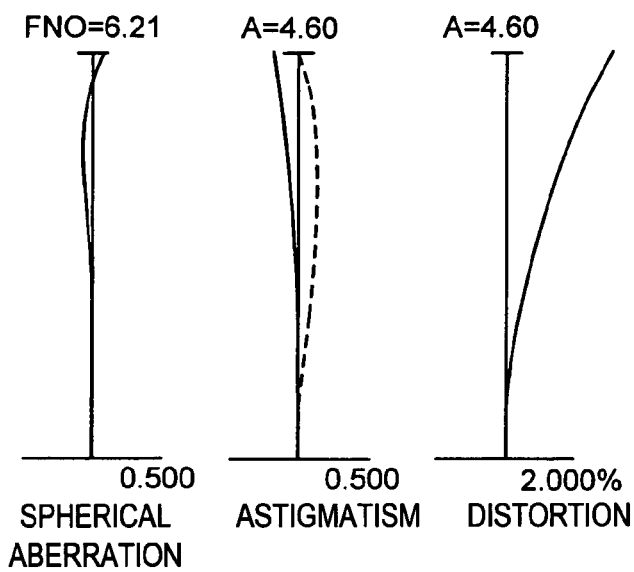
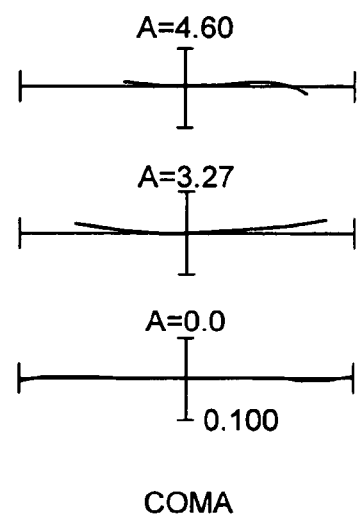
FIG. 12B
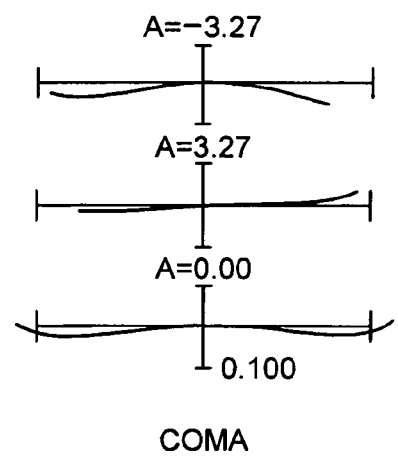

FIG. 14A
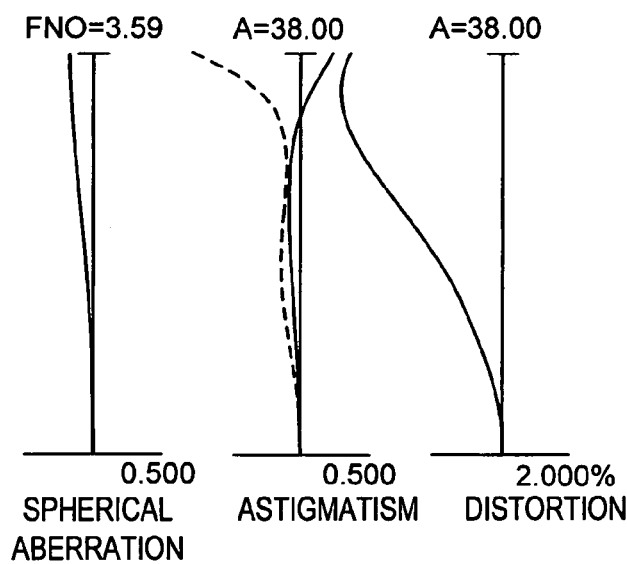
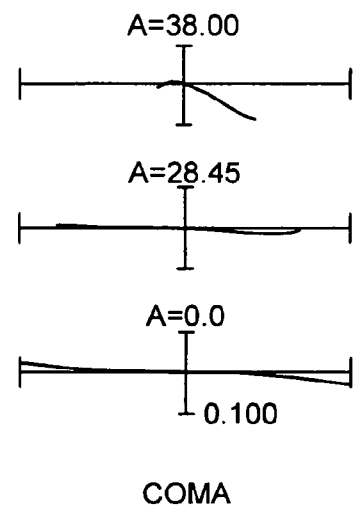
FIG. 14B
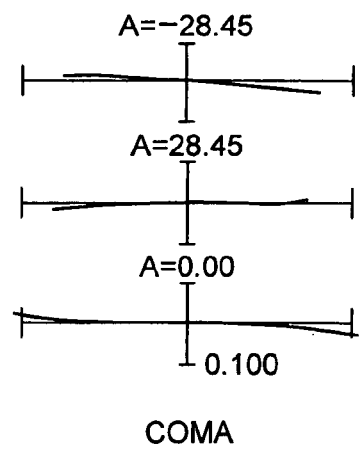

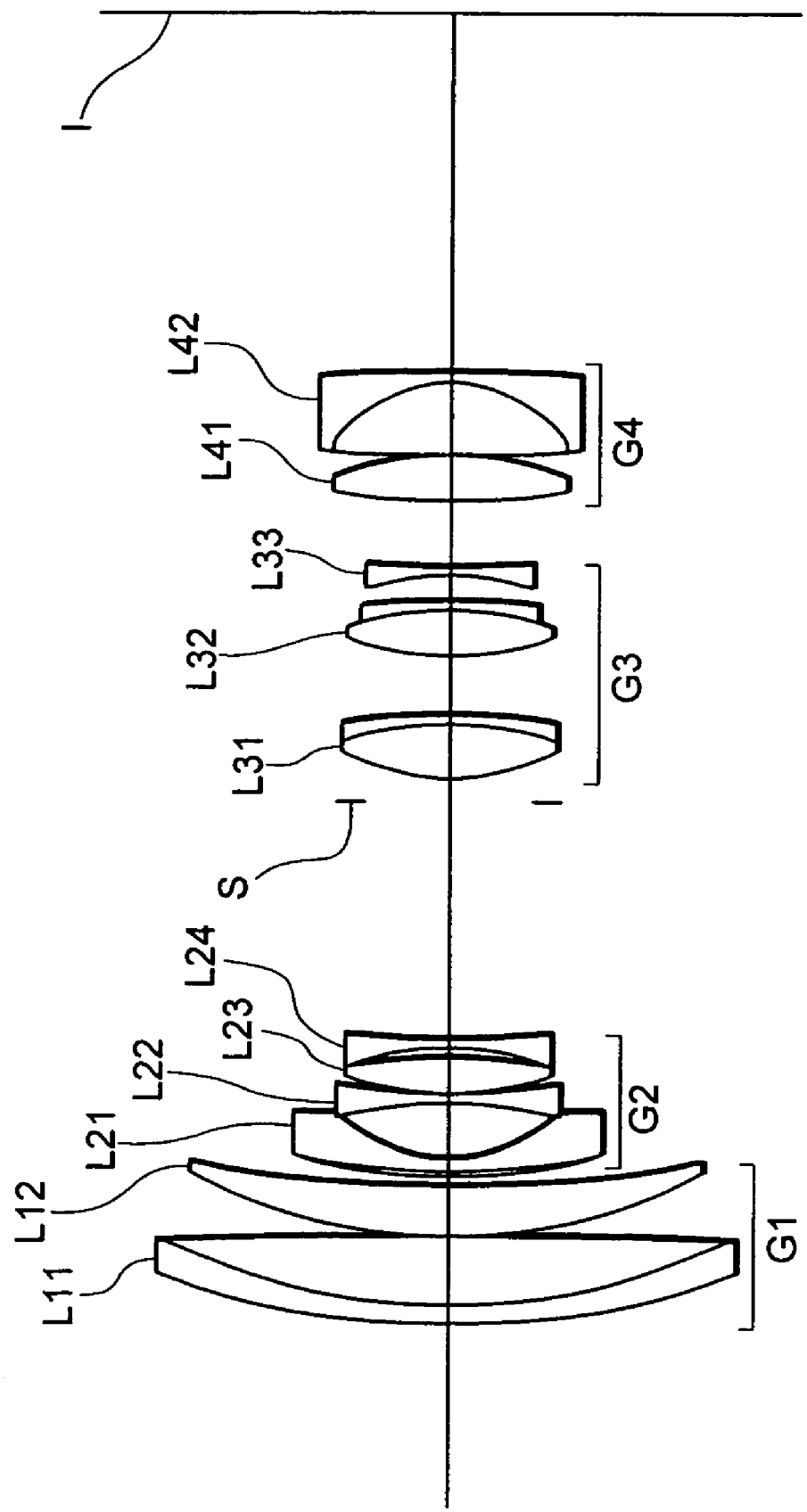

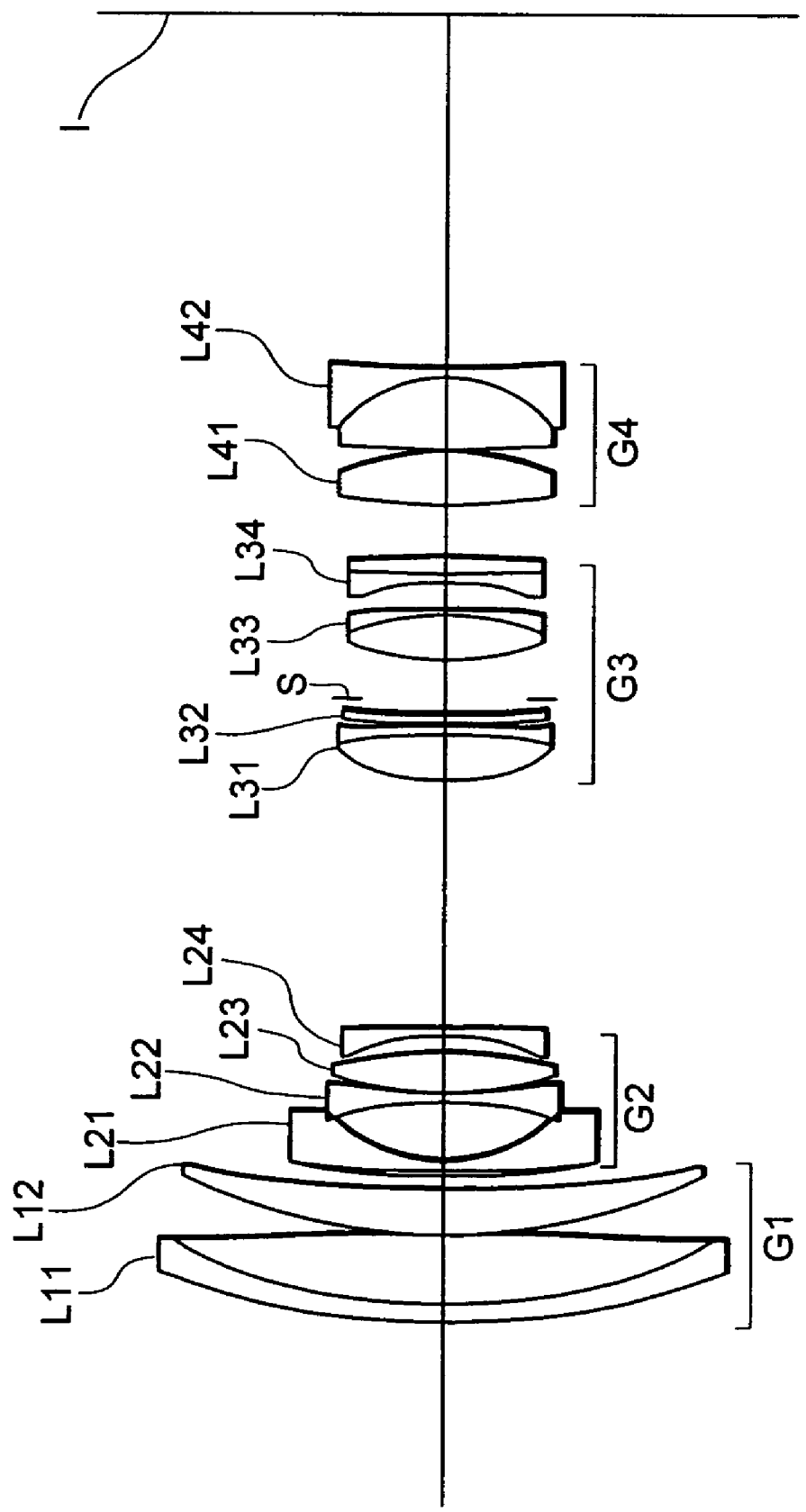

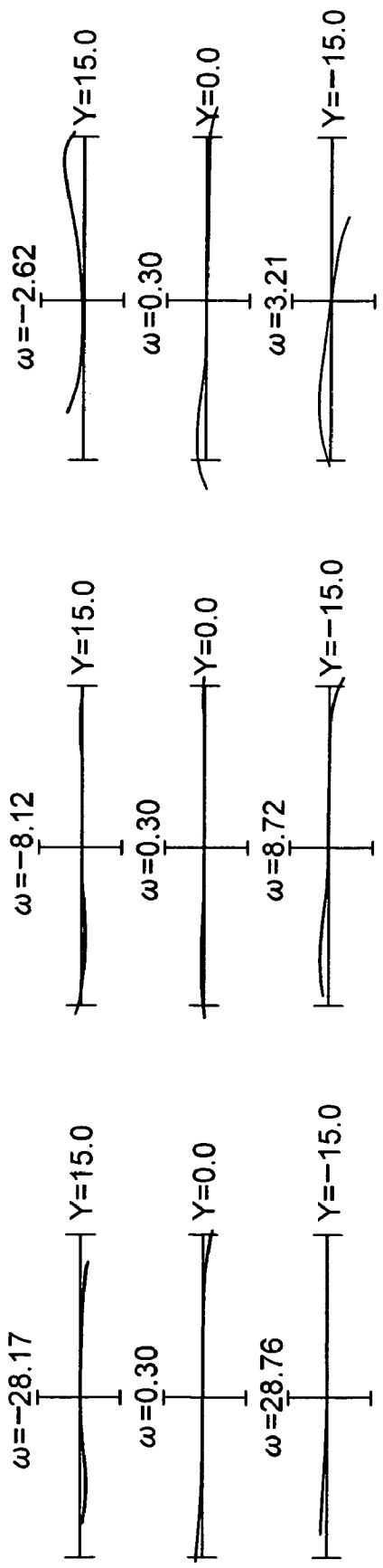

ZOOM LENS SYSTEM

The disclosures of the following priority applications are herein incorporated by reference:
Japanese Patent Application No. 2003-051386 filed on Feb. 27, 2003; and
Japanese Patent Application No. 2003-341903 filed on Sep. 30, 2003.

BACKGROUND OF THE INVENTION

1. Field of the Invention

The present invention relates to a zoom lens system and in particular to a high zoom ratio zoom lens system capable of shifting an image.

2. Related Background Art

An optical system capable of moving (shifting) an image perpendicularly to the optical axis by moving (shifting) one or some of lens elements constructing the optical system substantially perpendicularly to the optical axis has been known. As for such optical systems, a zoom lens system capable of shifting an image by shifting one or some of lens elements provided in the zoom lens system has been proposed (see, for example, Japanese Patent Application Laid-Open No. 2003-140048 and Japanese Patent Application Laid-Open No. 2-081020).

In the present specification, one or some of lens elements being shifted substantially perpendicularly to the optical axis is hereinafter called a shift lens group.

Recently, a zoom lens has widely used as a photographic lens. When a zoom lens is used as a photographic lens, it makes you possible to take a photograph closer to the subject, so it has a merit that you can take a photograph just as you intend. According to popularization of a zoom lens as a photographic lens, a high zoom ratio zoom lens capable of shooting closer to the subject has come onto the market.

As a high zoom ratio zoom lens capable of shooting closer to the subject, a positive-negative-positive-positive four-lens-group type zoom lens has been known (see, for example, Japanese Patent Application Laid-Open No. 2001-117005 and Japanese Patent Application Laid-Open No. 11-142739).

A positive-negative-positive-positive type zoom lens is composed of, in order from the object, a first lens group having positive refractive power, a second lens group having negative refractive power, a third lens group having positive refractive power, and a fourth lens group having positive refractive power. When the state of lens group positions varies from a wide-angle end state (which gives the shortest focal length) to a telephoto end state (which gives the longest focal length), at least the first lens group and the fourth lens group move to the object side such that a distance between the first lens group and the second lens group increases, a distance between the second lens group and the third lens group decreases, and a distance between the third lens group and the fourth lens group decreases.

According to further popularization of a zoom lens as a photographic lens, in order to meet user's expectation to improve portability, compact and lightweight zoom lenses have been proposed.

On the other hand, in particular for a compact and lightweight zoom lens, an image tends to be blurred during exposure by minute vibration produced on a camera while shooting such as a camera shake caused by a photographer upon releasing a shutter button. When the amount of the camera vibration is assumed to be constant, the amount of image blurring increases in accordance with the increase in the focal length of the lens, so the minute camera vibration causes severe deterioration on the image.

Accordingly, a method for compensating the above-described image blur caused by the camera shake by combining a zoom lens capable of shifting an image with a driver, a detector and a controller has been known (see, for example, Japanese Patent Application Laid-Open No. 10-282413). In such zoom lens, the detector detects a camera shake. The controller controls the shift lens group giving the driver a driving amount in order to correct the shake detected by the detector. The driver corrects the image blur caused by the camera shake by driving the shift lens group substantially perpendicularly to the optical axis.

Generally, in a zoom lens, it is necessary to correct various aberrations for each lens group to obtain given optical performance as a whole zoom lens. The state of aberration correction required to each lens group has a certain range, and the range generally becomes narrow when the zoom ratio becomes large.

On the other hand, in an optical system capable of shifting an image, in order to suppress variation in various aberrations produced upon shifting an image, there is a state of aberration correction required for the shift lens group only.

Accordingly, the state of aberration correction required for the shift lens group in order to obtain good optical performance when the zoom ratio becomes large is completely different from that required for the shift lens group in order to correct aberrations produced upon shifting an image to obtain good optical performance. Therefore, it is very difficult to combine to attain a high zoom ratio and to construct an optical system capable of shifting an image.

A conventional zoom lens having vibration reduction correction disclosed in Japanese Patent Application Laid-Open No. 2003-140048, however, has a large number of lens elements, and a vibration reduction mechanism has to be put into the lens barrel. Accordingly, the total lens length and the diameter of the lens barrel become large, so the compactness tends to be spoiled. Moreover, when the zoom lens is made to be a high zoom ratio with having a vibration reduction correction, deterioration in optical performance is severe, so that it becomes difficult to maintain sufficient optical performance as a zoom lens.

A zoom lens disclosed in Japanese Patent Application Laid-Open No. 10-282413 has a large number of lens elements, so that when the state of lens group positions varies from the wide-angle end state to the telephoto end state, degree of freedom for selecting zoom trajectory of each lens group is large. Accordingly, high optical performance can be obtained. However, the driving mechanism for moving each lens group becomes complicated and the factors to produce mutual decentering of each lens group upon manufacturing increase, so that it becomes difficult to secure stable optical performance.

SUMMARY OF THE INVENTION

The present invention is made in view of the aforementioned problems and has an object to provide a high zoom ratio zoom lens capable of shifting an image, which can carry out vibration reduction correction and accomplish a high zoom ratio.

According to one aspect of the present invention, a zoom lens system includes, in order from an object, a first lens group having positive refractive power, a second lens group having negative refractive power, a third lens group having positive refractive power, and a fourth lens group having positive refractive power. Each of the first lens group through the fourth lens group move such that when the state of lens group positions varies from a wide-angle end state to a telephoto end state, a distance between the first lens group and the second lens group increases, a distance between the second lens group and the third lens group decreases, and a distance between the third lens group and the fourth lens group decreases. The third lens group includes at least two sub-lens groups having positive refractive power. An image is shifted by moving either of the two sub-lens groups as a shift lens group perpendicularly to the optical axis. The following conditional expression (1) is satisfied:

$$0.120<DT/ft<0.245 \qquad (1)$$

where DT denotes an air space between the most image side lens surface of the first lens group and the most object side lens surface of the second lens group in the telephoto end state, and ft denotes the focal length of the zoom lens system in the telephoto end state.

In one preferred zoom lens system of the one aspect of the present invention, the following conditional expression (2) is preferably satisfied:

$$0.8<(1-\beta A)\times \beta B<3.5 \qquad (2)$$

where βA denotes the lateral magnification of the shift lens group and βB denotes the lateral magnification of the optical elements locating between the shift lens group and an image plane.

In one preferred zoom lens system of the one aspect of the present invention, the third lens group consists of, in order from the object, a third A lens group having positive refractive power, a third B lens group having positive refractive power, and a third C lens group having negative refractive power. The shift lens group having positive refractive power is the third B lens group.

In one preferred zoom lens system of the one aspect of the present invention, the shift lens group includes at least one aspherical surface.

In one preferred zoom lens system of the one aspect of the present invention, the second lens group includes at least three negative lenses and one positive lens.

In one preferred zoom lens system of the one aspect of the present invention, the third A lens group consists of two positive lenses and one negative lens.

In one preferred zoom lens system of the one aspect of the present invention, the third B lens group consists of one positive lens and one negative lens.

In one preferred zoom lens system of the one aspect of the present invention, the fourth lens group includes at least one aspherical surface having a shape that positive refractive power becomes weak from the center to the periphery of the lens surface.

According to another aspect of the present invention, a zoom lens system includes, in order from an object, a first lens group having positive refractive power, a second lens group having negative refractive power, a third lens group having positive refractive power, and a fourth lens group having positive refractive power. At least the first lens group and the fourth lens group move to the object side such that when the state of lens group positions varies from a wide-angle end state to a telephoto end state a distance between the first lens group and the second lens group increases, a distance between the second lens group and the third lens group decreases, and a distance between the third lens group and the fourth lens group decreases. The third lens group includes a first sub-lens group, a second sub-lens group, and a third sub-lens group. The second sub-lens group is arranged to the image side of the first sub-lens group with an air space. The third sub-lens group is arranged to the image side of the second sub-lens group with an air space. An image is shifted by moving the second sub-lens groups shifting substantially perpendicularly to the optical axis. An aperture stop is arranged in the vicinity of the third lens group including inside of the third lens group. The following conditional expressions (3) and (4) are satisfied:

$$0.05<Ds/fw<0.7 \qquad (3)$$

$$0.1<ft/fA<1.5 \qquad (4)$$

where Ds denotes a distance along the optical axis between the aperture stop and the nearest lens surface of the second sub-lens group, fw denotes the focal length of the zoom lens system in the wide-angle end state, fA denotes the focal length of the whole lenses locating to the object side of the second sub-lens group in the telephoto end state, and ft denotes the focal length of the zoom lens system in the telephoto end state.

In one preferred zoom lens system of the another aspect of the present invention, the first sub-lens group has positive refractive power and the following conditional expression (5) is preferably satisfied:

$$0.06<fa/ft<0.2 \qquad (5)$$

where fa denotes the focal length of the first sub-lens group.

In one preferred zoom lens system of the another aspect of the present invention, the second sub-lens group includes at least one positive lens and one negative lens, and has positive refractive power. The following conditional expression (6) is preferably satisfied:

$$-0.6<(na/ra)/(nb/rb)<0 \qquad (6)$$

where ra denotes a radius of curvature of the most object side lens surface of the second sub-lens group, na denotes refractive index at d-line of the most object side lens of the second sub-lens group, rb denotes a radius of curvature of the most image side lens surface of the second sub-lens group, and nb denotes refractive index at d-line of the most image side lens of the second sub-lens group.

In one preferred zoom lens system of the another aspect of the present invention, the third sub-lens group has negative refractive power and the following conditional expression (7) is preferably satisfied:

$$0.5<|fc|/f3<0.9 \qquad (7)$$

where fc denotes the focal length of the third sub-lens group, and f3 denotes the focal length of the third lens group.

In one preferred zoom lens system of the another aspect of the present invention, the third sub-lens group includes a negative lens having a concave surface facing to the object locating to the most object side and the following conditional expression (8) is preferably satisfied:

$$0.5<|rc|/f3<0.75 \qquad (8)$$

where rc denotes a radius of curvature of the negative lens locating to the most object side of the third sub-lens group.

Other feature and advantages according to the present invention will be readily understood from the detailed description of the preferred embodiments in conjunction with the accompanying drawings.

BRIEF DESCRIPTION OF THE DRAWINGS

FIGS. 2A and 2B graphically show various aberrations of the zoom lens system according to Example 1 in a wide-angle end state in which FIG. 2A shows various aberrations without vibration reduction correction, and FIG. 2B shows coma with vibration reduction correction.

FIGS. 3A and 3B graphically show various aberrations of the zoom lens system according to Example 1 in an intermediate focal length state in which FIG. 3A shows various aberrations without vibration reduction correction, and FIG. 3B shows coma with vibration reduction correction.

FIGS. 4A and 4B graphically show various aberrations of the zoom lens system according to Example 1 in a telephoto end state in which FIG. 4A shows various aberrations without vibration reduction correction, and FIG. 4B shows coma with vibration reduction correction.

FIG. 5 is a diagram showing a sectional view of a zoom lens system according to Example 2 of the first embodiment of the present invention.

FIGS. 6A and 6B graphically show various aberrations of the zoom lens system according to Example 2 in a wide-angle end state in which FIG. 6A shows various aberrations without vibration reduction correction, and FIG. 6B shows coma with vibration reduction correction.

FIGS. 7A and 7B graphically show various aberrations of the zoom lens system according to Example 2 in an intermediate focal length state in which FIG. 7A shows various aberrations without vibration reduction correction, and FIG. 7B shows coma with vibration reduction correction.

FIGS. 8A and 8B graphically show various aberrations of the zoom lens system according to Example 2 in a telephoto end state in which FIG. 8A shows various aberrations without vibration reduction correction, and FIG. 8B shows coma with vibration reduction correction.

FIGS. 10A and 10B graphically show various aberrations of the zoom lens system according to Example 3 in a wide-angle end state in which FIG. 10B shows coma with vibration reduction correction.

FIGS. 11A and 11B graphically show various aberrations of the zoom lens system according to Example 3 in an intermediate focal length state in which FIG. 11B shows coma with vibration reduction correction.

FIGS. 12A and 12B graphically show various aberrations of the zoom lens system according to Example 3 in a telephoto end state in which FIG. 12A shows various aberrations without vibration reduction correction, and FIG. 12B shows coma with vibration reduction correction.

FIGS. 14A and 14B graphically show various aberrations of the zoom lens system according to Example 4 in a wide-angle end state in which FIG. 14A shows various aberrations without vibration reduction correction, and FIG. 14B shows coma with vibration reduction correction.

FIGS. 15A and 15B graphically show various aberrations of the zoom lens system according to Example 4 in an intermediate focal length state in which FIG. 15A shows various aberrations without vibration reduction correction, and FIG. 15B shows coma with vibration reduction correction.

FIGS. 16A and 16B graphically show various aberrations of the zoom lens system according to Example 4 in a telephoto end state in which FIG. 16A shows various aberrations without vibration reduction correction, and FIG. 16B shows coma with vibration reduction correction.

FIGS. 18A and 18B graphically show various aberrations of the zoom lens system according to Example 5 in a wide-angle end state in which FIG. 18A shows various aberrations without vibration reduction correction, and FIG. 18B shows coma with vibration reduction correction.

FIGS. 19A and 19B graphically show various aberrations of the zoom lens system according to Example 5 in an intermediate focal length state in which FIG. 19A shows various aberrations without vibration reduction correction, and FIG. 19B shows coma with vibration reduction correction.

FIGS. 20A and 20B graphically show various aberrations of the zoom lens system according to Example 5 in a telephoto end state in which FIG. 20A shows various aberrations without vibration reduction correction, and FIG. 20B shows coma with vibration reduction correction.

FIGS. 22A and 22B graphically show various aberrations of the zoom lens system according to Example 6 in a wide-angle end state in which FIG. 22A shows various aberrations without vibration reduction correction, and FIG. 22B shows coma with vibration reduction correction.

FIGS. 23A and 23B graphically show various aberrations of the zoom lens system according to Example 6 in an intermediate focal length state in which FIG. 23A shows various aberrations without vibration reduction correction, and FIG. 23B shows coma with vibration reduction correction.

FIGS. 24A and 24B graphically show various aberrations of the zoom lens system according to Example 6 in a telephoto end state in which FIG. 24A shows various aberrations without vibration reduction correction, and FIG. 24B shows coma with vibration reduction correction.

FIG. 26 is a diagram showing the lens arrangement of a zoom lens system according to Example 7 of a second embodiment of the present invention.

FIG. 29 is a diagram showing the lens arrangement of a zoom lens system according to Example 8 of the second embodiment of the present invention.

FIGS. 31A, 31B, and 31C graphically show coma of the zoom lens system according to Example 8 focusing at infinity in a wide-angle end state (f=28.80), an intermediate focal length state (f=100.00), and a telephoto end state (f=290.99), respectively, when a second sub-lens group is shifted.

DESCRIPTION OF THE PREFERRED EMBODIMENTS

Figure 1:
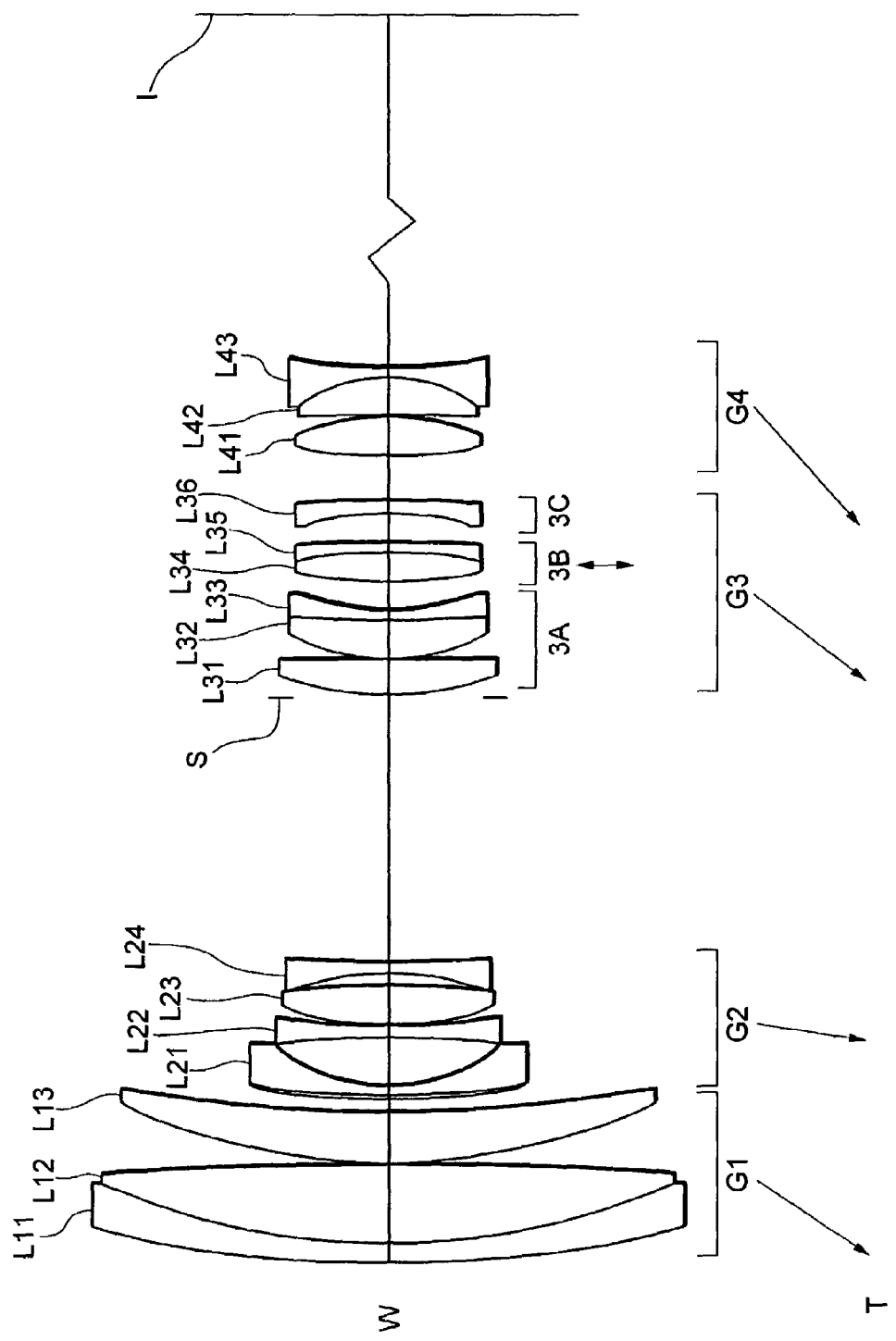
FIG. 1 is a diagram showing a sectional view of a zoom lens system according to Example 1 of a first embodiment of the present invention.

Basic construction of the high zoom ratio zoom lens system capable of shifting an image (hereinafter called a zoom lens system) according to the present invention is going to be explained below.

[First Embodiment]

A zoom lens system according to a first embodiment of the present invention includes, in order from an object, a first lens group having positive refractive power, a second lens group having negative refractive power, a third lens group having positive refractive power, and a fourth lens group having positive refractive power. When the state of lens group positions varies from a wide-angle end state to a telephoto end state, the first lens group through the fourth lens group move such that a distance between the first lens group and the second lens group increases, a distance between the second lens group and the third lens group decreases, and a distance between the third lens group and the fourth lens group decreases. The third lens group includes at least two sub-lens groups having positive refractive power. The zoom lens system carries out vibration reduction correction by shifting an image by means of moving either sub-lens group of the two sub-lens groups as a shift lens group perpendicularly to the optical axis. The following conditional expression (1) is satisfied:

$$0.120 < DT/ft < 0.245 \qquad (1)$$

where DT denotes an air space between the most image side lens surface of the first lens group and the most object side lens surface of the second lens group in the telephoto end state, and ft denotes the focal length of the zoom lens system in the telephoto end state.

In the third lens group having positive refractive power, when either sub-lens group of the two sub-lens groups having positive refractive power is used as a shift lens group, variation in aberrations upon shifting can be small since small refractive power affects aberrations little. When a vibration reduction correction is carried out by using a lens group having negative refractive power as a shift lens group, the shift lens group has to be moved in the same direction of the camera shake, so that the burden on the controller becomes heavier and vibration upon correcting camera shake becomes larger causing discomfort to a photographer in comparison with a vibration reduction correction using the positive sub-lens group as a shift lens group. Accordingly, it is desirable to select a sub-lens group having positive refractive power as a shift lens group.

Conditional expression (1) defines an appropriate range of an air space between the first lens group and the second lens group in the telephoto end state.

When the ratio DT/ft is equal to or falls below the lower limit of conditional expression (1), negative spherical aberration in the telephoto end state cannot be corrected well and a high zoom ratio cannot be accomplished, so it is undesirable. When the lower limit is set to 0.15 or more, various aberrations such as spherical aberration can further be corrected, so that it is desirable.

On the other hand, when the ratio DT/ft is equal to or exceeds the upper limit of conditional expression (1), the off-axis ray passing through the first lens group leaves away from the optical axis in the telephoto end state, so the diameter of the first lens group becomes large. It is undesirable. When the upper limit is set to 0.240 or less, various aberrations such as spherical aberration can further be corrected, so that it is desirable.

In a zoom lens system according to the first embodiment of the present invention, in order to obtain better optical performance, it is desirable to satisfy the following conditional expression (2):

$$0.8 < (1-\beta A) \times \beta B < 3.5 \qquad (2)$$

where βA denotes the lateral magnification of the shift lens group and βB denotes the lateral magnification of the optical elements locating between the shift lens group and the image plane.

Conditional expression (2) relates to the lateral magnification of the shift lens group and that of the optical elements locating between the shift lens group and the image plane.

When the ratio (1−βA)×βB is equal to or falls below the lower limit of conditional expression (2), the decentering amount of the shift lens group for obtaining sufficient amount of the image shift becomes large, so that the diameter of the shift lens group becomes large causing increase in the weight. As a result, a driver for the shift lens group becomes large and compactness is damaged, so that it is undesirable.

On the other hand, when the ratio (1−βA)×βB is equal to or exceeds the upper limit of conditional expression (2), the image moves largely in accordance with a minute variation in the shift lens group, so that it becomes difficult to control and drive the shift lens group upon correcting camera shake. It is undesirable. When the upper limit is set to 3.0 or less, it becomes easy to control and drive the shift lens group obtaining good optical performance, so that it is preferable.

In a zoom lens system according to the first embodiment of the present invention, it is preferable that the third lens group is composed of, in order from the object, a third A lens group having positive refractive power, a third B lens group having positive refractive power, and a third C lens group having negative refractive power, and the third B lens group is the shift lens group. Accordingly, the shift lens group can be compact and lightweight, so that it becomes possible to obtain a compact, high zoom ratio optical system without sacrificing good optical performance.

In a zoom lens system according to the first embodiment of the present invention, it is desirable that the shift lens group has at least one aspherical surface. Now, it becomes possible to obtain good optical performance upon shifting the image.

In a zoom lens system according to the first embodiment of the present invention, it is preferable that the second lens group includes at least three negative lenses and a positive lens, the third A lens group includes two positive lenses and a negative lens, the third B lens group consists of a positive lens and a negative lens, and the fourth lens group has at least one aspherical surface having a shape that positive refractive power becomes strong from the center to the periphery of the lens surface. Accordingly, it becomes possible to obtain a compact zoom lens system having optical performance.

In a zoom lens system according to the first embodiment of the present invention, although focusing is carried out by the second lens group, any lens group other than the second lens group can be used for focusing.

Although the aperture stop is arranged between the second lens group and the third lens group, it may be arranged in other space such as the space between the third lens group and the fourth lens group, or a space in a lens group such as a space in the third lens group.

Although a zoom lens system according to the first embodiment of the present invention is composed of four lens groups, any other lens group can be added between each lens group or adjacent to the object or image side of the lens system.

In a zoom lens system according to the first embodiment of the present invention, a diffractive optical element can be used from other point of view. By using a diffractive optical element chromatic aberration can be corrected well.

Each zoom lens system according to each example of the first embodiment is explained below.

In a zoom lens system according to each Example of the present invention, an aspherical surface is expressed by the following expression;

$$x = cy^2/[1+(1-kc^2y^2)^{1/2}] + C4 \cdot y^4 + C6 \cdot y^6 + C8 \cdot y^8 + C10 \cdot y^{10}$$

where y denotes a height from the optical axis, x denotes a sag amount, c denotes a radius of curvature of a reference sphere (a paraxial radius of curvature), k denotes a conical coefficient, C4, C6, C8, and C10 denote 4th, 6th, 8th, and 10th order aspherical coefficient, respectively.

EXAMPLE 1

FIG. 1 is a diagram showing a sectional view of a zoom lens system according to Example 1 of the first embodiment of the present invention.

In FIG. 1, the zoom lens system is composed of, in order from an object, a first lens group G1 having positive refractive power, a second lens group G2 having negative refractive power, a third lens group G3 having positive refractive power, and a fourth lens group G4 having positive refractive power. When the state of lens group positions varies from a wide-angle end state to a telephoto end state, the first lens group G1 through the fourth lens group G4 move such that a distance between the first lens group G1 and the second lens group G2 increases, a distance between the second lens group G2 and the third lens group G3 decreases, and a distance between the third lens group G3 and the fourth lens group G4 decreases. The reference symbol I denotes the image plane.

The third lens group G3 is composed of, in order from the object, a third A lens group 3A having positive refractive power, a third B lens group 3B having positive refractive power, and a third C lens group 3C having negative refractive power. The image can be shifted by moving the third B lens group 3B as a shift lens group perpendicularly to the optical axis.

The first lens group G1 is composed of a cemented lens constructed by a negative meniscus lens L11 having a convex surface facing to the object cemented with a double convex positive lens L12 and a positive meniscus lens L13 having a convex surface facing to the object.

The second lens group G2 is composed of a negative meniscus lens L21 having a convex surface facing to the object, a double concave negative lens L22, a double convex positive lens L23, and a double concave negative lens L24.

The third A lens group 3A is composed of a double convex positive lens L31, and a cemented lens constructed by a positive meniscus lens L32 having a convex surface facing to the object and a negative meniscus lens L33 having a convex surface facing to the object. The third B lens group 3B is composed of a cemented lens constructed by a double convex positive lens L34 and a negative meniscus lens L35 having a concave surface facing to the object. The third C lens group 3C is composed of a negative meniscus lens L36 having a concave surface facing to the object.

The fourth lens group G4 is composed of a double convex positive lens L41, and a cemented lens constructed by a positive meniscus lens L42 having a concave surface facing to the object and a double concave negative lens L43.

The aperture stop S is arranged in the vicinity of the most object side lens surface of the third lens group G3 and moved together with the third lens group G3 upon zooming.

Various values of a zoom lens system according to Example 1 are shown below in Table 1. In [Specifications], f denotes the focal length, FNO denotes an f-number, $2\omega$ denotes an angle of view, and BF denotes the back focal length.

In [Lens Data], the left most column shows the surface number that is a lens surface counted in order from the object, r denotes the radius of curvature of a lens, d denotes a distance along the optical axis between the lens surfaces, $\nu$ denotes Abbe number of the medium between the lens surfaces, and n denote refractive index of a medium between the lens surfaces at d-line ($\lambda$=587.56 nm).

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used. In [Aspherical Data], "E-n" denotes "$10^{-n}$". The explanation of reference symbols is the same in the other examples.

TABLE 1

| [Specifications] | | |
|---|---|---|
| Wide-angle | Intermediate | Telephoto |
| f = 31.169 | 112.180 | 299.993 mm |
| 2ω = 72.3 | 21.0 | 8.0° |
| FNO = 3.6 | 5.6 | 6.6 |

TABLE 1-continued

[Lens Data]

| Surface Number | r | d | ν | n |
|---|---|---|---|---|
| 1 | 128.0762 | 2.000 | 28.56 | 1.79504 |
| 2 | 74.7110 | 8.000 | 82.52 | 1.49782 |
| 3 | −301.4490 | 0.100 | | |
| 4 | 62.5606 | 5.200 | 82.52 | 1.49782 |
| 5 | 174.0263 | D1 | | |
| 6 | 133.1122 | 0.200 | 38.09 | 1.55389 |
| 7 | 110.0000 | 1.000 | 49.61 | 1.77250 |
| 8 | 18.5937 | 4.800 | | |
| 9 | −68.9214 | 1.000 | 42.72 | 1.83481 |
| 10 | 80.9399 | 0.100 | | |
| 11 | 31.2602 | 4.200 | 22.76 | 1.80809 |
| 12 | −61.8236 | 1.200 | | |
| 13 | −26.3434 | 1.000 | 49.61 | 1.77250 |
| 14 | 302.0857 | D2 | | |
| 15 | 0.0000 | 0.500 | | (Aperture Stop S) |
| 16 | 32.0000 | 3.500 | 54.66 | 1.72916 |
| 17 | −631.6375 | 0.100 | | |
| 18 | 21.1207 | 4.000 | 82.52 | 1.49782 |
| 19 | 248.3602 | 1.000 | 37.17 | 1.83400 |
| 20 | 28.9425 | 3.000 | | |
| 21 | 49.5392 | 3.000 | 49.52 | 1.74442 |
| 22 | −39.8231 | 1.000 | 23.78 | 1.84666 |
| 23 | −121.9266 | 3.000 | | |
| 24 | −26.5552 | 1.000 | 42.72 | 1.83481 |
| 25 | −220.0557 | D3 | | |
| 26 | 53.1534 | 4.000 | 55.34 | 1.67790 |
| 27 | −20.4060 | 0.100 | | |
| 28 | −117.6204 | 4.000 | 33.80 | 1.64769 |
| 29 | −14.2583 | 1.000 | 42.72 | 1.83481 |
| 30 | 71.3854 | BF | | |

[Aspherical Data]

Surface Number 6

κ = 64.5192
C4 = 7.6611E−07
C6 = 1.7093E−09
C8 = −2.1081E−11
C10 = 1.0148E−13

Surface Number 21

κ = −1.0025
C4 = −5.4592E−07
C6 = −3.9750E−09
C8 = 2.0368E−11
C10 = 1.8147E−13

Surface Number 26

κ = −19.8163
C4 = 1.9335E−07
C6 = −2.0631E−08
C8 = 1.4059E−10
C10 = 0.0000E−00

Surface Number 27

κ = 0.3829
C4 = 6.9273E−06
C6 = −1.0557−08
C8 = 1.5108E−10
C10 = −3.9880E−13

[Variable Intervals]

| | Wide-angle | Intermediate | Telephoto |
|---|---|---|---|
| f = | 31.169 | 112.180 | 299.993 |
| D1 = | 1.692 | 38.508 | 62.092 |
| D2 = | 27.147 | 12.174 | 1.502 |
| D3 = | 4.956 | 0.910 | 0.033 |
| BF = | 46.216 | 82.184 | 100.098 |

TABLE 1-continued

[Various Values upon Shifting]

| | Wide-angle | Intermediate | Telephoto |
|---|---|---|---|
| f = | 31.169 | 112.180 | 299.993 |
| Lens Shift | 0.250 | 0.350 | 0.450 |
| Image Shift | 0.295 | 0.673 | 1.041 |

[Values for Conditional Expressions]

(1) DT/ft = 0.207

(2) $(1 − \beta A) \times \beta B = 1.2$ (Wide-angle end state)
= 1.9 (Intermediate focal length state)
= 2.3 (Telephoto end state)

Figure 2A:
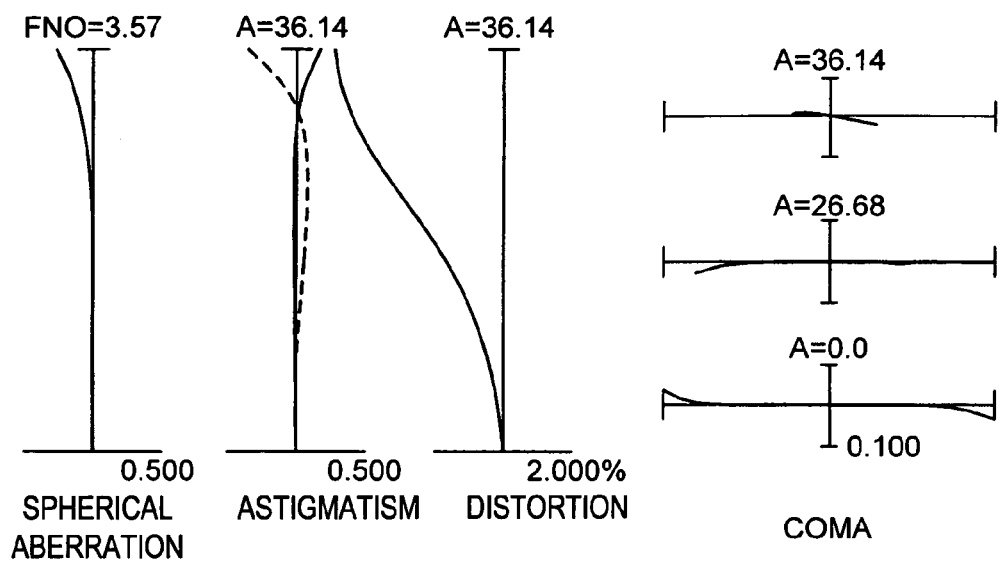
Figure 2B:
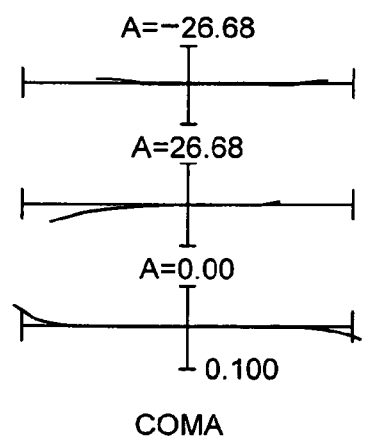
Figure 3A:
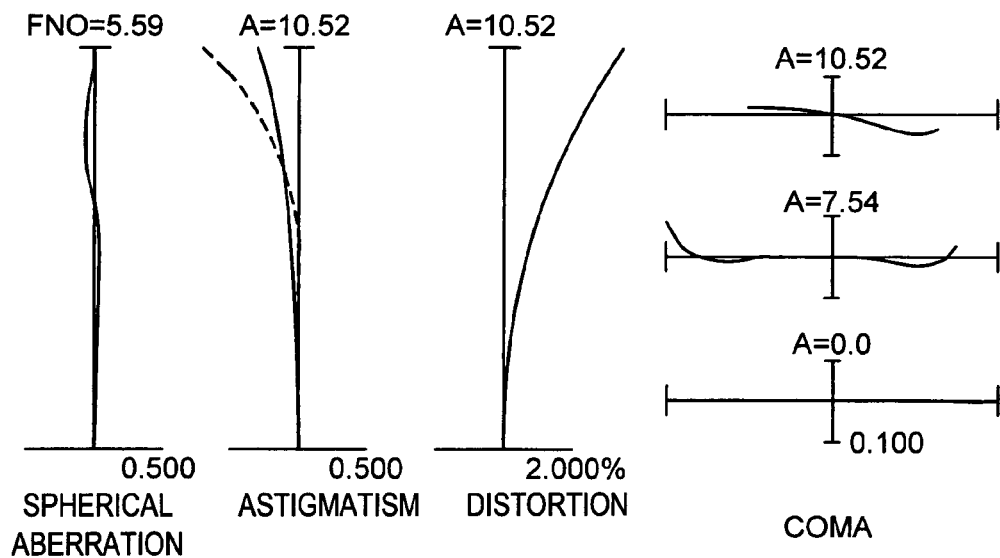
Figure 3B:
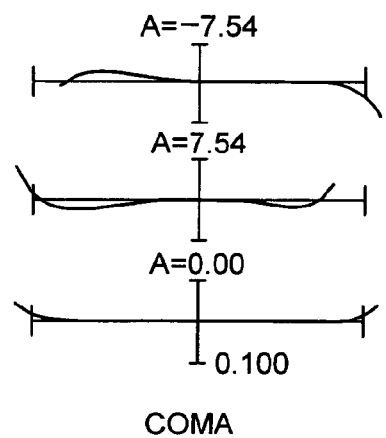
Figure 4A:
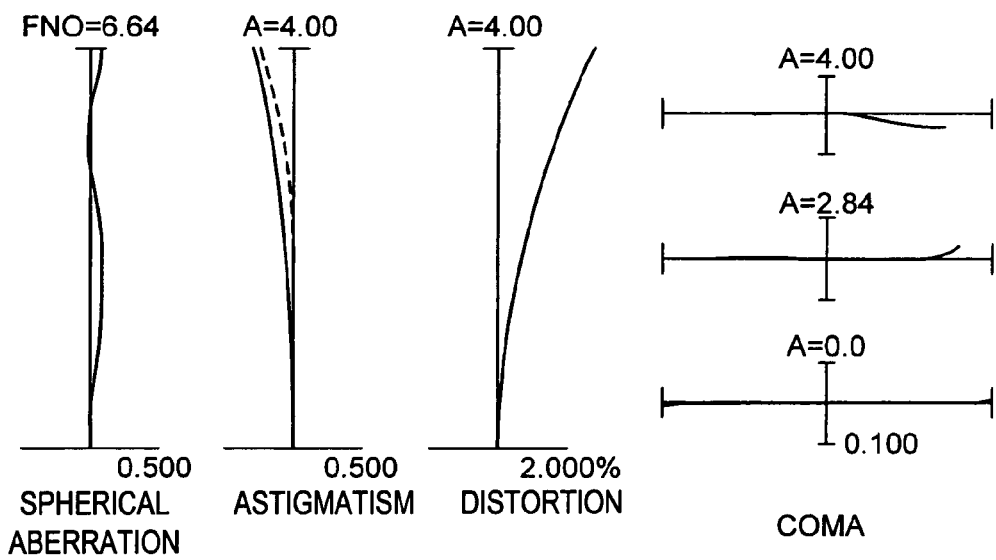
Figure 4B:
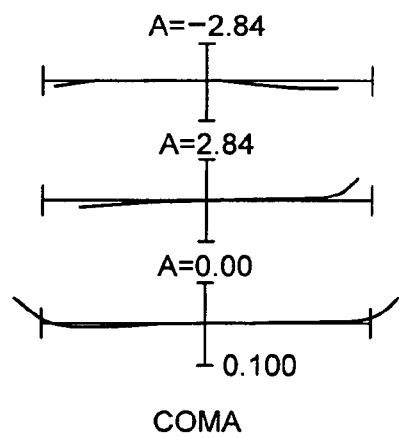
Figure 7A:
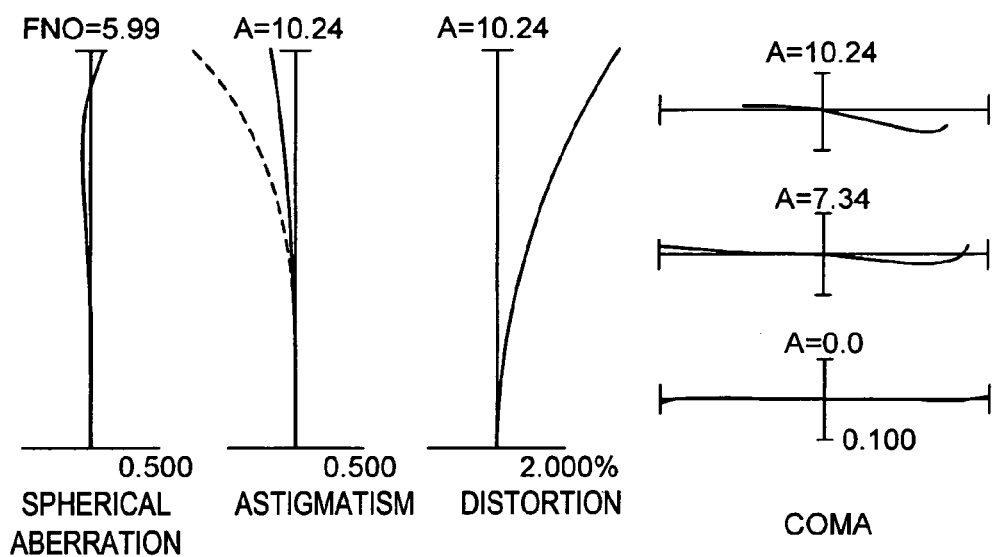
Figure 7B:
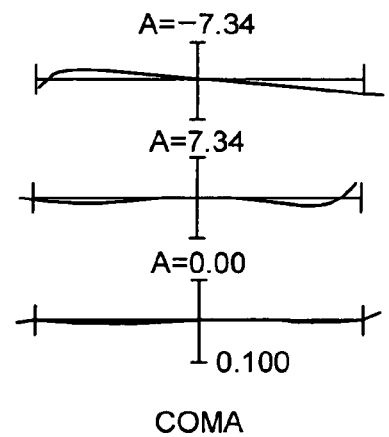

FIGS. 2A, 2B through 4A, 4B are graphs showing various aberrations of the zoom lens system according to Example 1 of the first embodiment of the present invention focusing at infinity at d-line (λ=587.6 nm). FIGS. 2A and 2B graphically show various aberrations in a wide-angle end state (f=31.2) in which FIG. 2A shows various aberrations without vibration reduction correction, and FIG. 2B shows coma with vibration reduction correction. FIGS. 3A and 3B graphically show various aberrations in an intermediate focal length state (f=112.2) in which FIG. 3A shows various aberrations without vibration reduction correction, and FIG. 3B shows coma with vibration reduction correction. FIGS. 4A and 4B graphically show various aberrations in a telephoto end state (f=300.0) in which FIG. 4A shows various aberrations without vibration reduction correction, and FIG. 4B shows coma with vibration reduction correction.

In respective graphs, FNO denotes the f-number, and A denotes a half angle of view (unit: degree). In the graph showing spherical aberration, f-number shows the value at the maximum aperture. In the graphs showing astigmatism and distortion, the maximum value of a half angle of view A is shown. In the graph showing coma, a half angle of view A is shown. In the graph showing astigmatism, a solid line indicates a sagittal image plane and a broken line indicates a meridional plane. The above-described explanation regarding various aberration graphs is the same as the other examples.

As is apparent from the respective graphs, the zoom lens system according to Example 1 shows superb optical performance as a result of good corrections to various aberrations in each focal length state (the wide-angle end state, the intermediate focal length state, and the telephoto end state).

EXAMPLE 2

FIG. 5 is a diagram showing a sectional view of a zoom lens system according to Example 2 of the first embodiment of the present invention.

In FIG. 5, the zoom lens system is composed of, in order from an object, a first lens group G1 having positive refractive power, a second lens group G2 having negative refractive power, a third lens group G3 having positive refractive power, and a fourth lens group G4 having positive refractive power. When the state of lens group positions varies from a wide-angle end state to a telephoto end state, the first lens group G1 through the fourth lens group G4 move such that a distance between the first lens group G1 and the second lens group G2 increases, a distance between the second lens group G2 and the third lens group G3 decreases, and a distance between the third lens group G3 and the fourth lens group G4 decreases. The reference symbol I denotes the image plane.

The third lens group G3 is composed of, in order from the object, a third A lens group 3A having positive refractive power, a third B lens group 3B having positive refractive power, and a third C lens group 3C having negative refractive power. The image can be shifted by moving the third B lens group 3B as a shift lens group perpendicularly to the optical axis.

The first lens group G1 is composed of a cemented lens constructed by a negative meniscus lens L11 having a convex surface facing to the object cemented with a double convex positive lens L12 and a positive meniscus lens L13 having a convex surface facing to the object.

The second lens group G2 is composed of a negative meniscus lens L21 having a convex surface facing to the object, a double concave negative lens L22, a double convex positive lens L23, and a double concave negative lens L24.

The third A lens group 3A is composed of a double convex positive lens L31, and a cemented lens constructed by a double convex positive lens L32 and a double concave negative lens L33. The third B lens group 3B is composed of a cemented lens constructed by a double convex positive lens L34 and a negative meniscus lens L35 having a concave surface facing to the object. The third C lens group 3C is composed of a double concave negative lens L36.

The fourth lens group G4 is composed of a double convex positive lens L41, and a cemented lens constructed by a positive meniscus lens L42 having a concave surface facing to the object and a double concave negative lens L43.

The aperture stop S is arranged in the vicinity of the most object side lens surface of the third lens group G3 and moved together with the third lens group G3 upon zooming.

Various values of a zoom lens system according to Example 2 are shown below in Table 2.

TABLE 2

[Specifications]

| | Wide-angle | Intermediate | Telephoto |
|---|---|---|---|
| f = | 29.207 | 115.150 | 349.995 mm |
| 2ω = | 75.8 | 20.5 | 6.9° |
| FNO = | 3.6 | 6.0 | 6.7 |

[Lens Data]

| Surface Number | r | d | ν | n |
|---|---|---|---|---|
| 1 | 95.2158 | 2.000 | 28.56 | 1.79504 |
| 2 | 62.6157 | 8.200 | 82.52 | 1.49782 |
| 3 | −924.0888 | 0.100 | | |
| 4 | 73.6118 | 5.000 | 82.52 | 1.49782 |
| 5 | 303.8324 | D1 | | |
| 6 | 119.3054 | 0.200 | 38.09 | 1.55389 |
| 7 | 100.0000 | 1.200 | 49.61 | 1.77250 |
| 18 | 18.8047 | 6.417 | | |
| 19 | −48.2046 | 1.000 | 42.72 | 1.83481 |
| 10 | 65.6505 | 0.100 | | |
| 11 | 34.8008 | 4.800 | 22.76 | 1.80809 |
| 12 | −44.4934 | 1.000 | | |
| 13 | −24.5572 | 1.000 | 49.61 | 1.77250 |
| 14 | 1817.3930 | D2 | | |
| 15 | 0.0000 | 0.500 | | (Aperture Stop S) |
| 16 | 27.1464 | 4.500 | 55.52 | 1.69680 |
| 17 | −150.2724 | 0.100 | | |
| 18 | 26.8350 | 5.000 | 82.52 | 1.49782 |
| 19 | −46.9911 | 1.000 | 37.17 | 1.83400 |

TABLE 2-continued

| 20 | 38.4531 | 3.000 | | |
| 21 | 45.1473 | 3.800 | 49.52 | 1.74442 |
| 22 | −68.3823 | 1.000 | 23.78 | 1.84666 |
| 23 | −181.6270 | 2.000 | | |
| 24 | −36.5030 | 1.000 | 42.72 | 1.83481 |
| 25 | 357.3702 | D3 | | |
| 26 | 60.3036 | 4.200 | 55.52 | 1.69680 |
| 27 | −24.3217 | 0.100 | | |
| 28 | −83.5169 | 5.500 | 33.80 | 1.64769 |
| 29 | −13.7618 | 1.000 | 42.72 | 1.83481 |
| 30 | 144.8077 | BF | | |

[Aspherical Data]

Surface Number 6

κ = 40.8477
C4 = 8.7927E−07
C6 = −1.6679E−09
C8 = −7.6432E−12
C10 = 1.0148E−13

Surface Number 21

κ = 0.3574
C4 = −3.3903E−06
C6 = 9.1445E−09
C8 = −2.4850E−11
C10 = 0.0000E−00

Surface Number 26

κ = −0.5113
C4 = −8.1127E−06
C6 = −3.1018E−08
C8 = 1.8406E−10
C10 = 0.0000E−00

Surface Number 27

κ = 2.0550
C4 = 2.1909E−05
C6 = −1.2389E−08
C8 = 2.0864E−10
C10 = 0.000E−00

[Variable Intervals]

| | Wide-angle | Intermediate | Telephoto |
|---|---|---|---|
| f = | 29.207 | 115.150 | 349.995 |
| D1 = | 1.400 | 38.416 | 62.500 |
| D2 = | 27.734 | 12.761 | 2.089 |
| D3 = | 5.892 | 1.846 | 0.970 |
| BF = | 43.781 | 86.842 | 112.269 |

[Various Values upon Shifting]

| | Wide-angle | Intermediate | Telephoto |
|---|---|---|---|
| f = | 29.207 | 115.150 | 349.995 |
| Lens Shift | 0.250 | 0.350 | 0.450 |
| Image Shift | 0.296 | 0.724 | 1.178 |

[Values for Conditional Expressions]

(1) DT/ft = 0.179

(2) $(1 − \beta A) \times \beta B$ = 1.2 (Wide-angle end state)
= 2.1 (Intermediate focal length state)
= 2.6 (Telephoto end state)

Figure 8A:
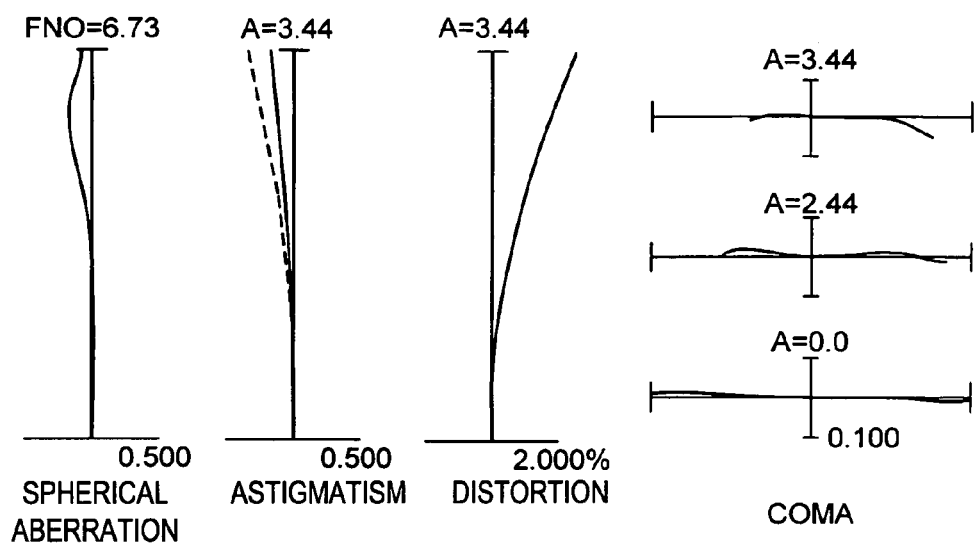
Figure 8B:
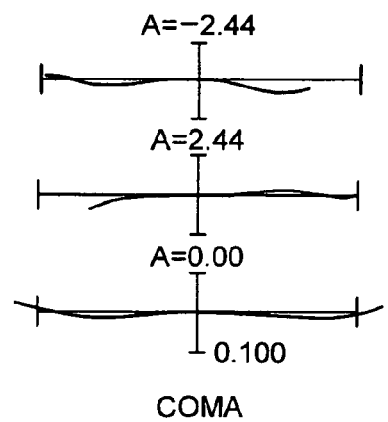

FIGS. 6A, 6B through 8A, 8B are graphs showing various aberrations of the zoom lens system according to Example 2 of the first embodiment of the present invention focusing at infinity at d-line (λ=587.6 nm). FIGS. 6A and 6B graphically show various aberrations in a wide-angle end state (f=29.2) in which FIG. 6A shows various aberrations without vibration reduction correction, and FIG. 6B shows coma with vibration reduction correction. FIGS. 7A and 7B graphically show various aberrations in an intermediate focal length state (f=115.2) in which FIG. 7A shows various aberrations without vibration reduction correction, and FIG. 7B shows coma with vibration reduction correction. FIGS. 8A and 8B graphically show various aberrations in a telephoto end state (f=350.0) in which FIG. 8A shows various aberrations without vibration reduction correction, and FIG. 8B shows coma with vibration reduction correction.

As is apparent from the respective graphs, the zoom lens system according to Example 2 shows superb optical performance as a result of good corrections to various aberrations in each focal length state (the wide-angle end state, the intermediate focal length state, and the telephoto end state).

EXAMPLE 3

Figure 9:
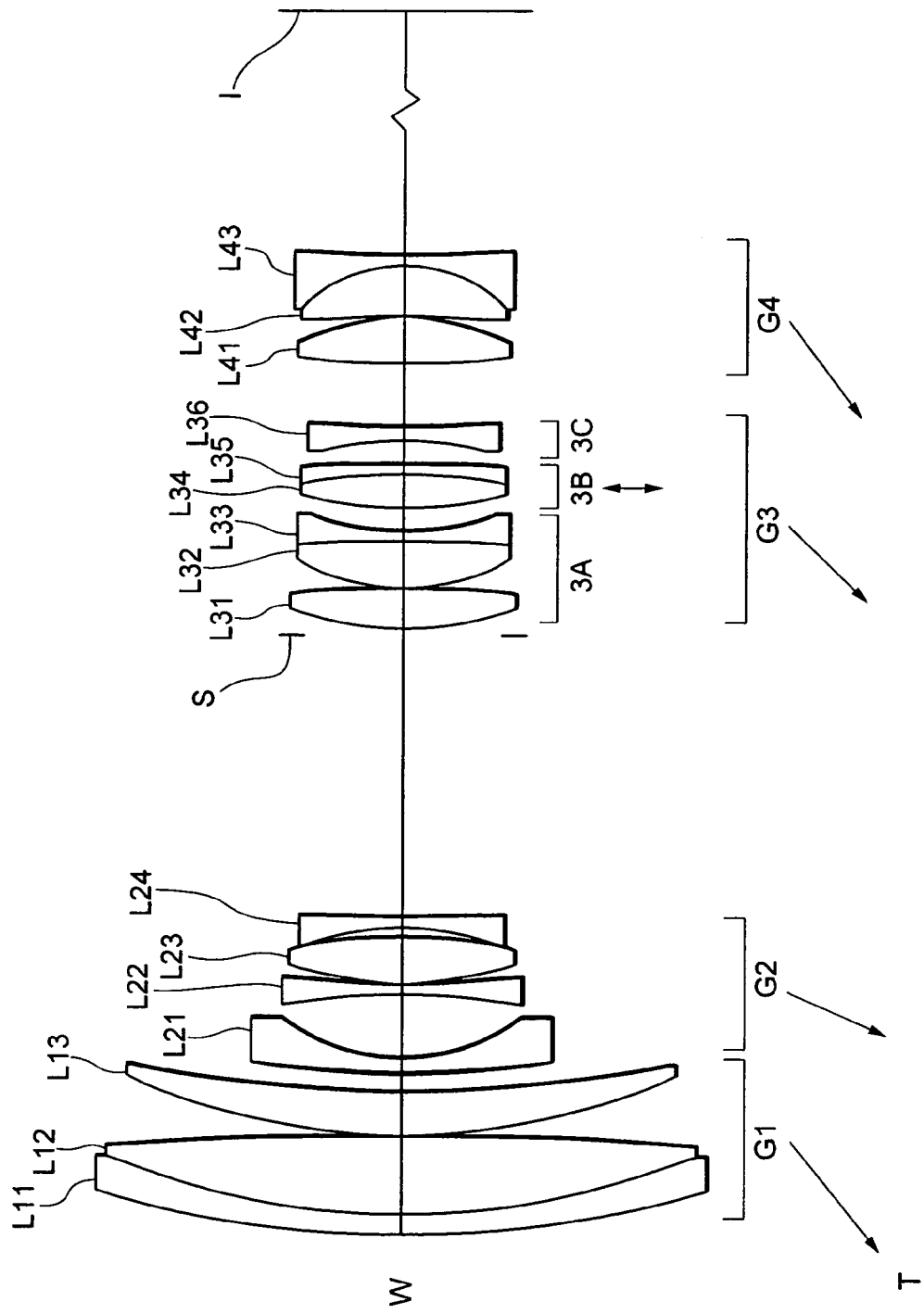
FIG. 9 is a diagram showing a sectional view of a zoom lens system according to Example 3 of the first embodiment of the present invention.

FIG. 9 is a diagram showing a sectional view of a zoom lens system according to Example 3 of the first embodiment of the present invention.

In FIG. 9, the zoom lens system is composed of, in order from an object, a first lens group G1 having positive refractive power, a second lens group G2 having negative refractive power, a third lens group G3 having positive refractive power, and a fourth lens group G4 having positive refractive power. When the state of lens group positions varies from a wide-angle end state to a telephoto end state, the first lens group G1 through the fourth lens group G4 move such that a distance between the first lens group G1 and the second lens group G2 increases, a distance between the second lens group G2 and the third lens group G3 decreases, and a distance between the third lens group G3 and the fourth lens group G4 decreases. The reference symbol I denotes the image plane.

The third lens group G3 is composed of, in order from the object, a third A lens group 3A having positive refractive power, a third B lens group 3B having positive refractive power, and a third C lens group 3C having negative refractive power. The image can be shifted by moving the third B lens group 3B as a shift lens group perpendicularly to the optical axis.

The first lens group G1 is composed of a cemented lens constructed by a negative meniscus lens L11 having a convex surface facing to the object cemented with a double convex positive lens L12 and a positive meniscus lens L13 having a convex surface facing to the object.

The second lens group G2 is composed of a negative meniscus lens L21 having a convex surface facing to the object, a double concave negative lens L22, a double convex positive lens L23, and a double concave negative lens L24.

The third A lens group 3A is composed of a double convex positive lens L31, and a cemented lens constructed by a double convex positive lens L32 and a double concave negative lens L33. The third B lens group 3B is composed of a cemented lens constructed by a double convex positive lens L34 and a negative meniscus lens L35 having a concave surface facing to the object. The third C lens group 3C is composed of a double concave negative lens L36.

The fourth lens group G4 is composed of a double convex positive lens L41, and a cemented lens constructed by a positive meniscus lens L42 having a concave surface facing to the object and a double concave negative lens L43.

The aperture stop S is arranged in the vicinity of the most object side lens surface of the third lens group G3 and moved together with the third lens group G3 upon zooming.

Various values of a zoom lens system according to Example 3 are shown below in Table 3.

TABLE 3

[Specifications]

| Wide-angle | Intermediate | Telephoto |
|---|---|---|
| f = 30.785 | 100.428 | 260.003 mm |
| 2ω = 73.0 | 23.4 | 9.2° |
| FNO = 3.6 | 5.2 | 6.2 |

[Lens Data]

| Surface Number | r | d | ν | n |
|---|---|---|---|---|
| 1 | 113.0938 | 2.000 | 23.78 | 1.84666 |
| 2 | 77.8725 | 7.500 | 82.52 | 1.49782 |
| 3 | −392.0046 | 0.100 | | |
| 4 | 63.1691 | 4.500 | 82.52 | 1.49782 |
| 5 | 144.9233 | D1 | | |
| 6 | 187.1436 | 0.200 | 38.09 | 1.55389 |
| 7 | 160.7200 | 1.200 | 49.61 | 1.77250 |
| 8 | 19.5404 | 6.200 | | |
| 9 | −57.2837 | 1.000 | 42.72 | 1.83481 |
| 10 | 89.0734 | 0.100 | | |
| 11 | 35.5271 | 4.500 | 23.78 | 1.84666 |
| 12 | −48.5191 | 1.000 | | |
| 13 | −27.5498 | 1.000 | 49.61 | 1.77250 |
| 14 | 274.0976 | D2 | | |
| 15 | 0.0000 | 0.500 | | (Aperture Stop S) |
| 16 | 30.0000 | 4.000 | 55.34 | 1.67790 |
| 17 | −79.6551 | 0.100 | | |
| 18 | 21.4733 | 4.500 | 82.52 | 1.49782 |
| 19 | −131.3788 | 1.000 | 37.17 | 1.83400 |
| 20 | 29.5229 | 2.500 | | |
| 21 | 46.6074 | 3.200 | 49.52 | 1.74442 |
| 22 | −50.5322 | 1.000 | 23.78 | 1.84666 |
| 23 | −178.5738 | 2.500 | | |
| 24 | −27.8094 | 1.000 | 42.72 | 1.83481 |
| 25 | 143.2554 | D3 | | |
| 26 | 87.3995 | 4.500 | 55.34 | 1.67790 |
| 27 | −21.0343 | 0.200 | | |
| 28 | −102.6584 | 5.000 | 34.47 | 1.63980 |
| 29 | −14.3797 | 1.000 | 42.72 | 1.83481 |
| 30 | 459.5424 | BF | | |

[Aspherical Data]

Surface Number 6

κ = 1.0000
C4 = 3.4488E−06
C6 = 3.5836E−09
C8 = −1.8482E−11
C10 = 1.2823E−13

Surface Number 21

κ = 5.3475
C4 = 3.9544E−06
C6 = −2.1153E−09
C8 = 1.2308E−11
C10 = 1.8147E−13

Surface Number 26

κ = −18.7137
C4 = 9.3928E−06
C6 = 7.6348E−09
C8 = 1.4059E−10
C10 = 0.0000E−00

Surface Number 27

κ = 0.7025
C4 = 4.8101E−06
C6 = −1.1899E−08
C8 = 1.9145E−10
C10 = 3.9880E−13

[Variable Intervals]

| Wide-angle | Intermediate | Telephoto |
|---|---|---|

TABLE 3-continued

| | | |
|---|---|---|
| f = 30.785 | 100.428 | 260.003 |
| D1 = 1.791 | 38.386 | 61.905 |
| D2 = 28.018 | 13.045 | 2.372 |
| D3 = 6.467 | 2.421 | 1.544 |
| BF = 42.136 | 72.054 | 90.192 |

[Various Values upon Shifting]

| | Wide-angle | Intermediate | Telephoto |
|---|---|---|---|
| f = | 30.785 | 100.428 | 260.003 |
| Lens Shift | 0.250 | 0.350 | 0.450 |
| Image Shift | 0.268 | 0.574 | 0.902 |

[Values for Conditional Expressions]

(1) $DT/ft = 0.238$ (2) $(1 - \beta A) \times \beta B = 1.1$ (Wide-angle end state)
= 1.9 (Intermediate focal length state)
= 2.3 (Telephoto end state)

Figure 10A:
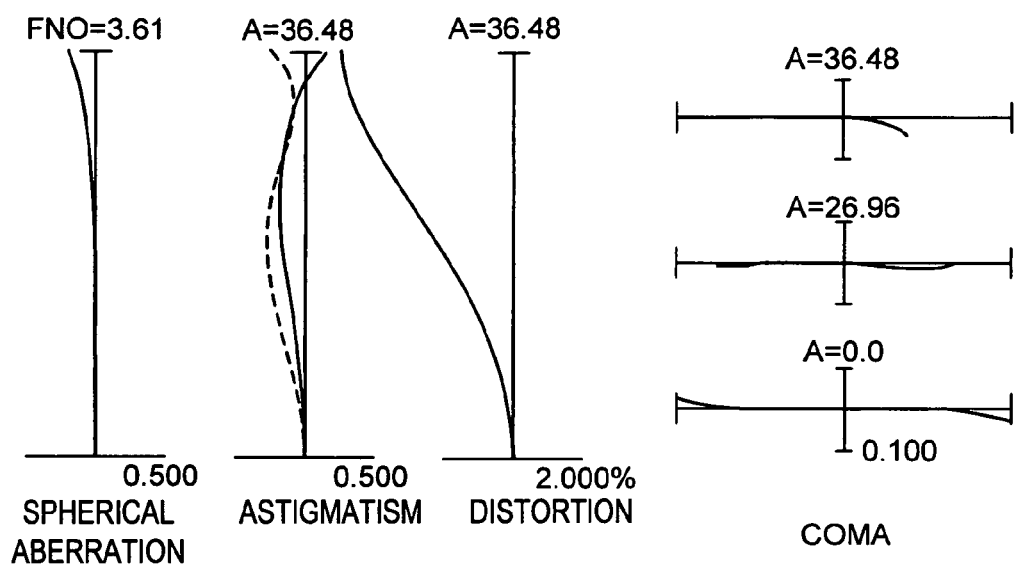
Figure 10B:
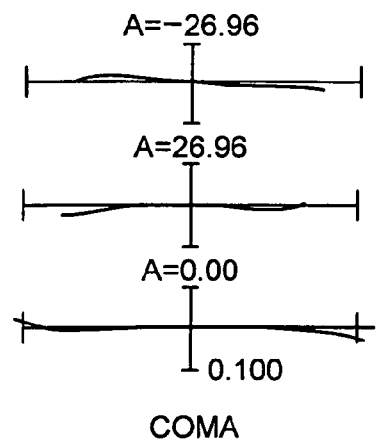
Figure 11A:
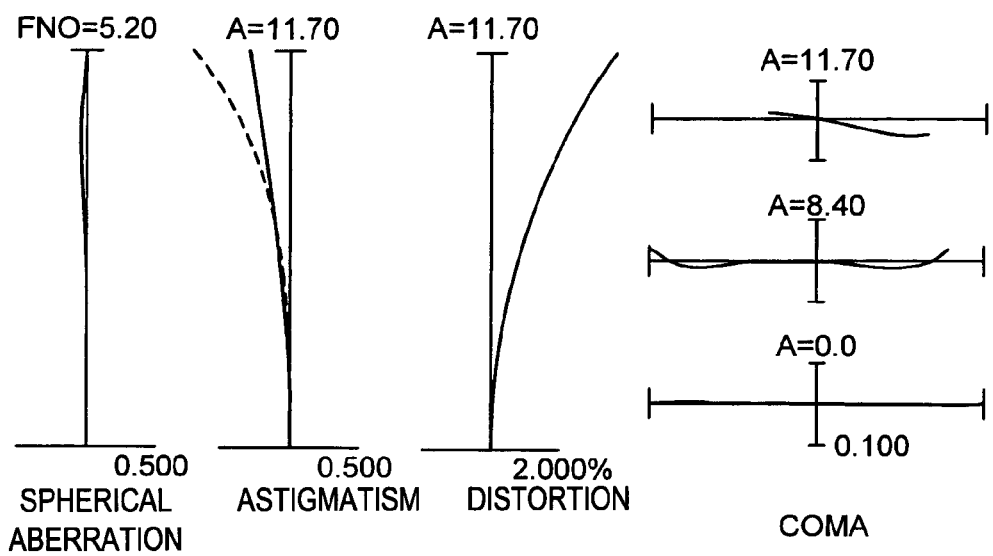
FIG. 11A shows various aberrations without vibration reduction correction.
Figure 11B:
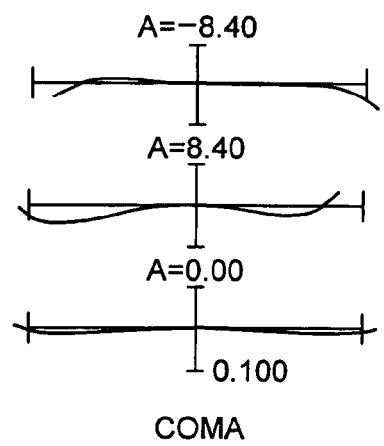

FIGS. 10A, 10B through 12A, 12B are graphs showing various aberrations of the zoom lens system according to Example 3 of the first embodiment of the present invention focusing at infinity at d-line (λ=587.6 nm). FIGS. 10A and 10B graphically show various aberrations in a wide-angle end state (f=30.8) in which FIG. 10A shows various aberrations without vibration reduction correction, and FIG. 10B show coma with vibration reduction correction. FIGS. 11A and 11B graphically show various aberrations in an intermediate focal length state (f=100.4) in which FIG. 11A shows various aberrations without vibration reduction correction, and FIG. 11B shows coma with vibration reduction correction. FIGS. 12A and 12B graphically show various aberrations in a telephoto end state (f=260.0) in which FIG. 12A shows various aberrations without vibration reduction correction, and FIG. 12B shows coma with vibration reduction correction.

As is apparent from the respective graphs, the zoom lens system according to Example 3 shows superb optical performance as a result of good corrections to various aberrations in each focal length state (the wide-angle end state, the intermediate focal length state, and the telephoto end state).

EXAMPLE 4

Figure 13:
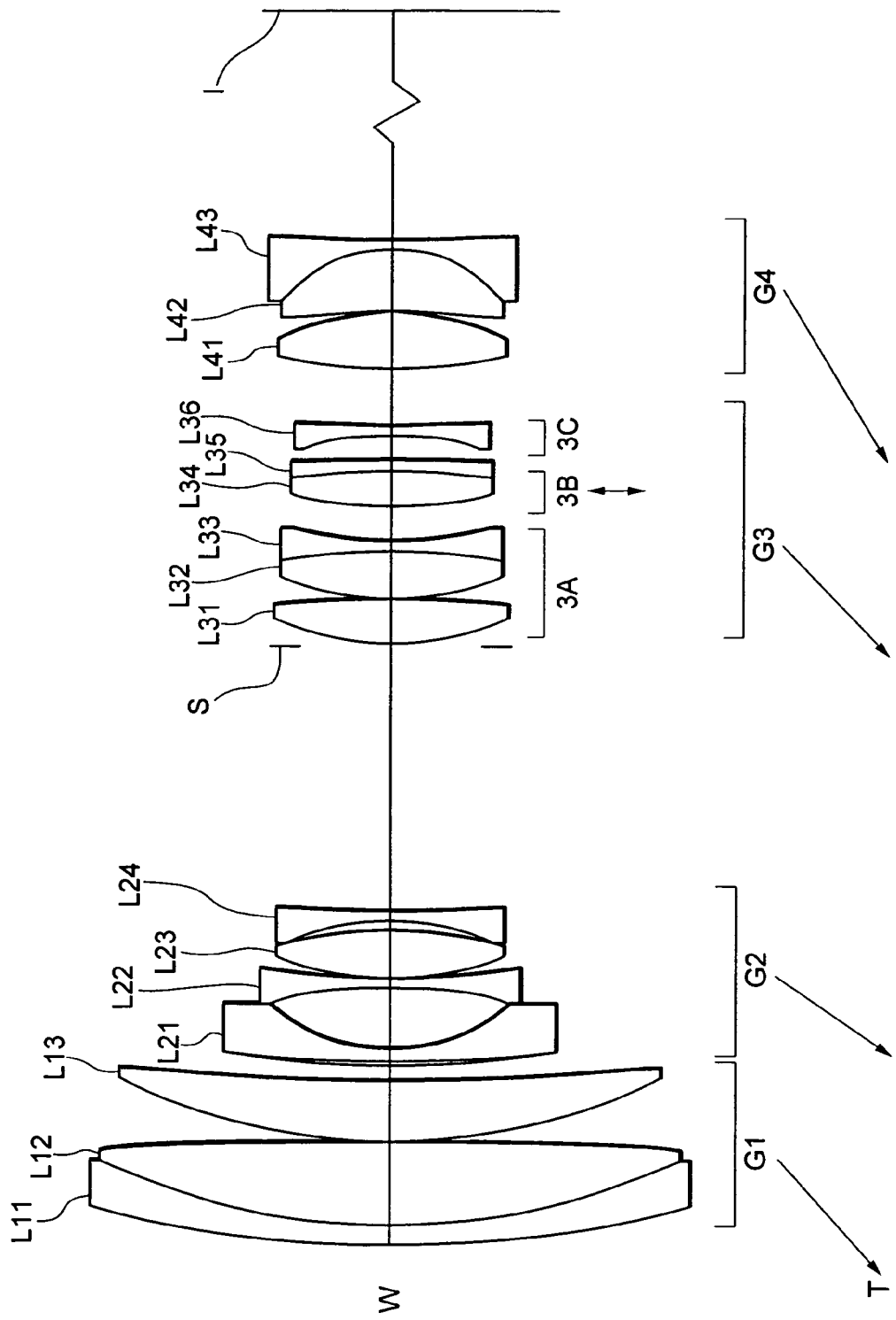
FIG. 13 is a diagram showing a sectional view of a zoom lens system according to Example 4 of the first embodiment of the present invention.
Figure 15A:
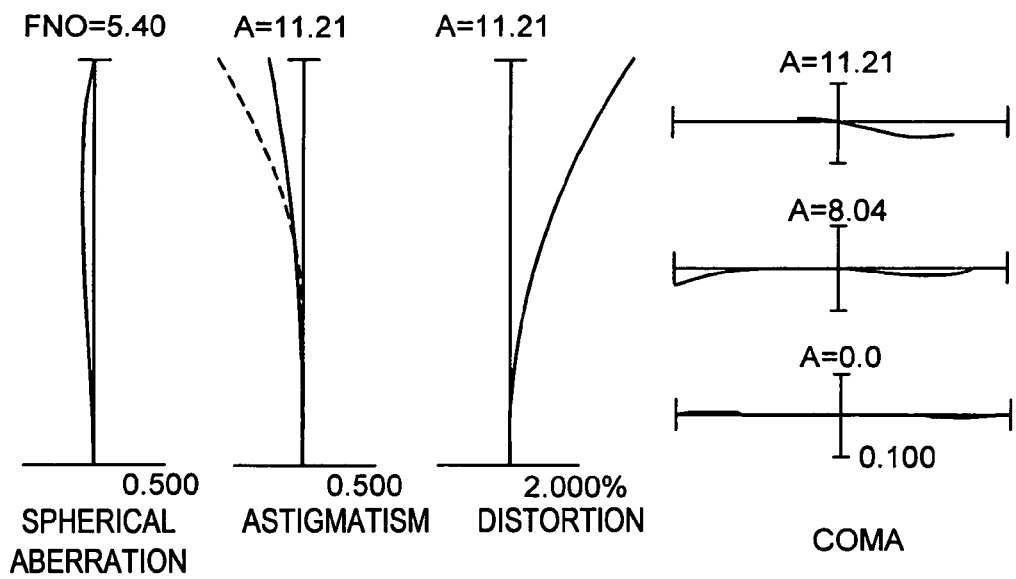
Figure 15B:
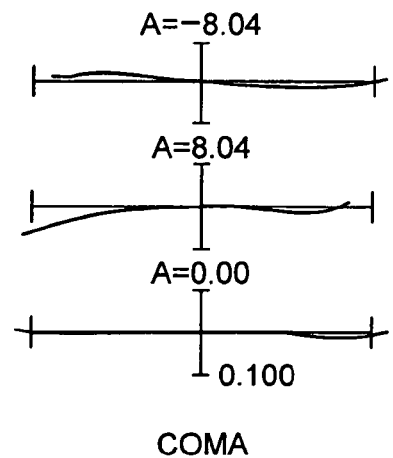

FIG. 13 is a diagram showing a sectional view of a zoom lens system according to Example 4 of a first embodiment of the present invention.

In FIG. 13, the zoom lens system is composed of, in order from an object, a first lens group G1 having positive refractive power, a second lens group G2 having negative refractive power, a third lens group G3 having positive refractive power, and a fourth lens group G4 having positive refractive power. When the state of lens group positions varies from a wide-angle end state to a telephoto end state, the first lens group G1 through the fourth lens group G4 move such that a distance between the first lens group G1 and the second lens group G2 increases, a distance between the second lens group G2 and the third lens group G3 decreases, and a distance between the third lens group G3 and the fourth lens group G4 decreases. The reference symbol I denotes the image plane.

The third lens group G3 is composed of, in order from the object, a third A lens group 3A having positive refractive power, a third B lens group 3B having positive refractive power, and a third C lens group 3C having negative refractive power. The image can be shifted by moving the third B lens group 3B as a shift lens group perpendicularly to the optical axis.

The first lens group G1 is composed of a cemented lens constructed by a negative meniscus lens L11 having a convex surface facing to the object cemented with a double convex positive lens L12 and a positive meniscus lens L13 having a convex surface facing to the object.

The second lens group G2 is composed of a negative meniscus lens L21 having a convex surface facing to the object, a double concave negative lens L22, a double convex positive lens L23, and a double concave negative lens L24.

The third A lens group 3A is composed of a double convex positive lens L31, and a cemented lens constructed by a double convex positive lens L32 and a double concave negative lens L33. The third B lens group 3B is composed of a cemented lens constructed by a double convex positive lens L34 and a negative meniscus lens L35 having a concave surface facing to the object. The third C lens group 3C is composed of a double concave negative lens L36.

The fourth lens group G4 is composed of a double convex positive lens L41, and a cemented lens constructed by a positive meniscus lens L42 having a concave surface facing to the object and a double concave negative lens L43.

The aperture stop S is arranged in the vicinity of the most object side lens surface of the third lens group G3 and moved together with the third lens group G3 upon zooming.

Various values of a zoom lens system according to Example 4 are shown below in Table 4.

TABLE 4

[Specifications]

| | Wide-angle | Intermediate | Telephoto |
|---|---|---|---|
| f = | 29.000 | 105.000 | 283.000 mm |
| 2ω = | 76.0 | 22.4 | 8.3° |
| FNO = | 3.6 | 5.4 | 5.9 |

[Lens Data]

| Surface Number | r | d | ν | n |
|---|---|---|---|---|
| 1 | 126.4186 | 2.000 | 32.35 | 1.85026 |
| 2 | 70.0034 | 8.500 | 82.52 | 1.49782 |
| 3 | −481.5412 | 0.100 | | |
| 4 | 61.9364 | 6.300 | 82.52 | 1.49782 |
| 5 | 326.2642 | D1 | | |
| 6 | 206.3466 | 0.200 | 38.09 | 1.55389 |
| 7 | 155.0000 | 1.200 | 49.61 | 1.77250 |
| 8 | 19.2055 | 6.400 | | |
| 9 | −48.3934 | 1.000 | 42.72 | 1.83481 |
| 10 | 89.2606 | 0.100 | | |
| 11 | 36.1705 | 4.800 | 23.78 | 1.84666 |
| 12 | −41.8254 | 1.000 | | |
| 13 | −25.8295 | 1.000 | 49.61 | 1.77250 |
| 14 | 197.7146 | D2 | | |
| 15 | 0.0000 | 0.500 | | (Aperture Stop S) |
| 16 | 28.1052 | 4.500 | 55.34 | 1.67790 |
| 17 | −110.1068 | 0.100 | | |
| 18 | 27.8213 | 5.000 | 82.52 | 1.49782 |
| 19 | −58.2729 | 1.000 | 37.17 | 1.83400 |
| 20 | 41.8777 | 3.800 | | |
| 21 | 42.5913 | 3.800 | 49.16 | 1.74001 |
| 22 | −57.2086 | 1.000 | 23.78 | 1.84666 |
| 23 | −230.3293 | 2.700 | | |
| 24 | −30.2739 | 1.000 | 42.7 | 21.83481 |
| 25 | 217.1532 | D3 | | |
| 26 | 55.2978 | 5.800 | 54.6 | 11.67440 |
| 27 | −24.3191 | 0.150 | | |

TABLE 4-continued

| 28 | −82.9547 | 6.500 | 34.47 | 1.63980 |
| 29 | −14.5022 | 1.000 | 42.72 | 1.83481 |
| 30 | 499.5854 | BF | | |

[Aspherical Data]

Surface Number 6

κ = 1.0000
C4 = 4.0183E−06
C6 = 4.0686E−09
C8 = −2.4754E−11
C10 = 1.50995−13

Surface Number 21

κ = 0.4310
C4 = 1.3165E−07
C6 = 4.2138E−09
C8 = 3.4757E−11
C10 = 1.0724E−13

Surface Number 26

κ = −12.7409
C4 = 9.5672E−07
C6 = −4.9808E−09
C8 = 1.4920E−10
C10 = 0.0000E−00

Surface Number 27

K = 0.1485
C4 = 5.5835E−06
C6 = 1.4084E−08
C8 = 2.1151E−10
C10 = 4.0383E−13

[Variable Intervals]

|  | Wide-angle | Intermediate | Telephoto |
|---|---|---|---|
| f = | 29.000 | 105.000 | 288.000 |
| D1 = | 1.813 | 16.856 | 61.926 |
| D2 = | 27.746 | 19.801 | 2.100 |
| D3 = | 5.887 | 3.883 | 0.965 |
| BF = | 39.504 | 54.503 | 89.559 |

[Various Values upon Shifting]

|  | Wide-angle | Intermediate | Telephoto |
|---|---|---|---|
| f = | 29.000 | 105.000 | 288.000 |
| Lens Shift | 0.250 | 0.350 | 0.450 |
| Image Shift | 0.277 | 0.632 | 0.960 |

[Values for Conditional Expressions]

(1) DT/ft = 0.179

(2) $(1 - \beta A) \times \beta B = 1.1$ (Wide-angle end state)

= 1.8 (Intermediate focal length state)

= 2.1 (Telephoto end state)

Figure 16A:
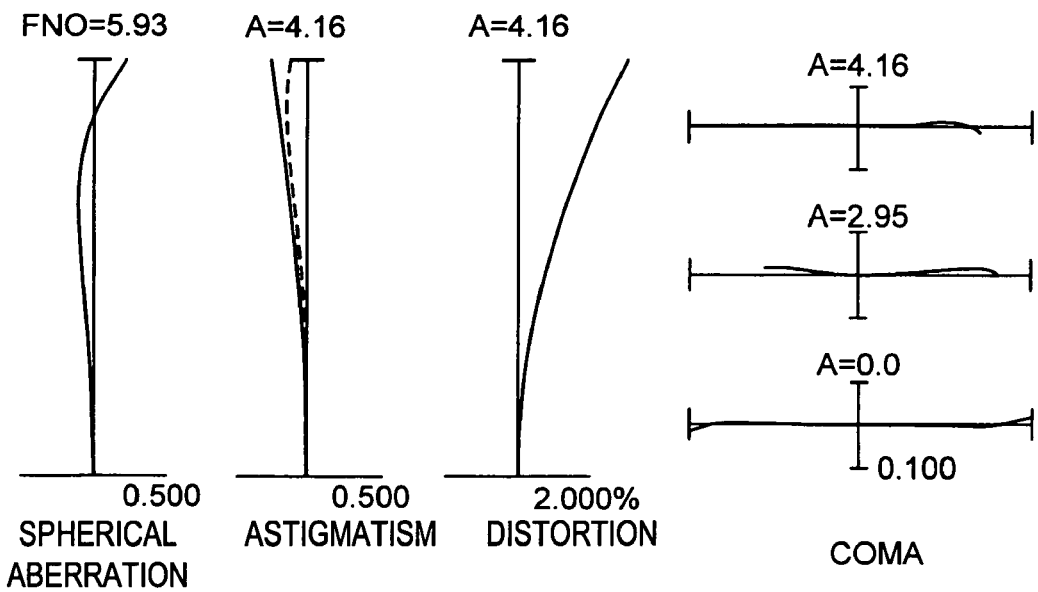
Figure 16B:
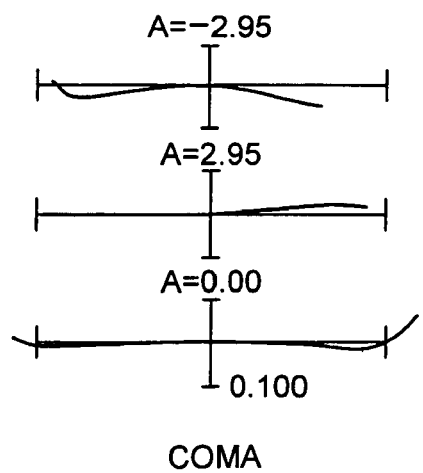

FIGS. 14A, 14B through 16A, 16BB are graphs showing various aberrations of the zoom lens system according to Example 4 of the first embodiment of the present invention focusing at infinity at d-line (λ=587.6 nm). FIGS. 14A and 14B graphically show various aberrations in a wide-angle end state (f=29.0) in which FIG. 14A shows various aberrations without vibration reduction correction, and FIG. 14B shows coma with vibration reduction correction. FIGS. 15A and 15B graphically show various aberrations in an intermediate focal length state (f=105.0) in which FIG. 15A shows various aberrations without vibration reduction correction, and FIG. 15B shows coma with vibration reduction correction. FIGS. 16A and 16B graphically show various aberrations in a telephoto end state (f=288.0) in which FIG. 16A shows various aberrations without vibration reduction correction, and FIG. 16B shows coma with vibration reduction correction.

As is apparent from the respective graphs, the zoom lens system according to Example 4 shows superb optical performance as a result of good corrections to various aberrations in each focal length state (the wide-angle end state, the intermediate focal length state, and the telephoto end state).

EXAMPLE 5

Figure 17:
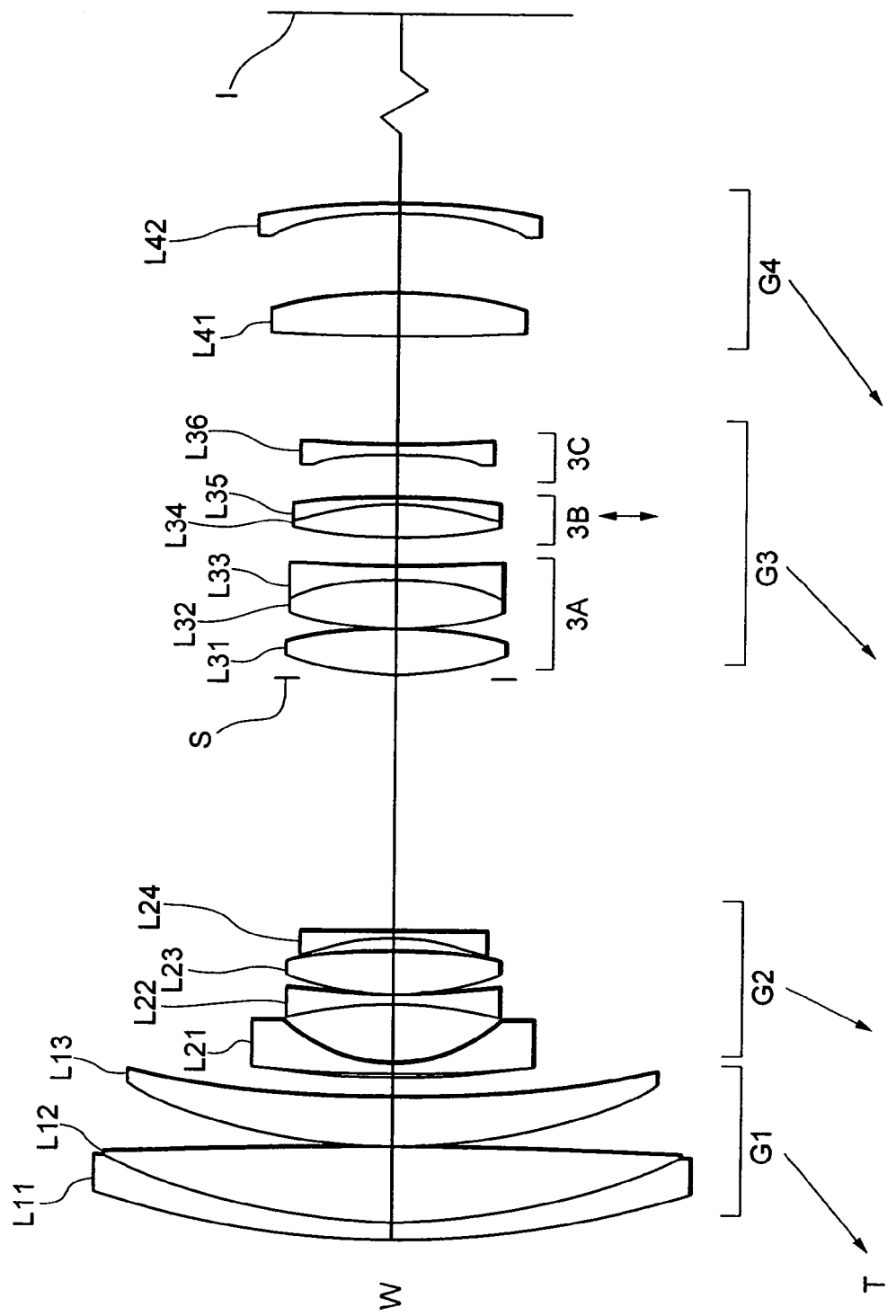
FIG. 17 is a diagram showing a sectional view of a zoom lens system according to Example 5 of the first embodiment of the present invention.

FIG. 17 is a diagram showing a sectional view of a zoom lens system according to Example 5 of the first embodiment of the present invention.

In FIG. 17, the zoom lens system is composed of, in order from an object, a first lens group G1 having positive refractive power, a second lens group G2 having negative refractive power, a third lens group G3 having positive refractive power, and a fourth lens group G4 having positive refractive power. When the state of lens group positions varies from a wide-angle end state to a telephoto end state, the first lens group G1 through the fourth lens group G4 move such that a distance between the first lens group G1 and the second lens group G2 increases, a distance between the second lens group G2 and the third lens group G3 decreases, and a distance between the third lens group G3 and the fourth lens group G4 decreases. The reference symbol I denotes the image plane.

The third lens group G3 is composed of, in order from the object, a third A lens group 3A having positive refractive power, a third B lens group 3B having positive refractive power, and a third C lens group 3C having negative refractive power. The image can be shifted by moving the third B lens group 3B as a shift lens group perpendicularly to the optical axis.

The first lens group G1 is composed of a cemented lens constructed by a negative meniscus lens L11 having a convex surface facing to the object cemented with a double convex positive lens L12 and a positive meniscus lens L13 having a convex surface facing to the object.

The second lens group G2 is composed of a negative meniscus lens L21 having a convex surface facing to the object, a double concave negative lens L22, a double convex positive lens L23, and a double concave negative lens L24.

The third A lens group 3A is composed of a double convex positive lens L31, and a cemented lens constructed by a double convex positive lens L32 and a double concave negative lens L33. The third B lens group 3B is composed of a cemented lens constructed by a double convex positive lens L34 and a negative meniscus lens L35 having a concave surface facing to the object. The third C lens group 3C is composed of a double concave negative lens L36.

The fourth lens group G4 is composed of a double convex positive lens L41, and a negative meniscus lens L42 having a concave surface facing to the object.

The aperture stop S is arranged in the vicinity of the most object side lens surface of the third lens group G3 and moved together with the third lens group G3 upon zooming.

Various values of a zoom lens system according to Example 5 are shown below in Table 5.

TABLE 5

[Specifications]

| Wide-angle | Intermediate | Telephoto |
|---|---|---|
| f = 28.743 | 99.628 | 289.713 mm |
| 2ω = 77.0 | 23.7 | 8.3° |
| FNO = 3.5 | 5.4 | 6.3 |

[Lens Data]

| Surface Number | r | d | ν | n |
|---|---|---|---|---|
| 1 | 94.4674 | 1.900 | 23.78 | 1.84666 |
| 2 | 67.7698 | 7.500 | 81.61 | 1.49700 |
| 3 | −529.7017 | 0.100 | | |
| 4 | 60.3188 | 4.800 | 81.61 | 1.49700 |
| 5 | 135.6483 | D1 | | |
| 6 | 111.7769 | 0.200 | 38.09 | 1.55389 |
| 7 | 105.1950 | 1.150 | 49.61 | 1.77250 |
| 8 | 16.3778 | 5.800 | | |
| 9 | −44.8931 | 1.000 | 46.63 | 1.81600 |
| 10 | 98.5517 | 0.100 | | |
| 11 | 32.0133 | 4.200 | 22.76 | 1.80809 |
| 12 | −49.2124 | 1.100 | | |
| 13 | −27.3224 | 0.900 | 42.72 | 1.83481 |
| 14 | 1744.7263 | D2 | | |
| 15 | 0.0000 | 0.500 | | (Aperture Stop S) |
| 16 | 32.4669 | 4.500 | 64.14 | 1.51633 |
| 17 | −42.3952 | 0.100 | | |
| 18 | 37.5370 | 5.000 | 81.61 | 1.49700 |
| 19 | −27.2467 | 1.000 | 37.17 | 1.83400 |
| 20 | 159.3545 | 3.000 | | |
| 21 | 60.0000 | 3.500 | 58.54 | 1.65160 |
| 22 | −27.9361 | 0.800 | 46.63 | 1.81600 |
| 23 | −57.3368 | 4.200 | | |
| 24 | −36.9720 | 0.800 | 54.66 | 1.72916 |
| 25 | 120.8635 | D3 | | |
| 26 | 150.0000 | 4.500 | 55.18 | 1.66547 |
| 27 | −39.3664 | 8.000 | | |
| 28 | −40.0000 | 1.000 | 54.66 | 1.72916 |
| 29 | 62.5642 | BF | | |

[Aspherical Data]

Surface Number 6

κ = 6.0000
C4 = 2.1440E−06
C6 = 2.0424E−09
C8 = −5.7444E−11
C10 = 2.0549E−13

Surface Number 16

κ = 0.4048
C4 = 1.6192E−06
C6 = 8.8809E−09
C8 = 0.0000E−00
C10 = 0.0000E−00

Surface Number 21

κ = 0.1975
C4 = 1.2413E−07
C6 = 4.8313E−09
C8 = 0.0000E−00
C10 = 0.0000E−00

Surface Number 27

κ = 0.2523
C4 = 7.8933E−07
C6 = 4.3698E−09
C8 = 1.0465E−11
C10 = 0.0000E−00

Surface Number 28

κ = 1.5241
C4 = −6.4146E−06
C6 = −1.2538E−08
C8 = 3.8377E−13

TABLE 5-continued

C10 = 0.0000E−00

[Variable Intervals]

| | Wide-angle | Intermediate | Telephoto |
|---|---|---|---|
| F = | 28.743 | 99.628 | 289.713 |
| D1 = | 2.160 | 36.094 | 61.516 |
| D2 = | 25.560 | 10.629 | 0.005 |
| D3 = | 11.051 | 3.584 | 2.629 |
| BF = | 37.502 | 75.686 | 91.283 |

[Various Values upon Shifting]

| | Wide-angle | Intermediate | Telephoto |
|---|---|---|---|
| F = | 28.743 | 99.628 | 289.713 |
| Lens Shift | 0.250 | 0.350 | 0.450 |
| Image Shift | 0.287 | 0.643 | 0.966 |

[Values for Conditional Expressions]

(1)    DT/ft = 0.212

(2)    $(1 - \beta A) \times \beta B = 1.1$ (Wide-angle end state)

= 1.8 (Intermediate focal length state)

= 2.1 (Telephoto end state)

Figure 18A:
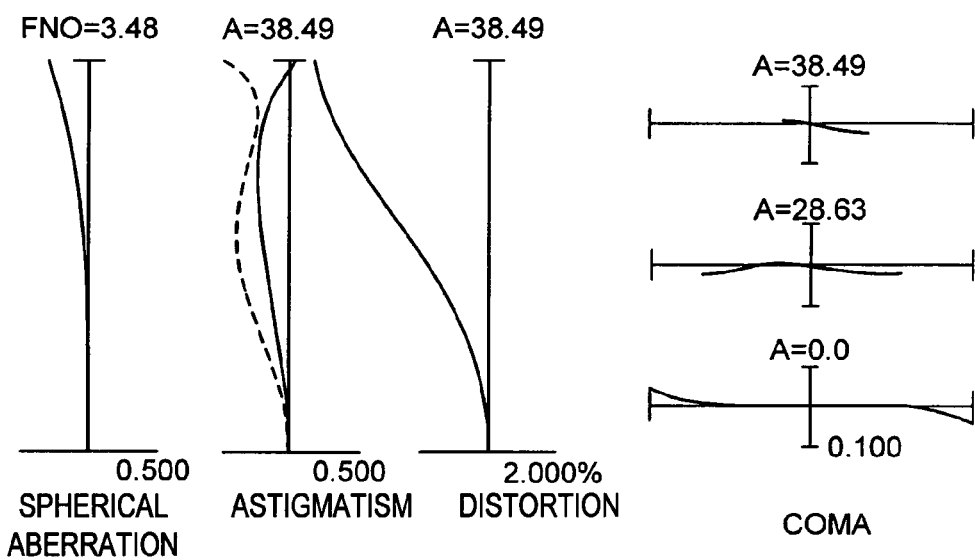
Figure 18B:
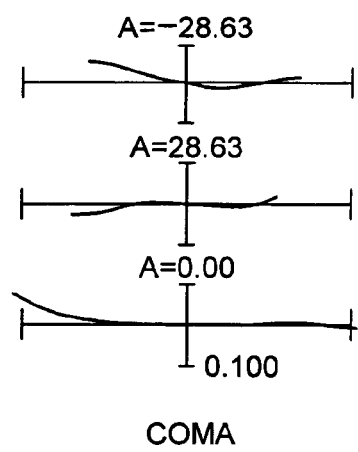
Figure 19A:
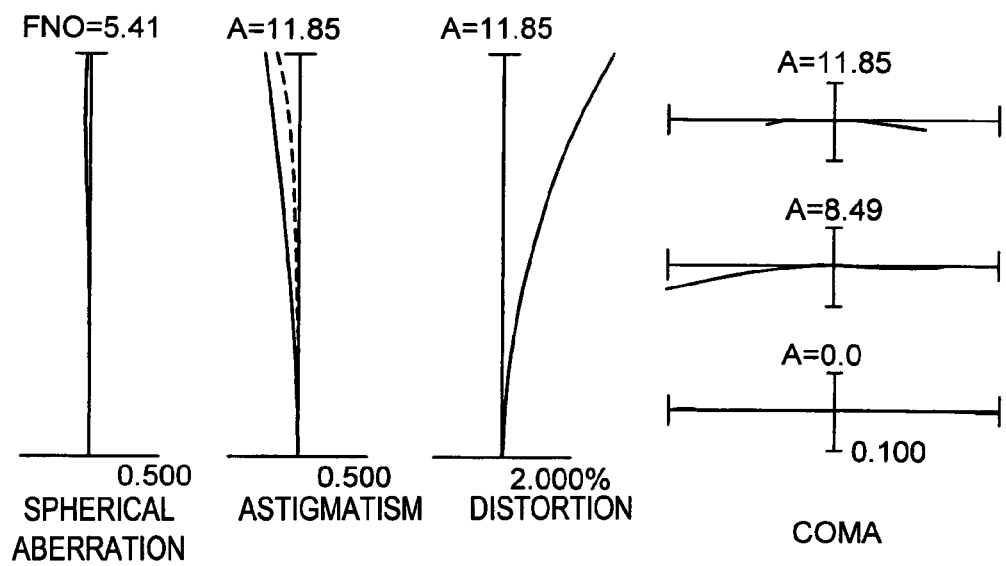
Figure 19B:
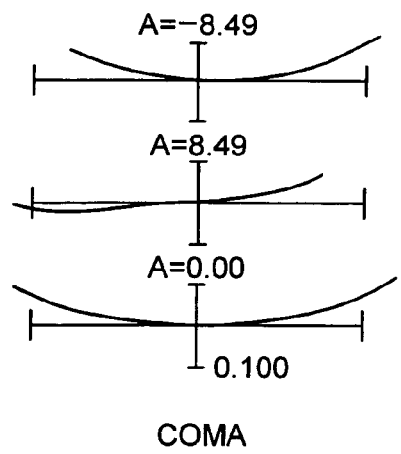
Figure 20A:
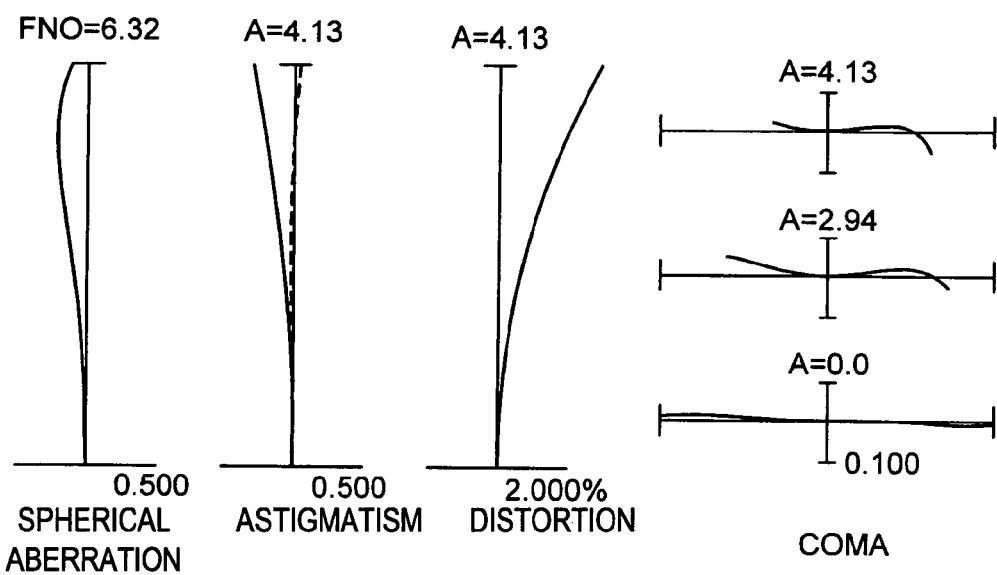
Figure 20B:
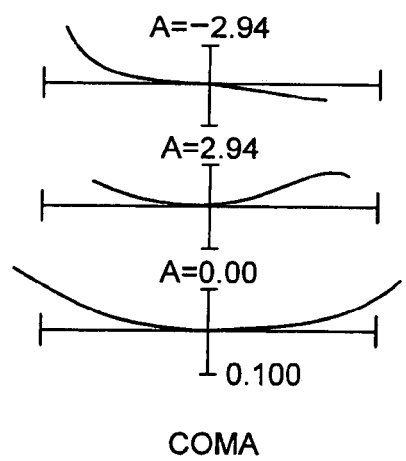

FIGS. 18A, 18B through 20A, 20B are graphs showing various aberrations of the zoom lens system according to Example 5 of the first embodiment of the present invention focusing at infinity at d-line (λ=587.6 nm). FIGS. 18A and 18B graphically show various aberrations in a wide-angle end state (f=28.7) in which FIG. 18A shows various aberrations without vibration reduction correction, and FIG. 18B shows coma with vibration reduction correction. FIGS. 19A and 19B graphically show various aberrations in an intermediate focal length state (f=99.6) in which FIG. 19A shows various aberrations without vibration reduction correction, and FIG. 19B shows coma with vibration reduction correction. FIGS. 20A and 20B graphically show various aberrations in a telephoto end state (f=289.7) in which FIG. 20A shows various aberrations without vibration reduction correction, and FIG. 20B shows coma with vibration reduction correction.

As is apparent from the respective graphs, the zoom lens system according to Example 5 shows superb optical performance as a result of good corrections to various aberrations in each focal length state (the wide-angle end state, the intermediate focal length state, and the telephoto end state).

EXAMPLE 6

Figure 21:
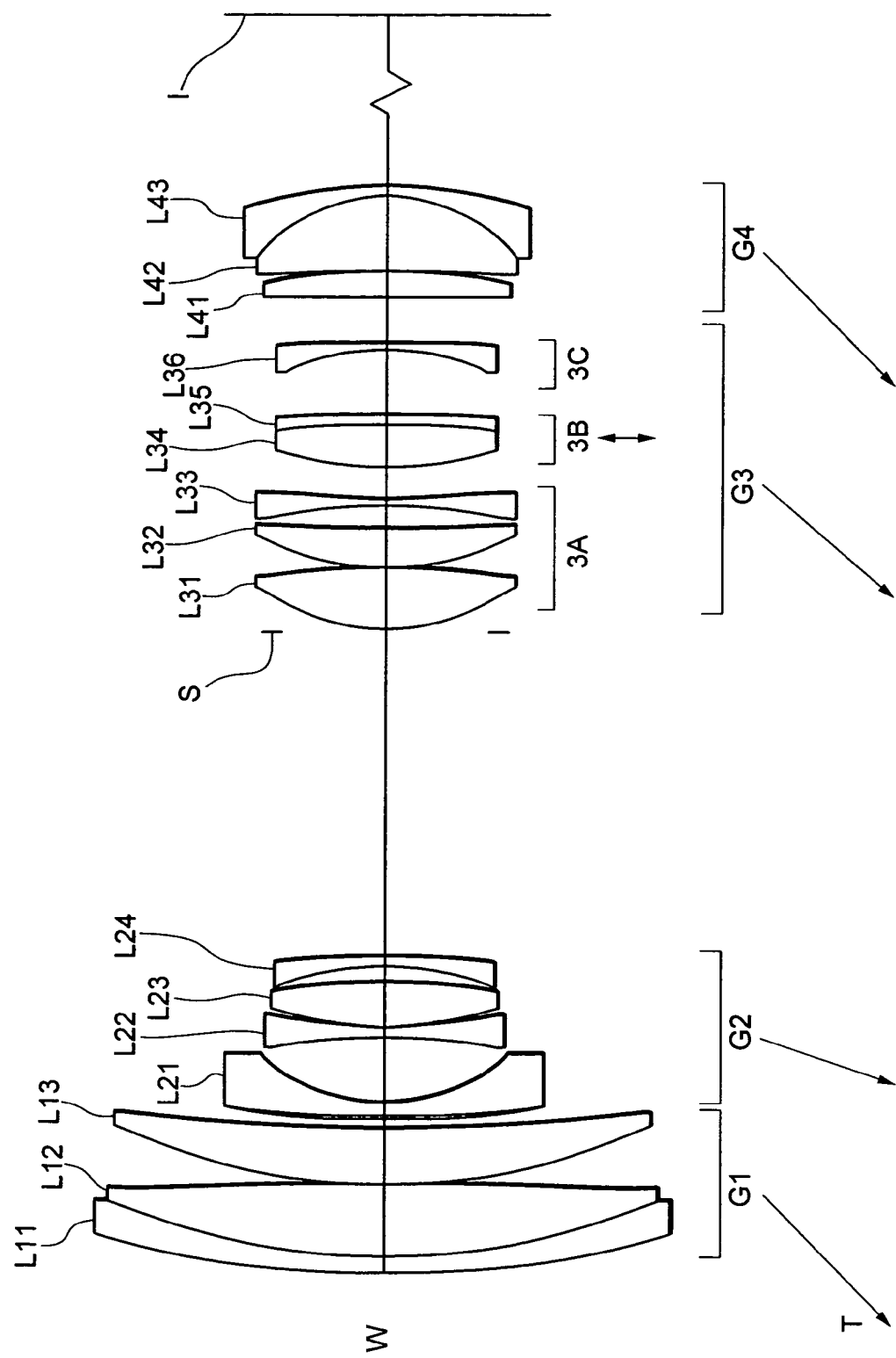
FIG. 21 is a diagram showing a sectional view of a zoom lens system according to Example 6 of the first embodiment of the present invention.

FIG. 21 is a diagram showing a sectional view of a zoom lens system according to Example 6 of a first embodiment of the present invention.

In FIG. 21, the zoom lens system is composed of, in order from an object, a first lens group G1 having positive refractive power, a second lens group G2 having negative refractive power, a third lens group G3 having positive refractive power, and a fourth lens group G4 having positive refractive power. When the state of lens group positions varies from a wide-angle end state to a telephoto end state, the first lens group G1 through the fourth lens group G4 move such that a distance between the first lens group G1 and the second lens group G2 increases, a distance between the second lens group G2 and the third lens group G3 decreases, and a distance between the third lens group G3 and the fourth lens group G4 decreases. The reference symbol I denotes the image plane.

The third lens group G3 is composed of, in order from the object, a third A lens group 3A having positive refractive power, a third B lens group 3B having positive refractive power, and a third C lens group 3C having negative refractive power. The image can be shifted by moving the third B lens group 3B as a shift lens group perpendicularly to the optical axis.

The first lens group G1 is composed of a cemented lens constructed by a negative meniscus lens L11 having a convex surface facing to the object cemented with a double convex positive lens L12 and a positive meniscus lens L13 having a convex surface facing to the object.

The second lens group G2 is composed of a negative meniscus lens L21 having a convex surface facing to the object, a double concave negative lens L22, a double convex positive lens L23, and a negative meniscus lens L24 having a concave surface facing to the object.

The third A lens group 3A is composed of a double convex positive lens L31, a positive meniscus lens L32 having a convex surface facing to the object, and a double concave negative lens L33. The third B lens group 3B is composed of a cemented lens constructed by a double convex positive lens L34 and a negative meniscus lens L35 having a concave surface facing to the object. The third C lens group 3C is composed of a negative meniscus lens L36 having a concave surface facing to the object.

The fourth lens group G4 is composed of a double convex positive lens L41, and a cemented lens constructed by a positive meniscus lens L42 having a concave surface facing to the object and a negative meniscus lens L43 having a concave surface facing to the object.

The aperture stop S is arranged in the vicinity of the most object side lens surface of the third lens group G3 and moved together with the third lens group G3 upon zooming.

Various values of a zoom lens system according to Example 6 are shown below in Table 6.

TABLE 6

[Specifications]

| | Wide-angle | Intermediate | Telephoto |
|---|---|---|---|
| f = | 28.800 | 100.001 | 287.999mm |
| 2ω = | 77.0 | 23.7 | 8.32° |
| FNO = | 3.6 | 5.5 | 5.8 |

[Lens Data]

| Surface Number | r | d | ν | n |
|---|---|---|---|---|
| 1 | 115.6310 | 1.800 | 28.56 | 1.79504 |
| 2 | 71.8788 | 7.200 | 81.61 | 1.49700 |
| 3 | −555.2835 | 0.100 | | |
| 4 | 65.0392 | 5.500 | 81.61 | 1.49700 |
| 5 | 232.0570 | D1 | | |
| 6 | 512.2381 | 0.100 | 38.09 | 1.55389 |
| 7 | 180.0000 | 1.200 | 53.85 | 1.71300 |
| 8 | 18.5968 | 6.500 | | |
| 9 | −50.4004 | 1.000 | 42.72 | 1.83481 |
| 10 | 63.9703 | 0.100 | | |
| 11 | 39.9492 | 4.600 | 23.78 | 1.84666 |
| 12 | −50.7514 | 1.500 | | |
| 13 | −25.9825 | 0.900 | 49.61 | 1.77250 |
| 14 | −100.6446 | D2 | | |
| 15 | 0.0000 | 0.500 | | (Aperture Stop S) |
| 16 | 22.7861 | 6.000 | 81.61 | 1.49700 |
| 17 | −76.8308 | 0.100 | | |
| 18 | 27.0706 | 4.000 | 90.30 | 1.45600 |
| 19 | 304.3279 | 2.350 | | |
| 20 | −54.3445 | 0.800 | 40.77 | 1.88300 |
| 21 | 95.0234 | 3.150 | | |
| 22 | 33.1566 | 4.500 | 61.18 | 1.58913 |
| 23 | −72.2937 | 0.800 | 23.78 | 1.84666 |
| 24 | −194.8570 | 6.700 | | |
| 25 | −22.3588 | 0.800 | 37.17 | 1.83400 |
| 26 | −167.7429 | D3 | | |
| 27 | 730.6059 | 2.800 | 49.32 | 1.74320 |
| 28 | −40.4002 | 0.100 | | |
| 29 | −120.1675 | 7.400 | 36.26 | 1.62004 |
| 30 | −16.1891 | 1.000 | 46.63 | 1.81600 |
| 31 | −45.2280 | BF | | |

[Aspherical Data]

Surface Number 6

κ = 1.0000
C4 = 5.68685−06
C6 = 6.5389E−09
C8 = −6.8904E−11
C10 = 1.5909E−13

Surface Number 22

κ = 1.0000
C4 = 5.2152E−06
C6 = 1.22385−08
C8 = 6.5604E−11
C10 = −4.46465−13

Surface Number 28

κ = 1.0000
C4 = 1.41055−05
C6 = 3.3242E−08
C8 = −8.46795−11
C10 = 3.5821E−13

[Variable Intervals]

| | Wide-angle | Intermediate | Telephoto |
|---|---|---|---|
| F = | 28.800 | 100.001 | 287.999 |
| D1 = | 1.528 | 32.944 | 62.211 |
| D2 = | 33.290 | 14.442 | 2.102 |
| D3 = | 4.508 | 1.422 | 0.946 |
| BF = | 38.606 | 82.076 | 93.134 |

[Various Values upon Shifting]

| | Wide-angle | Intermediate | Telephoto |
|---|---|---|---|
| F = | 28.800 | 100.001 | 287.999 |
| Lens Shift | 0.250 | 0.350 | 0.450 |
| Image Shift | 0.272 | 0.652 | 0.934 |

[Values for Conditional Expressions]

(1)  DT/ft = 0.216

(2)  $(1 - \beta A) \times \beta B$ = 1.1 (Wide-angle end state)
     = 1.9 (Intermediate focal length state)
     = 2.1 (Telephoto end state)

Figure 22A:
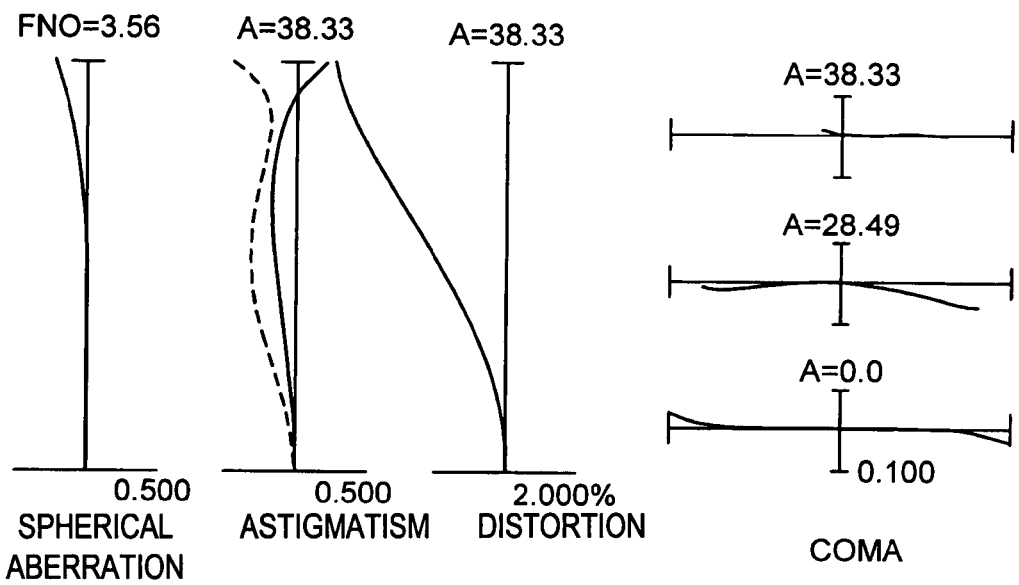
Figure 22B:
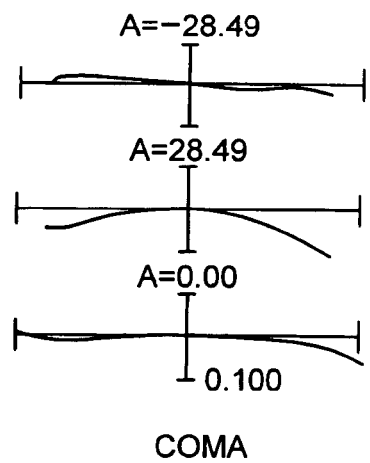
Figure 23A:
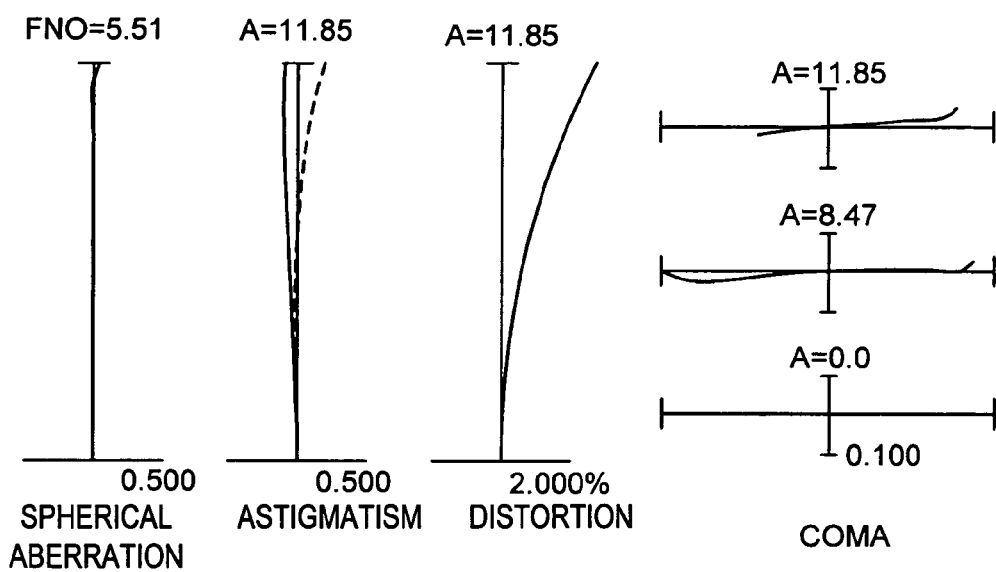
Figure 23B:
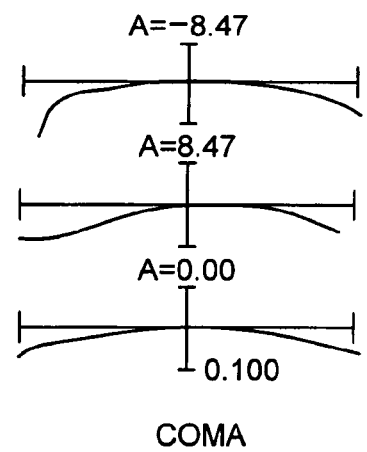
Figure 24A:
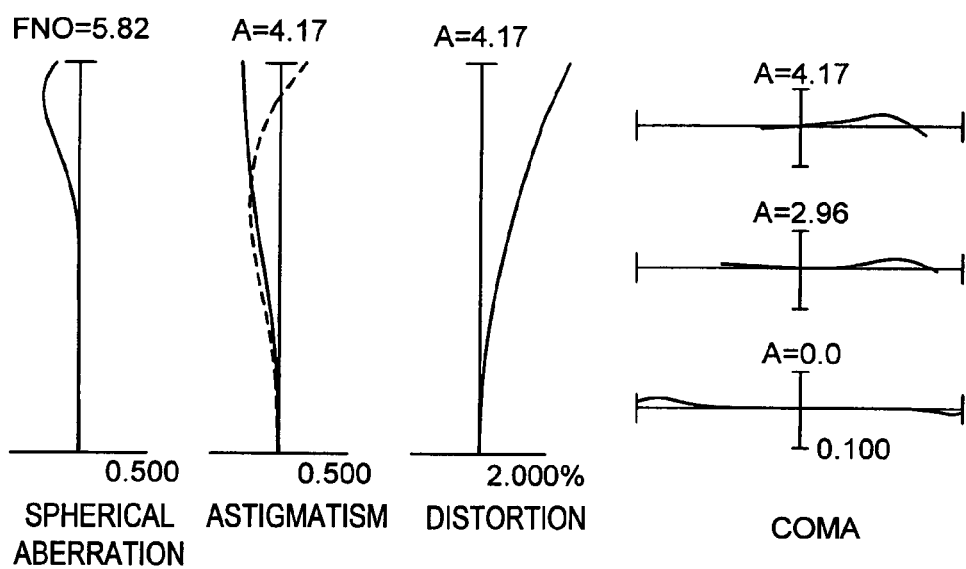
Figure 24B:
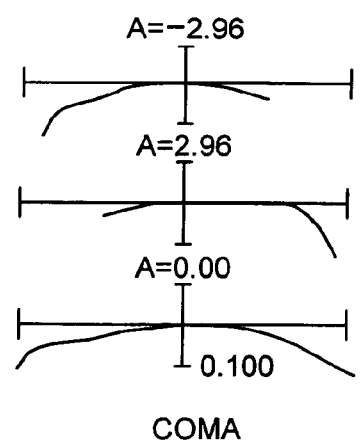
Figure 25:
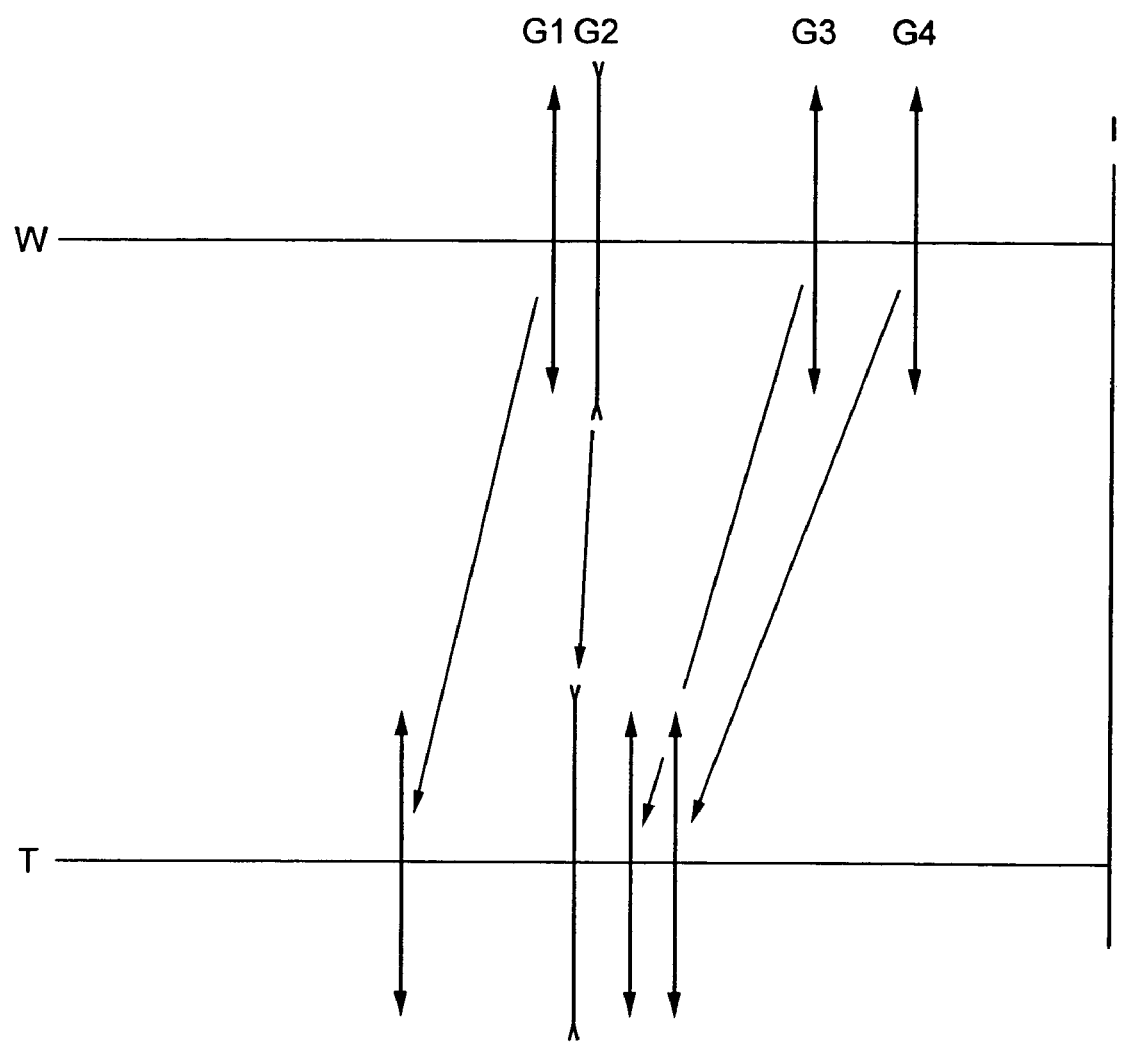
FIG. 25 is a diagram showing power arrangement of a zoom lens system according to each Example of a second embodiment of the present invention.

FIGS. 22A, 22B through 24A, 24B are graphs showing various aberrations of the zoom lens system according to Example 6 of the first embodiment of the present invention focusing at infinity at d-line (λ=587.6 nm). FIGS. 22A and 22B graphically show various aberrations in a wide-angle end state (f=28.8) in which FIG. 22A shows various aberrations without vibration reduction correction, and FIG. 22B shows coma with vibration reduction correction. FIGS. 23A and 23B graphically show various aberrations in an intermediate focal length state (f=100.0) in which FIG. 23A shows various aberrations without vibration reduction correction, and FIG. 23B shows coma with vibration reduction correction. FIGS. 24A and 24B graphically show various aberrations in a telephoto end state (f=288.0) in which FIG. 24A shows various aberrations without vibration reduction correction, and FIG. 24B shows coma with vibration reduction correction.

As is apparent from the respective graphs, the zoom lens system according to Example 6 shows superb optical performance as a result of good corrections to various aberrations in each focal length state (the wide-angle end state, the intermediate focal length state, and the telephoto end state).

[Second Embodiment]

A zoom lens system according to a second embodiment includes, in order from the object, a first lens group having positive refractive power, a second lens group having negative refractive power, a third lens group having positive refractive power, and a fourth lens group having positive refractive power. When the state of lens group positions varies from a wide-angle end state to a telephoto end state, at least the first lens group and the fourth lens group move to the object side such that a distance between the first lens group and the second lens group increases, a distance between the second lens group and the third lens group decreases, and a distance between the third lens group and the fourth lens group decreases.

In a high zoom ratio zoom lens system, in order to correct variation in off-axis aberration upon varying state of lens group positions well, it is preferable that an aperture stop is arranged in the vicinity of the center of the lens system. Accordingly, in a zoom lens system according to the second embodiment of the present invention, the aperture stop is located in the vicinity of the third lens group, inclusive of inside of the third lens group. Here, the meaning of "the aperture stop is located in the vicinity of the third lens group" includes the meaning of "the aperture stop is located inside of the third lens group."

With the above-described construction, the zoom lens system according to the second embodiment can correct variation in various aberrations produced upon shifting an image well by satisfying the following conditions (A), (B), and (C):

(A) The third lens group is composed of, in order from the object, a first sub-lens group, a second sub-lens group, and a third sub-lens group, and the image shift is carried out by shifting the second sub-lens group substantially perpendicularly to the optical axis. (The second sub-lens group is the shift lens group.)

(B) A distance between the second sub-lens group and the aperture stop is set suitably.

(C) The focal length of the whole lenses locating to the object side of the second sub-lens group is set suitably.

Condition (A) is for preferably correcting variation in various aberrations produced upon shifting the image and upon varying the state of lens group positions.

In a zoom lens system according to the second embodiment, aberration correction function is separated such that the whole third lens group preferably corrects variation in various aberrations produced upon varying the state of lens group positions and the second sub-lens group (shift lens group) preferably corrects variation in various aberrations produced upon shifting the image. Accordingly, variation in various aberrations produced upon varying the state of lens group positions as well as that upon shifting the image can be corrected preferably.

Condition (B) is for preferably correcting variation in off-axis aberrations produced upon shifting the image.

Generally, an off-axis ray incident to a lens group locating in the vicinity of an aperture stop passes through the lens group near to the optical axis. On the other hand, an off-axis ray incident to a lens group locating away from the aperture stop passes through the lens group away from the optical axis.

The surface shape of each lens surface is a sphere rotationally symmetrical around the optical axis. Accordingly, when the shift lens group is shifted substantially perpendicularly to the optical axis, refractive power in the direction of the shift and that in the opposite direction vary reversely with each other. In other words, among light rays incident to the shift lens group, a light ray incident to the shift-direction side refracts near to the optical axis and a light ray incident to the opposite-to-shift-direction side refracts away from the optical axis. Accordingly, variation in off-axis aberrations tends to occur.

Condition (C) is for preferably correcting variation in on-axis aberrations produced upon shifting the image.

When off-axis rays incident to the second sub-lens group are substantially parallel, the bundle of rays incident to the lens system with parallel to the optical axis moves its image position in response to the shift of the second sub-lens group. However, variation in aberration is small.

When the focal length of the lens elements locating to the object side of the second sub-lens group is negative as a whole, since on-axis rays are divergently incident to the second sub-lens group, spherical aberration cannot be corrected sufficiently.

Accordingly, when the lens elements locating to the object side of the second sub-lens group has positive refractive power as a whole and the positive refractive power is not so strong, variation in on-axis aberrations can be corrected preferably.

Then, respective conditional expressions are explained below.

The following conditional expression (3) is for numerically defining the above-described condition (B) and defines a distance between an aperture stop and the second sub-lens group arranged in the third lens group in the wide-angle end state:

$$0.05 < Ds/fw < 0.7 \qquad (3)$$

where Ds denotes a distance along the optical axis between an aperture stop and the lens surface of the second sub-lens group locating nearest to the aperture stop, and fw denotes the focal length of the zoom lens system in the wide-angle end state.

When the ratio Ds/fw is equal to or exceeds the upper limit of conditional expression (3), off-axis ray incident to the shift lens group passes excessively away from the optical axis in the wide-angle end state. Accordingly, variation in off-axis aberrations producing upon shifting an image cannot be corrected preferably.

On the other hand, when the ratio Ds/fw is equal to or falls below the lower limit of conditional expression (3), sufficient space cannot be secured between the aperture stop and the shift lens group, so that an interference between the aperture stop and the shift lens group occurs at small aperture (when stopping down the aperture small). Otherwise, it is likely to happen that the shift lens group contacts the aperture stop upon manufacturing in accordance with tolerance of each part.

The following Conditional expression (4) is for numerically defining the above-described condition (C):

$$0.1 < ft/fA < 1.5 \qquad (4)$$

where fA denotes the focal length of the whole lens elements locating to the object side of the second sub-lens group in the telephoto end state, and ft denotes the focal length of the zoom lens system in the telephoto end state.

When the ratio ft/fA is equal to or exceeds the upper limit of conditional expression (4), on-axis ray is incident to the second sub-lens group converging excessively. Accordingly, variation in on-axis aberrations producing upon shifting an image becomes excessively large.

On the other hand, when the ratio ft/fA is equal to or falls below the lower limit of conditional expression (4), on-axis ray is divergently incident to the second sub-lens group. Accordingly, on-axis aberrations cannot be corrected sufficiently.

The diameter of the second sub-lens group directly relates to the dimension of a driver for shifting the second sub-lens group substantially perpendicularly to the optical axis. Accordingly, in order to increase portability by miniaturizing the diameter of the second sub-lens group, it is preferable to set the lower limit of conditional expression (4) to 0.15.

With the construction described above, the zoom lens system according to the second embodiment of the present invention may preferably correct variation in various aberrations producing upon shifting an image and accomplish miniaturizing the lens diameter by constructing respective sub-lens groups of the third lens group satisfying the following conditions (D), (E), and (F):

(D) Refractive power of the first sub-lens group is set to positive and the focal length thereof is set suitably.

(E) Refractive power of the second sub-lens group is set to positive and the shape thereof is set suitably.

(F) Refractive power of the third sub-lens group is set to negative.

Condition (D) is for accomplishing compactness and preferably correcting aberrations at the center of the image frame in the telephoto end state.

In the zoom lens system according to the second embodiment of the present invention, combined refractive power of the first lens group and the second lens group is negative. Accordingly, in the zoom lens system according to the second embodiment of the present invention in order to satisfy condition (C), the first sub-lens group locating between the second lens group and the second sub-lens group has positive refractive power.

In order to accomplish compactness, it is effective that refractive power of the first sub-lens group is set to a large value. However, when refractive index of the first sub-lens becomes too large, negative spherical aberration cannot be corrected sufficiently in the telephoto end state.

Accordingly, in the zoom lens system according to the second embodiment of the present invention, it is preferable to satisfy the following conditional expression (5):

$$0.06 < fa/ft < 0.2 \qquad (5)$$

where fa denotes the focal length of the first sub-lens group, and ft denotes the whole zoom lens system in the telephoto end state.

Conditional expression (5) defines the focal length of the first sub-lens group.

When the ratio fa/ft is equal to or exceeds the upper limit of conditional expression (5), total lens length of the zoom lens system in the telephoto end state becomes large.

On the other hand, when the ratio fa/ft is equal to or falls below the lower limit of conditional expression (5), negative spherical aberration producing in the telephoto end state cannot be corrected preferably.

Condition (E) is for preferably correcting decentering coma producing in the center of the image frame by the shift lens group alone upon shifting an image.

Generally, image shifting can be carried out when the shift lens group has either positive refractive power or negative refractive power. In the zoom lens system according to the second embodiment of the present invention, since an angle of view in the wide-angle end state is large, when the shift lens group has negative refractive power, the light flux diverges. Accordingly, not only the lens diameter becomes large, but also coma produces severely since off-axis ray proceeding to the periphery of the image frame passes on the periphery of the lens. Therefore, in the zoom lens system according to the second embodiment of the present invention, the second sub-lens group, which is the shift lens group, has positive refractive power.

Moreover, in order to preferably correct decentering coma producing at the center of the image frame by the shift lens group alone upon shifting an image, it is preferable to set the shape of the shift lens group suitably. For this purpose, it is necessary to satisfy sine condition in addition to preferably correcting spherical aberration producing by the shift lens group alone.

Accordingly, in the zoom lens system according to the second embodiment of the present invention, the second sub-lens group includes at least one positive lens and one negative lens and the following conditional expression (6) is preferably satisfied:

$$-0.6 < (na/ra)/(nb/rb) < 0 \qquad (6)$$

where ra denotes a radius of curvature of the most object side lens surface of the second sub-lens group, na denotes refractive index at d-line of the most object side lens of the second sub-lens group, rb denotes a radius of curvature of the most image side lens surface of the second sub-lens group, nb denotes refractive index at d-line of the most image side lens of the second sub-lens group.

Conditional expression (6) is for suitably defining the shape of the second sub-lens group and for preferably correcting decentering coma producing at the center of the image frame by the shift lens group alone upon shifting an image. As described above, the zoom lens system according to the second embodiment of the present invention corrects spherical aberration produced by the shift lens group alone as well as satisfies the sine condition.

When the ratio (na/ra)/(nb/rb) is equal to or exceeds the upper limit of conditional expression (6), sine condition becomes largely negative producing inner coma severely at the center of the image frame upon shifting an image.

On the other hand, when the ratio is equal to or falls below the lower limit of conditional expression (6), sine condition becomes largely positive producing outer coma severely at the center of the image frame upon shifting an image.

The zoom lens system according to the second embodiment of the present invention preferably corrects variation in various aberrations upon changing focal length state by making aberration correction function of each lens group clear.

The zoom lens system according to the second embodiment of the present invention is constructed such that the distance between the first lens group and the second lens group is small as much as possible, and the distance between the second lens group and the aperture stop is suitably large in the wide-angle end state. With this construction, off-axis ray passing through the first lens group passes near to the optical axis, and off-axis ray passing through the second lens group passes away from the optical axis.

In the zoom lens system according to the second embodiment of the present invention, when the state of lens group positions varies from the wide angle end state to the telephoto end state, the first lens group and the second lens group are moved such that a distance between the first lens group and the second lens group increases, and a distance between the second lens group and the aperture stop decreases. With this construction, off-axis ray passing through the first lens group passes away from the optical axis, and off-axis ray passing through the second lens group passes near to the optical axis.

In the zoom lens system according to the second embodiment of the present invention as described above, by varying the heights of off-axis ray passing through the first lens group and the second lens group, variation in off-axis aberrations producing upon varying the state of lens group positions is corrected preferably.

In the zoom lens system according to the second embodiment of the present invention, a distance between the third lens group and the fourth lens group becomes large in the wide-angle end state. Accordingly, off-axis ray passing through the fourth lens group passes away from the optical axis.

In the zoom lens system according to the second embodiment of the present invention, when the state of lens group positions varies from the wide-angle end state to the telephoto end state, the distance between the third lens group and the fourth lens group decreases. Accordingly, off-axis ray passing through the fourth lens group passes near to the optical axis, so that variation in off-axis aberrations producing upon varying the state of lens group positions is corrected preferably.

In the zoom lens system according to the second embodiment of the present invention as described above, the first lens group mainly corrects off-axis aberration producing in the telephoto end state, the second lens group mainly corrects off-axis aberrations producing in the wide-angle end state, and the fourth lens group also mainly corrects off-axis aberrations producing in the wide-angle end state. By the way, the function for correcting aberrations is different between the second lens group and the fourth lens group since these two lens groups are located to the object side and image side of the aperture stop, respectively.

In the zoom lens system according to the second embodiment of the present invention, the aperture stop is located in the vicinity of the third lens group and off-axis ray passing through the third lens group passes near to the optical axis, so that production of off-axis aberration is small. Accordingly, the third lens group mainly corrects on-axis aberrations.

In the zoom lens system according to the second embodiment of the present invention, on-axis light bundle coming out from the third lens group approaches parallel. Accordingly, by varying the distance between the third lens group and the fourth lens group off-axis aberration alone can be varied without varying on-axis aberrations, so that variation in curvature of field producing upon varying the state of lens group positions is corrected preferably.

Condition (F) is for bringing off-axis light bundle coming out from the third lens group close to parallel.

In the zoom lens system according to the second embodiment of the present invention, since the first sub-lens group and the second sub-lens group in the third lens group have positive refractive power, in order to bring off-axis light bundle coming out from the third lens group close to parallel, it is preferable that the third sub-lens group has negative refractive power.

The zoom lens system according to the second embodiment of the present invention preferably satisfies the following conditional expression (7):

$$0.5 < |fc|/f3 < 0.9 \qquad (7)$$

where fc denotes the focal length of the third sub-lens group and f3 denotes the focal length of the third lens group.

Conditional expression (7) is for suitably defining the focal length of the third sub-lens group in order to accomplish high optical performance of the zoom lens system according to the second embodiment of the present invention.

When the ratio |fc|/f3 is equal to or exceeds the upper limit of conditional expression (7), negative distortion produced in the wide-angle end state cannot be corrected preferably.

On the other hand, when the ratio |fc|/f3 is equal to or falls below the lower limit of conditional expression (7), positive spherical aberration produced at the third sub-lens group cannot be corrected preferably.

In the zoom lens system according to the second embodiment of the present invention, the third sub-lens group has a negative lens having a concave surface facing to the object locating to the most object side, and the following conditional expression (8) is preferably satisfied:

$$0.5 < |rc|/f3 < 0.75 \qquad (8)$$

where rc denotes a radius of curvature of the object side surface of the negative lens locating to the most object side of the third sub-lens group, and f3 denotes the focal length of the third lens group.

Conditional expression (8) is for preferably correcting variation in various aberrations producing upon shifting an image, and defining a radius of curvature of the object side surface of the negative lens locating to the most object side of the third sub-lens group.

When the ratio |rc|/f3 is equal to or exceeds the upper limit of conditional expression (8), optical performance on the periphery of the image frame in the wide-angle end state upon shifting an image is severely degraded.

On the other hand, when the ratio |rc|/f3 is equal to or falls below the lower limit of conditional expression (8), optical performance at the center of the image frame in the telephoto end state upon shifting an image is severely degraded.

In the zoom lens system according to the second embodiment of the present invention, by suitably arranging an aspherical lens, higher optical performance can be obtained.

In order to increase optical performance at the center of the image frame regardless of the state of lens group positions, it is preferable that a lens surface of the first sub-lens group in the third lens group is an aspherical surface.

In order to correct variation in coma produced upon varying an angle of view in the wide-angle end state ideally, it is preferable that at least one lens surface of the second lens group or the fourth lens group is an aspherical surface. Moreover, by arranging aspherical lenses in both of the second lens group and the fourth lens group, further high optical performance can be obtained.

In the zoom lens system according to the second embodiment of the present invention, when focusing at close object, in order to suppress variation in various aberrations it is preferable that the second lens group is moved along the optical axis.

The present invention is not limited to a zoom lens system, but is preferably applied to a so-called variable focal length lens whose focal length does not exist continuously.

The zoom lens system according to the second embodiment of the present invention can be applied to an optical system using a photoelectric converter such as a CCD as an imaging device by keeping an exit pupil from the image plane with arranging an additional lens to the image side of the fourth lens group. The reason is that when a photoelectric device is used for an imaging device, the position of an exit pupil has to be kept away from the image plane since a micro lens array is arranged right in front of the imaging device. When detected light quantity is small, noise tends to produce and an exposure cannot be completed within short time. Accordingly, the micro lens array is arranged for increasing detected light quantity.

The zoom lens system according to the second embodiment of the present invention is composed of, in order from an object, a first lens group G1 having positive refractive power, a second lens group G2 having negative refractive power, a third lens group G3 having positive refractive power, and a fourth lens group G4 having positive refractive power. When the state of lens group positions varies from a wide-angle end state (W) to a telephoto end state (T), at least the first lens group G1 and the fourth lens group G4 are moved to the object side such that a distance between the first lens group G1 and the second lens group G2 increases, a distance between the second lens group G2 and the third lens group G3 decreases, and a distance between the third lens group G3 and the fourth lens group G4 decreases.

EXAMPLE 7

FIG. 26 is a diagram showing the lens arrangement of a zoom lens system according to Example 7 of the second embodiment of the present invention.

In a zoom lens system according to Example 7 of the second embodiment, the first lens group G1 is composed of, in order from the object, a cemented lens L11 constructed by a negative meniscus lens having a convex surface facing to the object cemented with a positive lens having a convex surface facing to the object, and a positive meniscus lens L12 having a convex surface facing to the object.

The second lens group G2 is composed of, in order from the object, a negative lens L21 having a concave surface facing to an image, a negative lens L22 having a concave surface facing to the object, a positive lens L23 having a convex surface facing to the object, and a negative lens L24 having a concave surface facing to the object.

The third lens group G3 is composed of, in order from the object, a cemented positive lens L31 constructed by a double convex positive lens and a negative lens having a concave surface facing to the object, a cemented positive lens L32 constructed by a double convex positive lens cemented with a negative lens having a concave surface facing to the object, and a negative lens L33 having a concave surface facing to the object.

The fourth lens group G4 is composed of, in order from the object, a positive lens L41 having a convex surface facing to the image, a cemented lens L42 constructed by a double convex positive lens cemented with a negative lens having a concave surface facing to the object.

In a zoom lens system according to Example 7 of the second embodiment, an aperture stop S is arranged to the object side of the third lens group G3 and is moved together with the third group G3 upon varying the state of lens group positions.

A thin resin layer having an aspherical surface is arranged to the object side surface of the negative lens L21 in the second lens group G2.

In the zoom lens system according to Example 7 of the second embodiment, the cemented positive lens L31, the cemented positive lens L32, and the negative lens L33 in the third lens group G3 work as the first sub-lens group, the second sub-lens group, and the third sub-lens group, respectively.

Various values according to Example 7 are listed in Table 7.

TABLE 7

[Specifications]

| | Wide-angle | Intermediate | Telephoto |
|---|---|---|---|
| f = | 28.80 | 100.00 | 291.01 mm |
| 2ω = | 76.85 | 23.73 | 8.27° |
| FNO = | 3.70 | 5.31 | 5.90 |

[Lens Data]

| Surface Number | r | d | ν | n |
|---|---|---|---|---|
| 1 | 90.3212 | 1.900 | 23.78 | 1.84666 |
| 2 | 65.4471 | 7.850 | 81.61 | 1.49700 |
| 3 | −927.1234 | 0.100 | | |
| 4 | 62.8419 | 4.950 | 81.61 | 1.49700 |
| 5 | 160.5701 | (D5) | | |
| 6 | 82.3260 | 0.300 | 52.42 | 1.51742 |
| 7 | 81.0734 | 1.150 | 54.66 | 1.72916 |
| 8 | 15.7871 | 6.000 | | |
| 9 | −48.6106 | 1.000 | 52.32 | 1.75500 |
| 10 | 67.3687 | 0.100 | | |
| 11 | 30.3042 | 3.750 | 23.78 | 1.84666 |
| 12 | −77.9581 | 1.400 | | |
| 13 | −28.3626 | 0.900 | 46.58 | 1.80400 |
| 14 | 481.9617 | (D14) | | |
| 15 | 0.0000 | 2.200 | Aperture Stop | |
| 16 | 22.2500 | 6.000 | 61.18 | 1.58913 |
| 17 | −36.1506 | 0.800 | 37.17 | 1.83400 |
| 18 | −89.4952 | 6.800 | | |
| 19 | 31.1943 | 4.950 | 65.47 | 1.60300 |
| 20 | −34.5962 | 0.800 | 28.39 | 1.79504 |
| 21 | −95.5120 | 3.050 | | |
| 22 | −24.5379 | 0.800 | 37.17 | 1.83400 |
| 23 | 135.1604 | (D23) | | |
| 24 | 79.6117 | 4.900 | 64.14 | 1.51633 |
| 25 | −29.6445 | 0.100 | | |
| 26 | 317.9892 | 8.100 | 33.80 | 1.64769 |
| 27 | −14.2806 | 0.900 | 42.72 | 1.83481 |
| 28 | −183.2245 | (Bf) | | |

[Aspherical Data]

Surface Number 6

κ = −4.2585
C4 = 4.4810E−6
C6 = 1.2417E−8
C8 = −1.0672E−10
C10 = 3.1231E−13

Surface Number 16

κ = 1.0000
C4 = −3.9585E−6
C6 = 4.2904E−9

TABLE 7-continued

C8 = −8.0515E−12
C10 = 4.2777E−14
Surface Number 24

κ = 1.0000
C4 = 1.0383E−5
C6 = −1.4668E−8
C8 = 1.2224E−10
C10 = −1.4347E−12

|     | Wide-angle | Intermediate | Telephoto |
| --- | --- | --- | --- |
| [Variable Intervals] | | | |
| f   | 28.8002 | 100.0049 | 291.0057 |
| D5  | 1.5083  | 36.2039  | 61.0436  |
| D14 | 26.4577 | 11.8866  | 0.8000   |
| D23 | 7.4610  | 3.6316   | 3.0000   |
| BF  | 39.5005 | 75.2032  | 89.4717  |
| [Shift Amount of Shifting lens group] | | | |
| f   | 28.8002 | 100.0049 | 291.0057 |
| δb  | 0.1114  | 0.2425   | 0.6095   | where δb denotes a shift amount of the second sub-lens group for shifting an image corresponding to a half angle of view of 0.3 degrees.

[Values for Conditional Expressions]
fA=552.282
fa=34.860
fc=−24.845
f3=37.103
(1) Ds/fw=0.549
(2) ft/fA=0.527
(3) fa/ft=0.120
(4)(na/ra)/(nb/rb)=−0.366
(5)|fc|/f3=0.670
(6)|rc|/f3=0.661

Figure 27A:
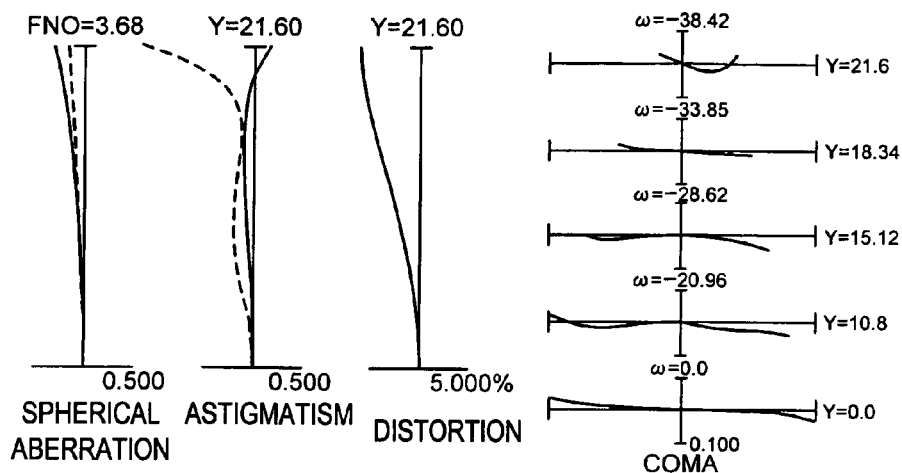
FIGS. 27A, 27B, and 27C graphically show various aberrations of the zoom lens system according to Example 7 focusing at infinity in a wide-angle end state (f=28.80), an intermediate focal length state (f=100.00), and a telephoto end state (f=291.00), respectively.
Figure 27B:
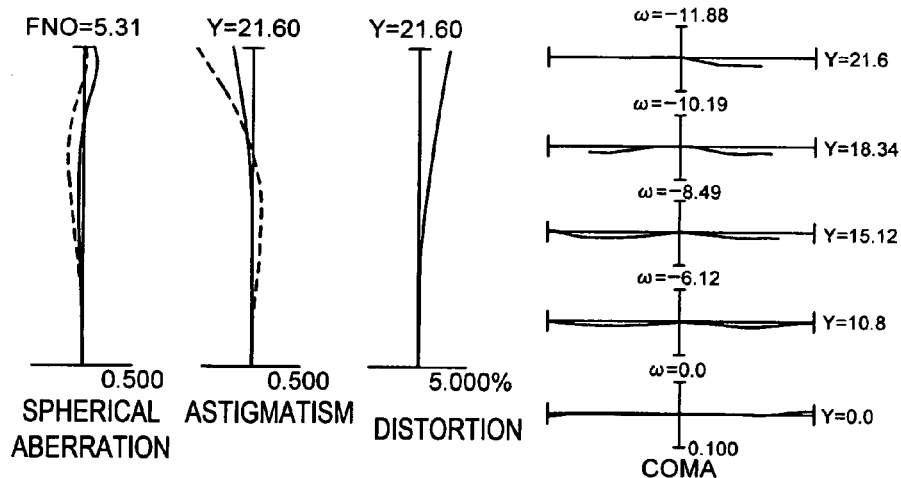
Figure 27C:
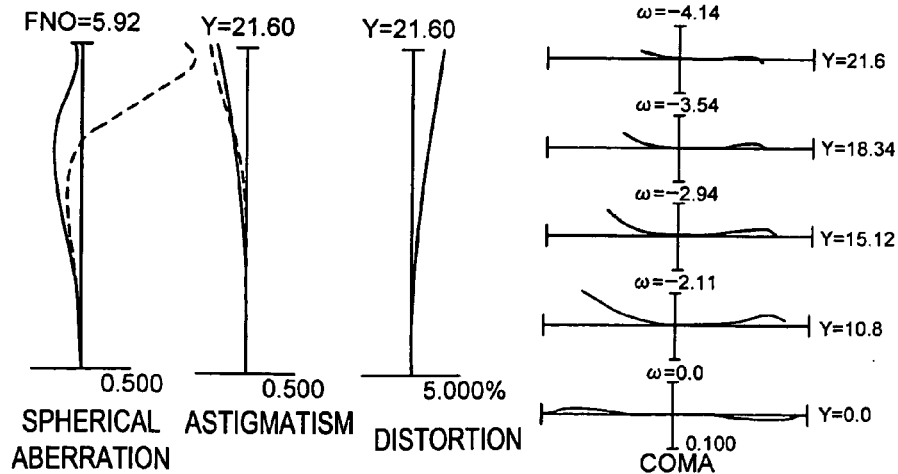

FIGS. 27A, 27B, and 27C graphically show various aberrations of the zoom lens system according to Example 7 of the second embodiment focusing at infinity in a wide-angle end state (f=28.80), an intermediate focal length state (f=100.00), and a telephoto end state (f=291.00), respectively.

Figure 28C:
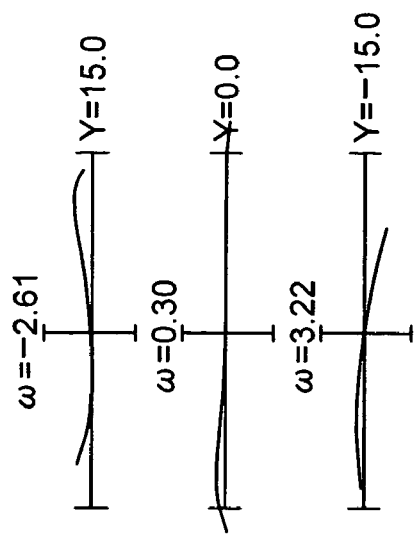
FIGS. 28A, 28B, and 28C graphically show coma of the zoom lens system according to Example 7 focusing at infinity in a wide-angle end state (f=28.80), an intermediate focal length state (f=100.00), and a telephoto end state (f=291.00), respectively, when a second sub-lens group is shifted.
Figure 28B:
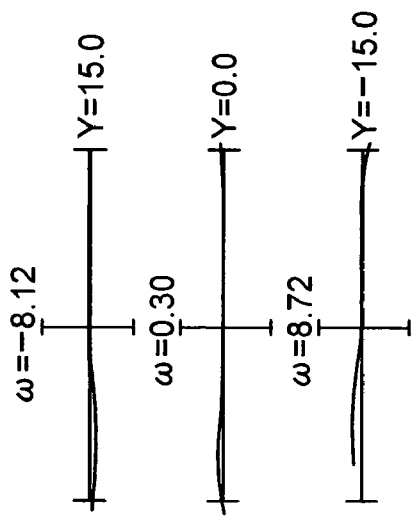
Figure 28A:
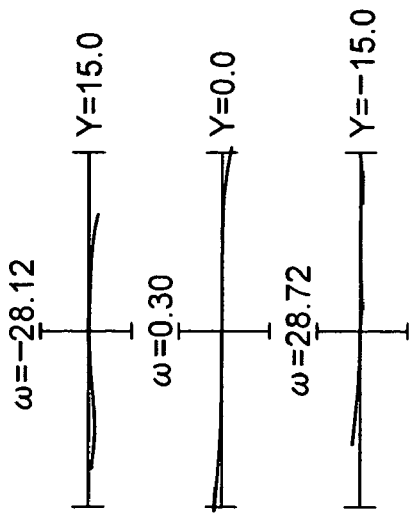

FIGS. 28A, 28B, and 28C graphically show coma of the zoom lens system according to Example 7 focusing at infinity in a wide-angle end state (f=28.80), an intermediate focal length state (f=100.00), and a telephoto end state (f=291.00), respectively, when a second sub-lens group is shifted the amount shown in Table 7.

FIGS. 27A–27C and 28A–28C show various aberrations at d-line (λ=587.6 nm).

In FIGS. 27A, 27B, and 27C, FNO denotes the f-number, ω denotes a half angle of view (unit: degree), and Y denotes an image height. In the graph showing spherical aberration, f-number shows the value at the maximum aperture. In the graphs showing astigmatism and distortion, the maximum value of Y is shown. In the graph showing coma, a half angle of view ω and each image height 0, 10.8, 15.12, 18.34, and 21.6 are shown. In the graph showing spherical aberration, a solid line indicates spherical aberration and a broken line indicates sine condition. In the graph showing astigmatism, a solid line indicates a sagittal image plane and a broken line indicates a meridional plane.

In FIGS. 28A, 28B, and 28C, ω denotes a half angle of view, and Y denotes an image height. In FIGS. 28A–28C, values corresponding to the image height Y=−15.0, 0.0, and 15.0 are shown.

The above-described explanation regarding various aberration graphs is the same as the other examples.

As is apparent from FIGS. 27A, 27B, and 27C, the zoom lens system according to Example 7 of the second embodiment shows superb optical performance as a result of good corrections to various aberrations in each focal length state.

As is apparent from FIGS. 28A, 28B, and 28C, the zoom lens system according to Example 7 of the second embodiment shows superb optical performance as a result of good corrections to variation in various aberrations upon shifting an image.

EXAMPLE 8

FIG. 29 is a diagram showing the lens arrangement of a zoom lens system according to Example 8 of the second embodiment of the present invention.

In a zoom lens system according to Example 8 of the second embodiment, the first lens group G1 is composed of, in order from the object, a cemented lens L11 constructed by a negative meniscus lens having a convex surface facing to the object cemented with a positive lens having a convex surface facing to the object, and a positive meniscus lens L12 having a convex surface facing to the object.

The second lens group G2 is composed of, in order from the object, a negative lens L21 having a concave surface facing to an image, a negative lens L22 having a concave surface facing to the object, a positive lens L23 having a convex surface facing to the object, and a negative lens L24 having a concave surface facing to the object.

The third lens group G3 is composed of, in order from the object, a cemented positive lens L31 constructed by a double convex lens and a negative lens having a concave surface facing to the object, a positive lens L32 having a convex surface facing to the object, a cemented positive lens L33 constructed by a double convex positive lens cemented with a negative lens having a concave surface facing to the object, and a cemented negative lens L34 constructed by a double concave negative lens cemented with a positive lens having a convex surface facing to the image.

The fourth lens group G4 is composed of, in order from the object, a positive lens L41 having a convex surface facing to the image, a cemented lens L42 constructed by a double convex positive lens cemented with a negative lens having a concave surface facing to the object.

In a zoom lens system according to Example 8 of the second embodiment, an aperture stop S is arranged in the third lens group G3 and is moved together with the third group G3 upon varying the state of lens group positions.

A thin resin layer having an aspherical surface is arranged to the object side surface of the negative lens L21 in the second lens group G2.

In the zoom lens system according to Example 8 of the second embodiment, the cemented positive lens L31 and the positive lens L32, the cemented positive lens L33, and the cemented negative lens L34 in the third lens group G3 work as the first sub-lens group, the second sub-lens group, and the third sub-lens group, respectively.

Various values according to Example 8 are listed in Table 8.

TABLE 8

[Specifications]

|  | Wide-angle | Intermediate | Telephoto |
|---|---|---|---|
| f = | 28.80 | 100.00 | 290.99 mm |
| 2ω = | 76.85 | 23.73 | 8.27° |
| FNO = | 3.99 | 5.31 | 5.90 |

[Lens Data]

| Surface Number | r | d | ν | n |
|---|---|---|---|---|
| 1 | 93.2544 | 1.900 | 23.78 | 1.84666 |
| 2 | 67.4338 | 7.600 | 81.61 | 1.49700 |
| 3 | −870.3714 | 0.100 | | |
| 4 | 63.9756 | 4.950 | 81.61 | 1.49700 |
| 5 | 169.1582 | (D5) | | |
| 6 | 170.7827 | 0.200 | 52.42 | 1.51742 |
| 7 | 116.1866 | 1.150 | 54.66 | 1.72916 |
| 8 | 17.5797 | 6.350 | | |
| 9 | −44.1340 | 1.000 | 49.61 | 1.77250 |
| 10 | 69.9097 | 0.100 | | |
| 11 | 37.2520 | 4.300 | 23.78 | 1.84666 |
| 12 | −47.1656 | 1.850 | | |
| 13 | −25.1574 | 0.900 | 42.72 | 1.83481 |
| 14 | −206.1842 | (D14) | | |
| 15 | 22.9038 | 5.250 | 60.29 | 1.62041 |
| 16 | −75.3318 | 0.800 | 40.94 | 1.80610 |
| 17 | 1045.3379 | 0.100 | | |
| 18 | 100.0000 | 1.450 | 61.18 | 1.58913 |
| 19 | 167.7113 | 1.000 | | |
| 20 | 0.0000 | 4.750 | (Aperture Stop) | |
| 21 | 33.2835 | 4.750 | 65.47 | 1.60300 |
| 22 | −32.1197 | 0.800 | 25.43 | 1.80518 |
| 23 | −82.2892 | 3.200 | | |
| 24 | −23.5322 | 0.800 | 37.17 | 1.83400 |
| 25 | 323.3398 | 1.800 | 61.18 | 1.58913 |
| 26 | −277.1591 | (D26) | | |
| 27 | 106.3107 | 5.500 | 61.18 | 1.58913 |
| 28 | −31.4892 | 0.100 | | |
| 29 | 126.8073 | 8.100 | 33.04 | 1.66680 |
| 30 | −15.4408 | 0.900 | 42.72 | 1.83481 |
| 31 | 233.8464 | (Bf) | | |

[Aspherical Data]

Surface Number 6

κ = −5.3669
C4 = 6.2843E−6
C6 = 7.3170E−9
C8 = −6.0486E−11
C10 = 1.9131E−13

Surface Number 18

κ = 1.0000
C4 = −2.8655E−6
C6 = 7.4080E−9
C8 = 3.4886E−11
C10 = −1.9586E−14

Surface Number 28

κ = 1.0000
C4 = 1.1991E−5
C6 = −8.1306E−9
C8 = 1.0850E−10
C10 = −7.3969E−13

|  | Wide-angle | Intermediate | Telephoto |
|---|---|---|---|
| [Variable Intervals] | | | |
| f | 28.7990 | 99.9955 | 290.9864 |
| D5 | 1.5536 | 35.9680 | 60.9566 |
| D14 | 27.3832 | 12.2670 | 1.0000 |

TABLE 8-continued

| D26 | 6.0825 | 2.2082 | 1.5269 |
|---|---|---|---|
| BF | 39.5688 | 75.2798 | 91.8252 |
| [Shift Amount of Shifting lens group] | | | |
| f | 28.7990 | 99.9955 | 290.9864 |
| δb | 0.1145 | 0.2479 | 0.6095 | where δb denotes a shift amount of the second sub-lens group for shifting an image corresponding to a half angle of view of 0.3 degrees.

[Values for Conditional Expressions]
fA=1429.95
fa=37.913
fc=−29.443
f3=38.774
(1) Ds/fw=0.165
(2) ft/fA=0.203
(3) fa/ft=0.130
(4)(na/ra)/(nb/rb)=−0.455
(5)|fc|/f3=0.759
(6)|rc|/f3=0.607

Figure 30A:
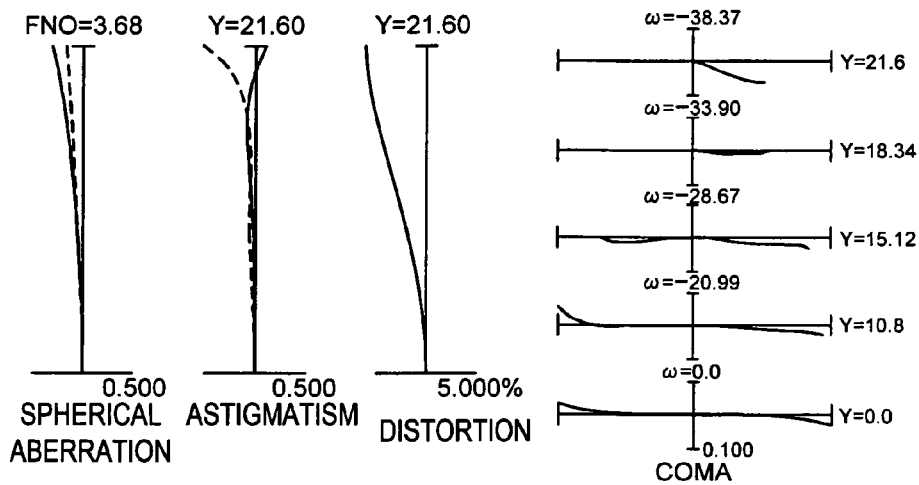
FIGS. 30A, 30B, and 30C graphically show various aberrations of the zoom lens system according to Example 8 focusing at infinity in a wide-angle end state (f=28.80), an intermediate focal length state (f=100.00), and a telephoto end state (f=290.99), respectively.
Figure 30B:
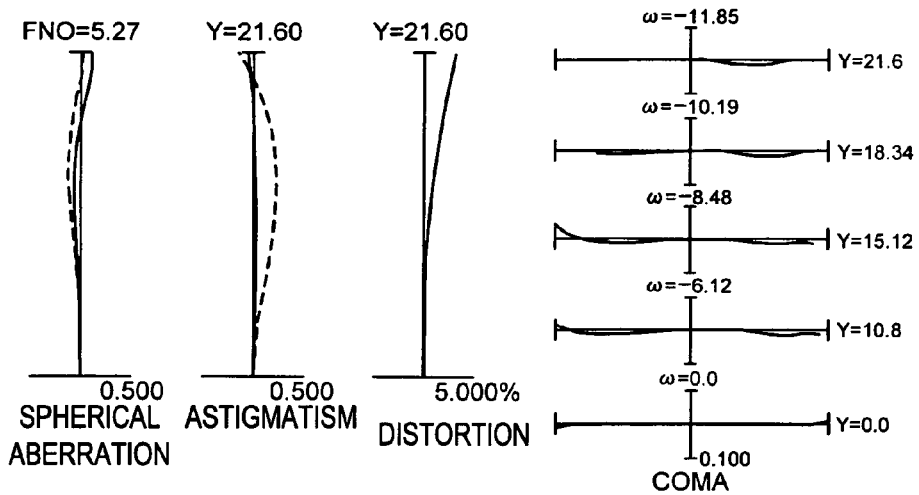
Figure 30C:
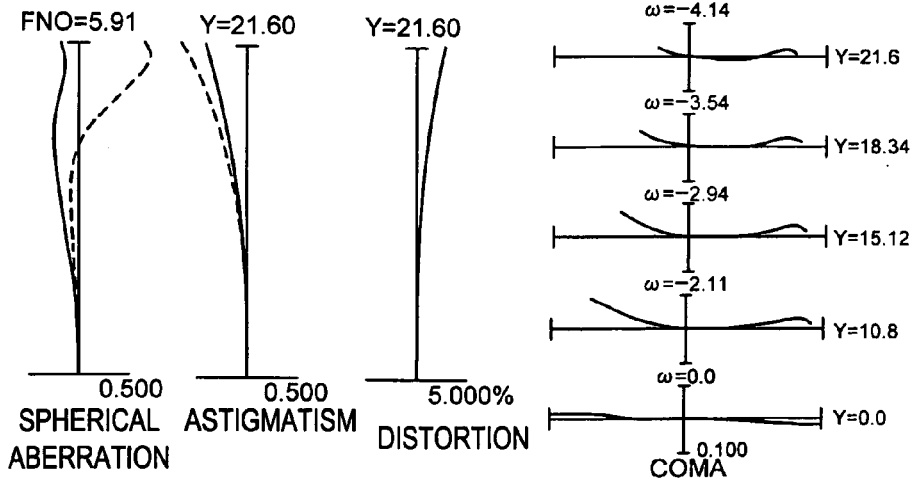

FIGS. 30A, 30B, and 30C graphically show various aberrations of the zoom lens system according to Example 8 of the second embodiment focusing at infinity in a wide-angle end state (f=28.80), an intermediate focal length state (f=100.00), and a telephoto end state (f=290.99), respectively.

FIGS. 31A, 31B, and 31C graphically show coma of the zoom lens system according to Example 8 focusing at infinity in a wide-angle end state (f=28.80), an intermediate focal length state (f=100.00), and a telephoto end state (f=290.99), respectively, when a second sub-lens group is shifted the amount shown in Table 8.

As is apparent from FIGS. 30A, 30B, and 30C, the zoom lens system according to Example 8 of the second embodiment shows superb optical performance as a result of good corrections to various aberrations in each focal length state.

As is apparent from FIGS. 31A, 31B, and 31C, the zoom lens system according to Example 8 of the second embodiment shows superb optical performance as a result of good corrections to variation in various aberrations upon shifting an image.

EXAMPLE 9

Figure 32:
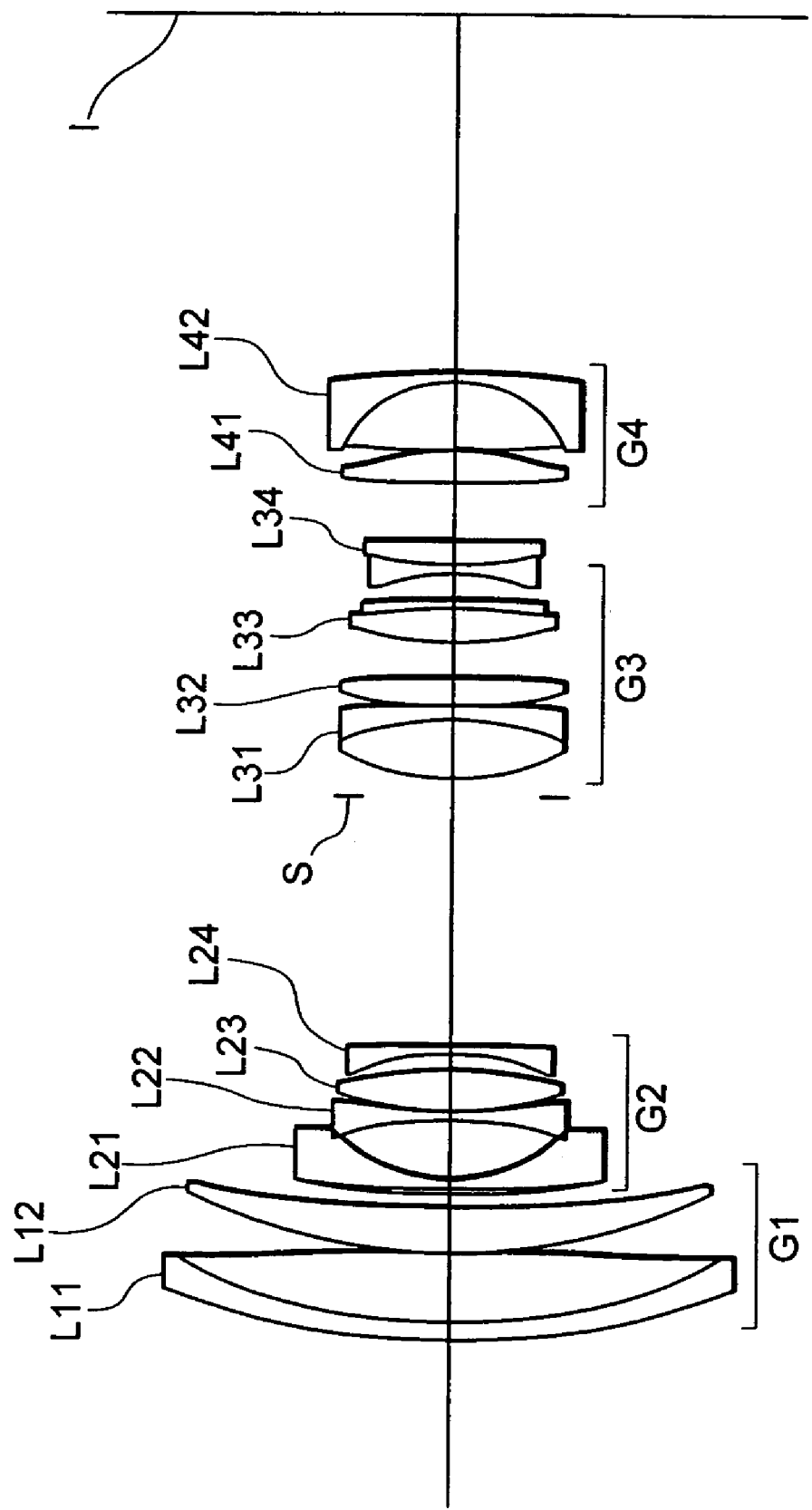
FIG. 32 is a diagram showing the lens arrangement of a zoom lens system according to Example 9 of the second embodiment of the present invention.

FIG. 32 is a diagram showing the lens arrangement of a zoom lens system according to Example 9 of the second embodiment of the present invention.

In a zoom lens system according to Example 9 of the second embodiment, the first lens group G1 is composed of, in order from the object, a cemented lens L11 constructed by a negative meniscus lens having a convex surface facing to the object cemented with a positive lens having a convex surface facing to the object, and a positive meniscus lens L12 having a convex surface facing to the object.

The second lens group G2 is composed of, in order from the object, a negative lens L21 having a concave surface facing to an image, a negative lens L22 having a concave surface facing to the object, a positive lens L23 having a convex surface facing to the object, and a negative lens L24 having a concave surface facing to the object.

The third lens group G3 is composed of, in order from the object, a cemented positive lens L31 constructed by a double convex positive lens and a negative lens having a concave surface facing to the object, a positive lens L32 having a convex surface facing to the object, a cemented positive lens L33 constructed by a double convex positive lens cemented with a negative lens having a concave surface facing to the object, and a cemented negative lens L34 constructed by a double concave negative lens cemented with a positive meniscus lens having a convex surface facing to the object.

The fourth lens group G4 is composed of, in order from the object, a positive lens L41 having a convex surface facing to the image, a cemented lens L42 constructed by a double convex positive lens cemented with a negative lens having a concave surface facing to the object.

In a zoom lens system according to Example 9 of the second embodiment, an aperture stop S is arranged to the object side of the third lens group G3 and is moved together with the third group G3 upon varying the state of lens group positions.

A thin resin layer having an aspherical surface is arranged to the object side surface of the negative lens L21 in the second lens group G2.

In the zoom lens system according to Example 9 of the second embodiment, the cemented positive lens L31 and the positive lens L32, the cemented positive lens L33, and the cemented negative lens L34 in the third lens group G3 work as the first sub-lens group, the second sub-lens group, and the third sub-lens group, respectively.

Various values according to Example 9 are listed in Table 9.

TABLE 9

[Specifications]

| | Wide-angle | Intermediate | Telephoto |
|---|---|---|---|
| f = | 28.80 | 100.00 | 291.01 mm |
| 2ω = | 76.77 | 23.72 | 8.27° |
| FNO = | 3.70 | 5.32 | 5.90 |

[Lens Data]

| Surface Number | r | d | ν | n |
|---|---|---|---|---|
| 1 | 92.4229 | 1.900 | 23.78 | 1.84666 |
| 2 | 66.7560 | 7.750 | 81.61 | 1.49700 |
| 3 | −846.2717 | 0.100 | | |
| 4 | 63.6267 | 4.950 | 81.61 | 1.49700 |
| 5 | 165.9874 | (D5) | | |
| 6 | 128.4411 | 0.200 | 52.42 | 1.51742 |
| 7 | 101.5414 | 1.150 | 54.66 | 1.72916 |
| 8 | 17.1504 | 6.250 | | |
| 9 | −46.5218 | 1.000 | 52.32 | 1.75500 |
| 10 | 66.4470 | 0.100 | | |
| 11 | 33.9329 | 4.200 | 23.78 | 1.84666 |
| 12 | −53.7522 | 1.800 | | |
| 13 | −26.2934 | 0.900 | 42.72 | 1.83481 |
| 14 | −885.5810 | (D14) | | |
| 15 | 0.0000 | 2.200 | (Aperture Stop) | |
| 16 | 23.3505 | 7.000 | 61.18 | 1.58913 |
| 17 | −25.1524 | 0.800 | 46.58 | 1.80400 |
| 18 | −280.9645 | 0.100 | | |
| 19 | 37.9321 | 3.200 | 64.14 | 1.51633 |
| 20 | −414.9721 | 4.050 | | |
| 21 | 34.8328 | 3.850 | 52.32 | 1.75500 |
| 22 | −60.1069 | 0.800 | 23.78 | 1.84666 |
| 23 | −456.9696 | 3.100 | | |
| 24 | −21.2766 | 0.800 | 37.17 | 1.83400 |
| 25 | 32.5985 | 2.650 | 70.24 | 1.48749 |
| 26 | 863.3676 | (D26) | | |
| 27 | 145.6193 | 3.600 | 64.14 | 1.51633 |
| 28 | −30.7860 | 0.100 | | |
| 29 | 629.7219 | 7.700 | 33.04 | 1.66680 |
| 30 | −13.2652 | 0.900 | 42.72 | 1.83481 |
| 31 | −80.0893 | (Bf) | | |

[Aspherical Data]

Surface Number 6

κ = −4.2585
C4 = 4.4810E−6
C6 = 1.2417E−8
C8 = −1.0672E−10
C10 = 3.1231E−13

Surface Number 16

κ = 1.0000
C4 = −3.9585E−6
C6 = 4.2904E−9
C8 = −8.0515E−12
C10 = 4.2777E−14

Surface Number 28

κ = 1.0000
C4 = 1.0383E−5
C6 = −1.4668E−8
C8 = 1.2224E−10
C10 = −1.4347E−12

| | Wide-angle | Intermediate | Telephoto |
|---|---|---|---|
| [Variable Intervals] | | | |
| f | 28.8001 | 100.0017 | 291.0077 |
| D5 | 1.5358 | 36.1674 | 61.1207 |
| D14 | 27.1675 | 12.0649 | 0.8000 |
| D26 | 6.3826 | 2.6488 | 2.0000 |
| BF | 39.5003 | 75.7001 | 90.8947 |
| [Shift Amount of Shifting lens group] | | | |
| f | 28.8001 | 100.0017 | 291.0077 |
| δb | 0.1123 | 0.2444 | 0.6095 | where δb denotes a shift amount of the second sub-lens group for shifting an image corresponding to a half angle of view of 0.3 degrees.

[Values for Conditional Expressions]
fA=224.755
fa=30.182
fc=−19.750
f3=35.153
(1) Ds/fw=0.602
(2) ft/fA=1.295
(3) fa/ft=0.104
(4)(na/ra)/(nb/rb)=−0.080
(5)|fc|/f3=0.562
(6)|rc|/f3=0.605

Figure 33A:
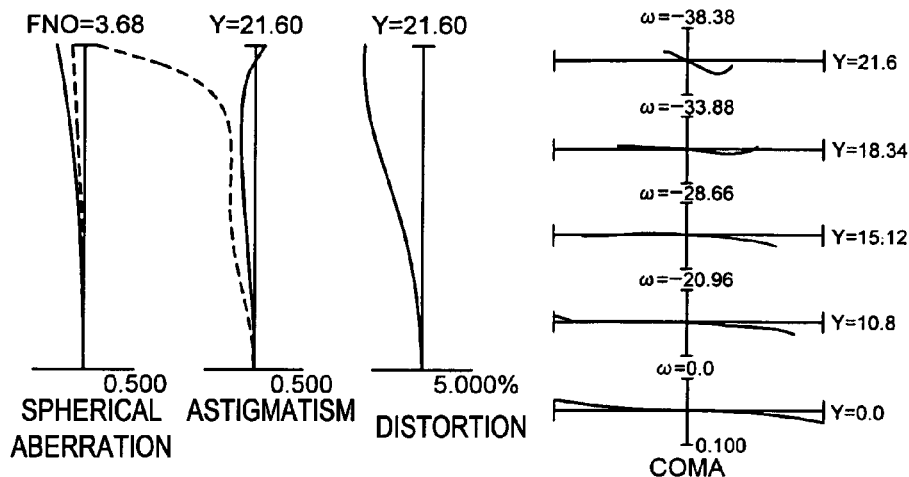
FIGS. 33A, 33B, and 33C graphically show various aberrations of the zoom lens system according to Example 9 focusing at infinity in a wide-angle end state (f=28.80), an intermediate focal length state (f=100.00), and a telephoto end state (f=291.00), respectively.
Figure 33B:
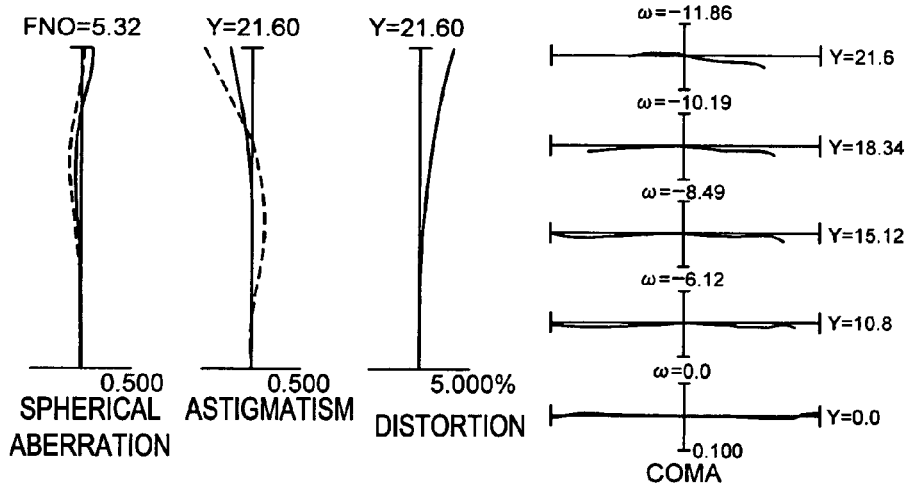
Figure 33C:
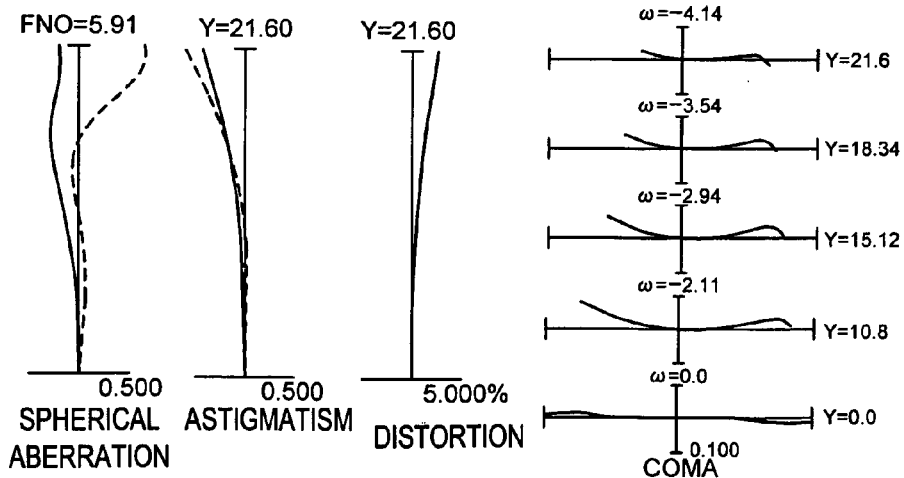

FIGS. 33A, 33B, and 33C graphically show various aberrations of the zoom lens system according to Example 9 of the second embodiment focusing at infinity in a wide-angle end state (f=28.80), an intermediate focal length state (f=100.00), and a telephoto end state (f=291.00), respectively.

Figure 34C:
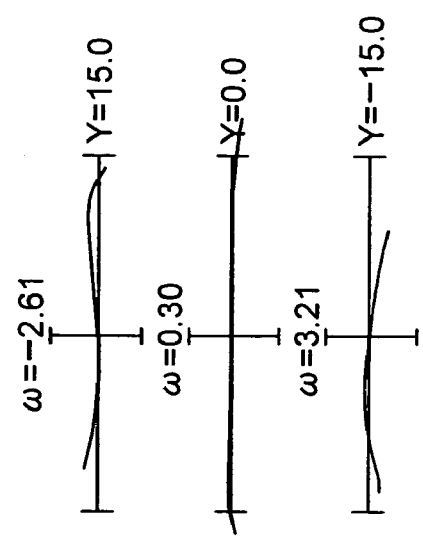
FIGS. 34A, 34B, and 34C graphically show coma of the zoom lens system according to Example 9 focusing at infinity in a wide-angle end state (f=28.80), an intermediate focal length state (f=100.00), and a telephoto end state (f=291.00), respectively, when a second sub-lens group is shifted.
Figure 34B:
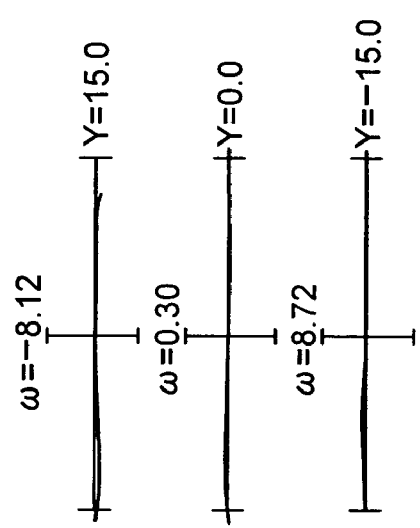
Figure 34A:
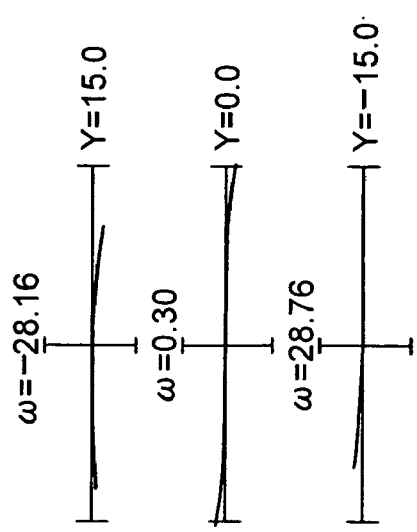

FIGS. 34A, 34B, and 34C graphically show coma of the zoom lens system according to Example 9 focusing at infinity in a wide-angle end state (f=28.80), an intermediate focal length state (f=100.00), and a telephoto end state (f=291.00), respectively, when a second sub-lens group is shifted the amount shown in Table 9.

As is apparent from FIGS. 33A, 33B, and 33C, the zoom lens system according to Example 9 of the second embodiment shows superb optical performance as a result of good corrections to various aberrations in each focal length state.

As is apparent from FIGS. 34A, 34B, and 34C, the zoom lens system according to Example 9 of the second embodiment shows superb optical performance as a result of good corrections to variation in various aberrations upon shifting an image.

As described above, the present invention makes it possible to provide a high zoom ratio zoom lens system capable of shifting an image by shifting one or some of lens elements consisting of the zoom lens system substantially perpendicularly to the optical axis, having relatively short total lens length in the wide-angle end state, with small variation in the total lens length upon varying the state of lens group positions from the wide-angle end state to the telephoto end state. Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
    a first lens group having positive refractive power;
    a second lens group having negative refractive power;
    a third lens group having positive refractive power; and
    a fourth lens group having positive refractive power;
    each of the first lens group through the fourth lens group moving such that;
    when the state of lens group positions varies from a wide-angle end state to a telephoto end state;
    a distance between the first lens group and the second lens group increases;
    a distance between the second lens group and the third lens group decreases; and
    a distance between the third lens group and the fourth lens group decreases;
    the third lens group including at least two sub-lens groups having positive refractive power;
    an image being shifted by moving either of the two sub-lens groups as a shift lens group perpendicularly to the optical axis; and
    wherein the following conditional expression is satisfied:

$0.120 < DT/ft < 0.245$ where DT denotes an air space between the most image side lens surface of the first lens group and the most object side lens surface of the second lens group in the telephoto end state, and ft denotes the focal length of the zoom lens system in the telephoto end state.

2. The zoom lens system according to claim 1, wherein the following conditional expression is satisfied:

$0.8 < (1-\beta A) \times \beta B < 3.5$ where βA denotes the lateral magnification of the shift lens group and βB denotes the lateral magnification of the optical elements locating between the shift lens group and an image plane.

3. The zoom lens system according to claim 2, wherein the third lens group consists of, in order from the object:
    a third A lens group having positive refractive power;
    a third B lens group having positive refractive power; and
    a third C lens group having negative refractive power; and
    wherein the shift lens group having positive refractive power is the third B lens group.

4. The zoom lens system according to claim 3, wherein the shift lens group includes at least one aspherical surface.

5. The zoom lens system according to claim 3, wherein the third A lens group consists of two positive lenses and one negative lens.

6. The zoom lens system according to claim 3, wherein the third B lens group consists of one positive lens and one negative lens.

7. The zoom lens system according to claim 2, wherein the shift lens group includes at least one aspherical surface.

8. The zoom lens system according to claim 1,
    wherein the third lens group consists of, in order from the object:
    a third A lens group having positive refractive power;
    a third B lens group having positive refractive power; and
    a third C lens group having negative refractive power; and
    wherein the shift lens group having positive refractive power is the third B lens group.

9. The zoom lens system according to claim 8, wherein the shift lens group includes at least one aspherical surface.

10. The zoom lens system according to claim 8, wherein the third A lens group consists of two positive lenses and one negative lens.

11. The zoom lens system according to claim 8, wherein the third B lens group consists of one positive lens and one negative lens.

12. The zoom lens system according to claim 1, wherein the shift lens group includes at least one aspherical surface.

13. The zoom lens system according to claim 1, wherein the second lens group includes at least three negative lenses and one positive lens.

14. The zoom lens system according to claim 1, wherein the fourth lens group includes at least one aspherical surface having a shape that positive refractive power becomes weak from the center to the periphery of the lens surface.

15. A zoom lens system comprising, in order from an object:
    a first lens group having positive refractive power;
    a second lens group having negative refractive power;
    a third lens group having positive refractive power; and
    a fourth lens group having positive refractive power;
    at least the first lens group and the fourth lens group moving to the object side such that when the state of lens group positions varies from a wide-angle end state to a telephoto end state a distance between the first lens group and the second lens group increases, a distance between the second lens group and the third lens group decreases, and a distance between the third lens group and the fourth lens group decreases;
    the third lens group including a first sub-lens group, a second sub-lens group, and a third sub-lens group;
    the second sub-lens group being arranged to the image side of the first sub-lens group with an air space;
    the third sub-lens group being arranged to the image side of the second sub-lens group with an air space;
    an image being shifted by moving the second sub-lens groups shifting substantially perpendicularly to the optical axis; and
    an aperture stop being arranged in the vicinity of the third lens group, inclusive of inside of the third lens group;

wherein the following conditional expressions are satisfied:

$$0.05 < Ds/fw < 0.7$$

$$0.1 < ft/fA < 1.5$$

where Ds denotes a distance along the optical axis between the aperture stop and the nearest lens surface of the second sub-lens group, fw denotes the focal length of the zoom lens system in the wide-angle end state, fA denotes the focal length of the whole lenses locating to the object side of the second sub-lens group in the telephoto end state, and ft denotes the focal length of the zoom lens system in the telephoto end state.

16. The zoom lens system according to claim 15, wherein the first sub-lens group has positive refractive power and the following conditional expression is satisfied:

$$0.06 < fa/ft < 0.2$$

where fa denotes the focal length of the first sub-lens group.

17. The zoom lens system according to claim 16, wherein the second sub-lens group includes at least one positive lens and one negative lens, and has positive refractive power, and wherein the following conditional expression is satisfied:

$$-0.6 < (na/ra)/(nb/rb) < 0$$

where ra denotes a radius of curvature of the most object side lens surface of the second sub-lens group, na denotes refractive index at d-line of the most object side lens of the second sub-lens group, rb denotes a radius of curvature of the most image side lens surface of the second sub-lens group, and nb denotes refractive index at d-line of the most image side lens of the second sub-lens group.

18. The zoom lens system according to claim 17, wherein the third sub-lens group has negative refractive power and the following conditional expression is satisfied:

$$0.5 < |fc|/f3 < 0.9$$

where fc denotes the focal length of the third sub-lens group, and f3 denotes the focal length of the third lens group.

19. The zoom lens system according to claim 18, wherein the third sub-lens group includes a negative lens having a concave surface facing to the object locating to the most object side and the following conditional expression is satisfied:

$$0.5 < |rc|/f3 < 0.75$$

where rc denotes a radius of curvature of the negative lens locating to the most object side of the third sub-lens group.

20. The zoom lens system according to claim 16, wherein the third sub-lens group has negative refractive power and the following conditional expression is satisfied:

$$0.5 < |fc|/f3 < 0.9$$

where fc denotes the focal length of the third sub-lens group, and f3 denotes the focal length of the third lens group.

21. The zoom lens system according to claim 20, wherein the third sub-lens group includes a negative lens having a concave surface facing to the object locating to the most object side and the following conditional expression is satisfied:

$$0.5 < |rc|/f3 < 0.75$$

where rc denotes a radius of curvature of the negative lens locating to the most object side of the third sub-lens group.

22. The zoom lens system according to claim 15, wherein the second sub-lens group includes at least one positive lens and one negative lens, and has positive refractive power, and wherein the following conditional expression is satisfied:

$$-0.6 < (na/ra)/(nb/rb) < 0$$

where ra denotes a radius of curvature of the most object side lens surface of the second sub-lens group, na denotes refractive index at d-line of the most object side lens of the second sub-lens group, rb denotes a radius of curvature of the most image side lens surface of the second sub-lens group, and nb denotes refractive index at d-line of the most image side lens of the second sub-lens group.

23. The zoom lens system according to claim 22, wherein the third sub-lens group has negative refractive power and the following conditional expression is satisfied:

$$0.5 < |fc|/f3 < 0.9$$

where fc denotes the focal length of the third sub-lens group, and f3 denotes the focal length of the third lens group.

24. The zoom lens system according to claim 23, wherein the third sub-lens group includes a negative lens having a concave surface facing to the object locating to the most object side and the following conditional expression is satisfied:

$$0.5 < |rc|/f3 < 0.75$$

where rc denotes a radius of curvature of the negative lens locating to the most object side of the third sub-lens group.

25. The zoom lens system according to claim 15, wherein the third sub-lens group has negative refractive power and the following conditional expression is satisfied:

$$0.5 < |fc|/f3 < 0.9$$

where fc denotes the focal length of the third sub-lens group, and f3 denotes the focal length of the third lens group.

26. The zoom lens system according to claim 25, wherein the third sub-lens group includes a negative lens having a concave surface facing to the object locating to the most object side and the following conditional expression is satisfied:

$$0.5 < |rc|/f3 < 0.75$$

where rc denotes a radius of curvature of the negative lens locating to the most object side of the third sub-lens group.

27. A zoom lens system comprising, in order from an object:
a first lens group having positive refractive power;
a second lens group having negative refractive power;
a third lens group having positive refractive power; and
a fourth lens group having positive refractive power;
at least the first lens group and the fourth lens group moving to the object side such that when the state of lens group positions varies from a wide-angle end state to a telephoto end state a distance between the first lens group and the second lens group increases, a distance between the second lens group and the third lens group decreases, and a distance between the third lens group and the fourth lens group decreases;

the third lens group including a first sub-lens group, a second sub-lens group, and a third sub-lens group;

the second sub-lens group being arranged to the image side of the first sub-lens group with an air space;

the third sub-lens group being arranged to the image side of the second sub-lens group with an air space;

an image being shifted by moving the second sub-lens groups shifting substantially perpendicularly to the optical axis; and an aperture stop being arranged in the vicinity of the third lens group including inside of the third lens group;

wherein the following conditional expressions are satisfied:

$$0.05<Ds/fw<0.7$$

where Ds denotes a distance along the optical axis between the aperture stop and the nearest lens surface of the second sub-lens group, and fw denotes the focal length of the zoom lens system in the wide-angle end state.

28. A method for forming an image of an object and varying a focal length, comprising:

providing a lens system that inlcudes, in order from the object, a first lens group having positive refractive power, a second lens group having negative refractive power, a third lens group having positive refractive power and including at least two sub-lens groups having positive refractive power, and a fourth lens group having positive refractive power;

varying a state of lens group positions from a wide-angle end state to a telephoto end state by moving each of the first lens group through the fourth lens group such that a distance between the first lens group and the second lens group increases, a distance between the second lens group and the third lens group decreases, and a distance between the third lens group and the fourth lens group decreases;

shifting the image by moving either of the two sub-lens groups as a shift lens group perpendicularly to an optical axis; and wherein the following conditional expression is satisfied:

$$0.120<DT/ft<0.245$$

where DT denotes an air space between the most image side lens surface of the first lens group and the most object side lens surface of the second lens group in the telephoto end state, and ft denotes the focal length of the zoom lens system in the telephoto end state.

29. The method according to claim 28, wherein the following conditional expression is satisfied:

$$0.8<(1-\beta A)\times\beta B<3.5$$

where $\beta A$ denotes the lateral magnification of the shift lens group and $\beta B$ denotes the lateral magnification of the optical elements locating between the shift lens group and an image plane.

30. The method according to claim 28, wherein the third lens group includes, in order from the object, a third A lens group having positive refractive power, a third B lens group having positive refractive power, and a third C lens group having negative refractive power, and wherein the shift lens group having positive refractive power is the third B lens group.

31. A method for forming an image of an object and varying a focal length comprising:

providing a lens system that includes, in order from the object, a first lens group having positive refractive power, a second lens group having negative refractive power, a third lens group having positive refractive power, and a fourth lens group having positive refractive power, wherein the third lens group includes a first sub-lens group, a second sub-lens group, and a third sub-lens group, the second sub-lens group being arranged to the image side of the first sub-lens group with an air space and the third sub-lens group being arranged to the image side of the second sub-lens group with an air space, and wherein an aperture stop is arranged in a vicinity of the third lens group, inclusive of inside of the third lens group; and varying a state of lens group positions from a wide- angle end state to a telephoto end state by moving at least the first lens group and the fourth lens group such that a distance between the first lens group and the second lens group increases, a distance between the second lens group and the third lens group decreases, and a distance between the third lens group and the fourth lens group decreases;

shifting the image by moving the second sub-lens group as a shift lens group substantially perpendicularly to an optical axis; and wherein the following conditional expression is satisfied:

$$0.05<Ds/fw<0.7$$

where Ds denotes a distance along the optical axis between the aperture stop and the nearest lens surface of the second sub-lens group, and fw denotes the focal length of the zoom lens system in the wide-angle end state.

32. The method according to claim 31, wherein the following conditional expression is satisfied:

$$0.1<ft/fA<1.5$$

where fA denotes the focal length of the whole lenses locating to the object side of the second sub-lens group in the telephoto end state and ft denotes the focal length of the zoom lens system in the telephoto end state.

33. The method according to claim 31, wherein the following conditional expression is satisfied:

$$0.06<fa/ft<0.2$$

where fa denotes the focal length of the first sub-lens group and ft denotes the focal length of the zoom lens system in the telephoto end state.

34. The method according to claim 31, wherein the following conditional expression is satisfied:

$$0.5<|fc|/f3<0.9$$

where fc denotes the focal length of the third sub-lens group and f3 denotes the focal length of the third lens group.

* * * * *